SWITCHING SYSTEM FOR COMMUNICATION OF INTELLIGENCE

Original Filed July 13, 1945 45 Sheets-Sheet 1

INVENTORS
GUSTAV VILHELM GUNNAR MODEE,
JONAS HARRY STRANDLUND,
FOLKE EK

BY

ATTORNEY

SWITCHING SYSTEM FOR COMMUNICATION OF INTELLIGENCE

Original Filed July 13, 1945 45 Sheets-Sheet 2

INVENTORS
GUSTAV VILHELM GUNNAR MODEE,
JONAS HARRY STRANDLUND,
FOLKE EK

BY [signature]
ATTORNEY

SWITCHING SYSTEM FOR COMMUNICATION OF INTELLIGENCE

Original Filed July 13, 1945

350 360 351 361 ... 358 368 359 369

301-302

| | | | | | | | | | | | | | | | | | | | |
|---|---|---|---|---|---|---|---|---|---|---|---|---|---|---|---|---|---|---|---|
| 00 | 00 | 10 | 10 | 20 | 20 | 30 | 30 | 40 | 40 | 50 | 50 | 60 | 60 | 70 | 70 | 80 | 80 | 90 | 90 |
| 01 | 01 | 11 | 11 | 21 | 21 | 31 | 31 | 41 | 41 | 51 | 51 | 61 | 61 | 71 | 71 | 81 | 81 | 91 | 91 |
| 02 | 02 | 12 | 12 | 22 | 22 | 32 | 32 | 42 | 42 | 52 | 52 | 62 | 62 | 72 | 72 | 82 | 82 | 92 | 92 |
| 03 | 03 | 13 | 13 | 23 | 23 | 33 | 33 | 43 | 43 | 53 | 53 | 63 | 63 | 73 | 73 | 83 | 83 | 93 | 93 |
| 04 | 04 | 14 | 14 | 24 | 24 | 34 | 34 | 44 | 44 | 54 | 54 | 64 | 64 | 74 | 74 | 84 | 84 | 94 | 94 |
| 05 | 05 | 15 | 15 | 25 | 25 | 35 | 35 | 45 | 45 | 55 | 55 | 65 | 65 | 75 | 75 | 85 | 85 | 95 | 95 |
| 06 | 06 | 16 | 16 | 26 | 26 | 36 | 36 | 46 | 46 | 56 | 56 | 66 | 66 | 76 | 76 | 86 | 86 | 96 | 96 |
| 07 | 07 | 17 | 17 | 27 | 27 | 37 | 37 | 47 | 47 | 57 | 57 | 67 | 67 | 77 | 77 | 87 | 87 | 97 | 97 |
| 08 | 08 | 18 | 18 | 28 | 28 | 38 | 38 | 48 | 48 | 58 | 58 | 68 | 68 | 78 | 78 | 88 | 88 | 98 | 98 |
| 09 | 09 | 19 | 19 | 29 | 29 | 39 | 39 | 49 | 49 | 59 | 59 | 69 | 69 | 79 | 79 | 89 | 89 | 99 | 99 |

370 380 ... 379 389

303-304

| | | | | | | | | | | | | | | | | | | | |
|---|---|---|---|---|---|---|---|---|---|---|---|---|---|---|---|---|---|---|---|
| 00 | 00 | 01 | 01 | 02 | 02 | 03 | 03 | 04 | 04 | 05 | 05 | 06 | 06 | 07 | 07 | 08 | 08 | 09 | 09 |
| 10 | 10 | 11 | 11 | 12 | 12 | 13 | 13 | 14 | 14 | 15 | 15 | 16 | 16 | 17 | 17 | 18 | 18 | 19 | 19 |
| 20 | 20 | 21 | 21 | 22 | 22 | 23 | 23 | 24 | 24 | 25 | 25 | 26 | 26 | 27 | 27 | 28 | 28 | 29 | 29 |
| 30 | 30 | 31 | 31 | 32 | 32 | 33 | 33 | 34 | 34 | 35 | 35 | 36 | 36 | 37 | 37 | 38 | 38 | 39 | 39 |
| 40 | 40 | 41 | 41 | 42 | 42 | 43 | 43 | 44 | 44 | 45 | 45 | 46 | 46 | 47 | 47 | 48 | 48 | 49 | 49 |
| 50 | 50 | 51 | 51 | 52 | 52 | 53 | 53 | 54 | 54 | 55 | 55 | 56 | 56 | 57 | 57 | 58 | 58 | 59 | 59 |
| 60 | 60 | 61 | 61 | 62 | 62 | 63 | 63 | 64 | 64 | 65 | 65 | 66 | 66 | 67 | 67 | 68 | 68 | 69 | 69 |
| 70 | 70 | 71 | 71 | 72 | 72 | 73 | 73 | 74 | 74 | 75 | 75 | 76 | 76 | 77 | 77 | 78 | 78 | 79 | 79 |
| 80 | 80 | 81 | 81 | 82 | 82 | 83 | 83 | 84 | 84 | 85 | 85 | 86 | 86 | 87 | 87 | 88 | 88 | 89 | 89 |
| 90 | 90 | 91 | 91 | 92 | 92 | 93 | 93 | 94 | 94 | 95 | 95 | 96 | 96 | 97 | 97 | 98 | 98 | 99 | 99 |

INVENTORS
GUSTAV VILHELM GUNNAR MODÉE
JONAS HARRY STRANDLUND
FOLKE EK
BY [signature]
ATTORNEY INVENTORS
GUSTAV VILHELM GUNNAR MODEE,
JONAS HARRY STRANDLUND,
FOLKE EK
BY [signature]
ATTORNEY

SWITCHING SYSTEM FOR COMMUNICATION OF INTELLIGENCE

Original Filed July 13, 1945 45 Sheets-Sheet 5

INVENTORS
GUSTAV VILHELM GUNNAR MODEE,
JONAS HARRY STRANDLUND,
FOLKE EK
BY
ATTORNEY

INVENTORS
GUSTAV VILHELM GUNNAR MODEE,
JONAS HARRY STRANDLUND,
FOLKE EK
BY
ATTORNEY

SWITCHING SYSTEM FOR COMMUNICATION OF INTELLIGENCE

Original Filed July 13, 1945

INVENTORS
GUSTAV VILHELM GUNNAR MODEE,
JONAS HARRY STRANDLUND,
FOLKE EK
BY [signature]
ATTORNEY May 27, 1952 G. V. G. MODÉE ET AL 2,598,412

SWITCHING SYSTEM FOR COMMUNICATION OF INTELLIGENCE

Original Filed July 13, 1945 45 Sheets-Sheet 8

INVENTORS
GUSTAV VILHELM GUNNAR MODEE
JONAS HARRY STRANDLUND,
FOLKE EK
BY
ATTORNEY

SWITCHING SYSTEM FOR COMMUNICATION OF INTELLIGENCE

INVENTORS
GUSTAV VILHELM GUNNAR MODEE,
JONAS HARRY STRANDLUND,
FOLKE EK,
BY
ATTORNEY

May 27, 1952 G. V. G. MODÉE ET AL 2,598,412

SWITCHING SYSTEM FOR COMMUNICATION OF INTELLIGENCE

Original Filed July 13, 1945 45 Sheets-Sheet 10

INVENTORS
GUSTAV VILHELM GUNNAR MODEE,
JONAS HARRY STRANDLUND,
FOLKE EK
BY
ATTORNEY

INVENTORS
GUSTAV VILHELM GUNNAR MODEE
JONAS HARRY STRANDLUND,
FOLKE EK
BY [signature]
ATTORNEY INVENTORS
GUSTAV VILHELM GUNNAR MODEE,
JONAS HARRY STRANDLUND,
FOLKE EK
BY [signature]
ATTORNEY INVENTORS
GUSTAV VILHELM GUNNAR MODEE
JONAS HARRY STRANDLUND,
FOLKE EK
BY [signature]
ATTORNEY May 27, 1952 G. V. G. MODÉE ET AL 2,598,412

SWITCHING SYSTEM FOR COMMUNICATION OF INTELLIGENCE

Original Filed July 13, 1945 45 Sheets-Sheet 14

INVENTORS
GUSTAV VILHELM GUNNAR MODEE,
JONAS HARRY STRANDLUND,
FOLKE EK
BY
ATTORNEY

May 27, 1952 G. V. G. MODÉE ET AL 2,598,412

SWITCHING SYSTEM FOR COMMUNICATION OF INTELLIGENCE

Original Filed July 13, 1945 45 Sheets-Sheet 15

INVENTORS
GUSTAV VILHELM GUNNAR MODEE,
JONAS HARRY STRANDLUND,
FOLKE EK

BY [signature]

ATTORNEY

INVENTORS
GUSTAV VILHELM GUNNAR MODEE
JONAS HARRY STRANDLUND,
FOLKE EK
BY
ATTORNEY

INVENTORS
GUSTAV VILHELM GUNNAR MODEE,
JONAS HARRY STRANDLUND,
FOLKE EK
BY [signature]
ATTORNEY May 27, 1952 G. V. G. MODÉE ET AL 2,598,412

SWITCHING SYSTEM FOR COMMUNICATION OF INTELLIGENCE

Original Filed July 13, 1945 45 Sheets-Sheet 18

INVENTORS
GUSTAV VILHELM GUNNAR MODEE,
JONAS HARRY STRANDLUND,
FOLKE EK
BY [signature]
ATTORNEY INVENTORS
GUSTAV VILHELM GUNNAR MODEE
JONAS HARRY STRANDLUND,
FOLKE ÉK
BY
ATTORNEY INVENTORS
GUSTAV VILHELM GUNNAR MODEE
JONAS HARRY STRANDLUND,
FOLKE EK
BY
ATTORNEY INVENTORS
GUSTAV VILHELM GUNNAR MODEE,
JONAS HARRY STRANDLUND,
FOLKE EK
BY
ATTORNEY

SWITCHING SYSTEM FOR COMMUNICATION OF INTELLIGENCE

Original Filed July 13, 1945 45 Sheets-Sheet 22

INVENTORS
GUSTAV VILHELM GUNNAR MODEE,
JONAS HARRY STRANDLUND,
FOLKE EK
BY
ATTORNEY

INVENTORS
GUSTAV VILHELM GUNNAR MODEE,
JONAS HARRY STRANDLUND,
FOLKE EK
BY
ATTORNEY

SWITCHING SYSTEM FOR COMMUNICATION OF INTELLIGENCE
Original Filed July 13, 1945

INVENTORS
GUSTAV VILHELM GUNNAR MODEE,
JONAS HARRY STRANDLUND,
FOLKE EK
BY
ATTORNEY

INVENTORS
GUSTAV VILHELM GUNNAR MODEE,
JONAS HARRY STRANDLUND,
FOLKE EK
BY
ATTORNEY

May 27, 1952 G. V. G. MODÉE ET AL 2,598,412

SWITCHING SYSTEM FOR COMMUNICATION OF INTELLIGENCE

Original Filed July 13, 1945 45 Sheets-Sheet 26

INVENTORS
GUSTAV VILHELM GUNNAR MODEE,
JONAS HARRY STRANDLUND,
FOLKE EK
BY
ATTORNEY

May 27, 1952 G. V. G. MODÉE ET AL 2,598,412

SWITCHING SYSTEM FOR COMMUNICATION OF INTELLIGENCE

Original Filed July 13, 1945

45 Sheets-Sheet 27

INVENTORS
GUSTAV VILHELM GUNNAR MODEE,
JONAS HARRY STRANDLUND,
FOLKE EK
BY
ATTORNEY

INVENTORS
GUSTAV VILHELM GUNNAR MODEE,
JONAS HARRY STRANDLUND,
FOLKE EK
BY
ATTORNEY

INVENTORS
GUSTAV VILHELM GUNNAR MODEE,
JONAS HARRY STRANDLUND,
FOLKE EK
BY
ATTORNEY

SWITCHING SYSTEM FOR COMMUNICATION OF INTELLIGENCE

Original Filed July 13, 1945 45 Sheets-Sheet 30

INVENTORS
GUSTAV VILHELM GUNNAR MODEE,
JONAS HARRY STRANDLUND,
FOLKE EK
BY [signature]
ATTORNEY INVENTORS
GUSTAV VILHELM GUNNAR MODEE
JONAS HARRY STRANDLUND,
FOLKE EK
BY
ATTORNEY INVENTORS
GUSTAV VILHELM GUNNAR MODEE,
JONAS HARRY STRANDLUND,
FOLKE EK
BY
ATTORNEY May 27, 1952 G. V. G. MODÉE ET AL 2,598,412

SWITCHING SYSTEM FOR COMMUNICATION OF INTELLIGENCE

Original Filed July 13, 1945 45 Sheets-Sheet 33

INVENTORS
GUSTAV VILHELM GUNNAR MODEE
JONAS HARRY STRANDLUND
FOLKE EK

BY

ATTORNEY

INVENTORS
GUSTAV VILHELM GUNNAR MODÉE
JONAS HARRY STRANDLUND,
FOLKE EK
BY
ATTORNEY

INVENTORS
GUSTAV VILHELM GUNNAR MODEE,
JONAS HARRY STRANDLUND,
FOLKE EK
BY
ATTORNEY

INVENTORS
GUSTAV VILHELM GUNNAR MODEE,
JONAS HARRY STRANDLUND,
FOLKE EK
BY [signature]
ATTORNEY INVENTORS
GUSTAV VILHELM GUNNAR MODEE,
JONAS HARRY STRANDLUND,
FOLKE EK
BY
ATTORNEY INVENTORS
GUSTAV VILHELM GUNNAR MODEE,
JONAS HARRY STRANDLUND,
FOLKE EK
BY [signature]
ATTORNEY May 27, 1952 G. V. G. MODÉE ET AL 2,598,412

SWITCHING SYSTEM FOR COMMUNICATION OF INTELLIGENCE

Original Filed July 13, 1945 45 Sheets-Sheet 39

INVENTORS
GUSTAV VILHELM GUNNAR MODEE,
JONAS HARRY STRANDLUND,
FOLKE EK
BY
ATTORNEY

May 27, 1952 G. V. G. MODÉE ET AL 2,598,412

SWITCHING SYSTEM FOR COMMUNICATION OF INTELLIGENCE

Original Filed July 13, 1945 45 Sheets-Sheet 40

INVENTORS
GUSTAV VILHELM GUNNAR MODEE,
JONAS HARRY STRANDLUND,
FOLKE EK
BY
ATTORNEY

INVENTORS
GUSTAV VILHELM GUNNAR MODEE,
JONAS HARRY STRANDLUND,
FOLKE EK
BY
ATTORNEY

INVENTORS
GUSTAV VILHELM GUNNAR MODEE,
JONAS HARRY STRANDLUND
FOLKE EK
BY [signature]
ATTORNEY INVENTORS
GUSTAV VILHELM GUNNAR MODEE,
JONAS HARRY STRANDLUND,
FOLKE EK
BY
ATTORNEY INVENTORS
GUSTAV VILHELM GUNNAR MODEE,
JONAS HARRY STRANDLUND,
FOLKE EK
BY
ATTORNEY

| | 0 | 1 | 2 | 3 | 4 | 5 | 6 | 7 | 8 | 9 | (10) | |
|---|---|---|---|---|---|---|---|---|---|---|---|---|
| 2201 | + | − | + | − | + | − | + | − | + | − | + | − |
| 2202 | + | + | − | − | + | + | − | − | + | + | − | − |
| 2203 | + | + | + | + | + | + | + | + | − | − | − | − |
| 2204 | + | + | + | + | − | − | − | − | − | − | − | − |

INVENTORS
GUSTAVE VILHELM GUNNAR MODEE,
JONAS HARRY STRANDLUND,
FOLKE EK

BY [signature]
ATTORNEY

Patented May 27, 1952

2,598,412

UNITED STATES PATENT OFFICE 2,598,412

SWITCHING SYSTEM FOR COMMUNICATION OF INTELLIGENCE

Gustav Vilhelm Gunnar Modée, Jonas Harry Strandlund, and Folke Ek, Stockholm, Sweden Continuation of application Serial No. 604,938, July 13, 1945. This application September 26, 1950, Serial No. 186,858. In Sweden August 12, 1943

8 Claims. (Cl. 179—22)

The present invention relates to switching systems for the communication of intelligence and particularly to automatic switching systems.

The present application is a continuation application of our original patent application Ser. No. 604,938, filed July 13, 1945, now abandoned, for a system for communication of intelligence.

The invention is suitable for automatic telephone systems for use in large offices serving large areas as well as in small offices serving small areas.

The invention can be used in telephone offices and systems and particularly in those using crossbar switches, because each crossbar switch comprises a plurality of hold magnets, of which each one with its associated contacts can be considered as an individual switch capable of performing the desired switching operation.

By arranging the many hold magnets of each crossbar switch in a set of switches, it is possible to use a smaller number of crossbar switches for setting up a plurality of simultaneous connections than if each crossbar switch were used as a single switch.

The present system is a link system, in which each set of switches is composed of a plurality of groups of switches, for example primary and secondary groups of switches. There is a controller exclusively provided for each set of switches, and between said groups of switches links are provided.

The crosspoint multiple in this link system is much better utilized than that of previous crossbar systems, in which an entire crossbar switch was used as a single 100 or 200 point switch.

The invention can of course be used also in offices and systems using other kind of switches.

A telephone by-path system for large exchanges and great areas is known comprising switching devices distributed over a number of switches such as finder switch and final selectors, register finders, first group selectors, second group selectors and third group selectors, each comprising primary and secondary crossbar switches. The switching devices of each final selector or group selector can make connections between a great number of incoming lines to a great number of outgoing lines.

In said system connection is established from the first group selectors by the aid of a few so-called "markers" or controllers. The first marker thus seeks an idle outgoing trunk in the desired numerical trunk over a by-path, and the second marker seeks a desired subscriber at the called office, here called B-subscriber over another by-path.

After the marker in any of the two by-paths has been connected to the desired trunk, it successively connects itself by means of a great number of multiple contact relays to selecting units, which can make the desired connection. For this purpose the markers receive signals of identification from the registers of the corresponding incoming trunks. After testing, the markers seek idle links between switches of the corresponding rank of switches, the switches are operated, and the markers are disengaged and ready for a new call.

Another feature of the said known system is the manner, in which its finder switches and final selectors are divided in primary and secondary switches. The primary switches in said system are hold magnets in crossbar switches, and each such primary switch can receive 20 subscribers' lines. Such hold magnets are arranged in 10 horizontal rows. From each such row each of 10 interior links connects to a secondary crossbar switch. Each outgoing call can thus be switched over any of the outgoing groups of trunks connected to any of the 10 secondary selectors, and each incoming call to a B-subscriber can be switched over any of the incoming groups of trunks connected to the 10 secondary switches.

Each horizontal row of primary switches, however, can only take care of a limited amount of traffic. A sufficient number of primary crossbar switches must therefore be supplied in a line frame to take care of the average traffic of each subscriber. In order to equalize the traffic within a line frame, there are provided various means for multipling a subscriber's number in such a manner that the position of said number is different in different horizontal rows of a plurality of crossbar switches in said line frame.

The said known system is suitable only for large offices and areas, but it is not economic for medium or small size offices and areas, in which only one or two district or group selectors or only line finders and final selectors are used.

The large units of group selectors used in said known system will be fully utilized only on rare occasions. Thus in offices up to 1000 subscribers perhaps only half of the capacity of said known units of group selectors combined with markers can, on an average, be simultaneously utilized. Another great disadvantage of said known system consists in the fact, that selecting equipment cannot be gradually increased, when the capacity of an office is increased, because additional switching devices of a selecting stage to take care of an increased traffic call for a reconstruction of the entire marker equipment common to a certain maximum capacity of an office.

The present invention provides a switching system for the communication of intelligence comprising switches arranged as line finders and final selectors and as group selectors, links outgoing from the switches of one group selector appearing as links incoming to switches of a succeeding group selector, the switches of said line finders and final selectors being arranged in primary and secondary groups of switches, a plurality of numbered lines being connected to switches of the primary group of switches, links between the switches of the primary and secondary group of switches, and a plurality of junctors for incoming and outgoing traffic being connected to the switches of the secondary group of switches, a controller or marker exclusively provided for each of said group selector or final selector switches and associated with same, the numbered lines being provided with means coupled to the controller for calling same, means to connect the controller to junctors for incoming or outgoing traffic, said controller comprising means to direct switches of said primary and secondary groups of switches for setting up a connection serially over a switch in each group of switches and over a corresponding link between a calling or called numbered line and a junctor, the primary group of switches of each set of switches comprising a plurality of sections or portions of switches provided with field contacts, whereby a certain group of numbered lines having mutually different numbers are connected to the field contacts of switches of each one of a plurality of said sections of switches, whereby the numbered lines, which are connected to one switch in a certain section, are connected to a plurality of switches in one of the other sections, the secondary group of switches of each set of switches comprising a plurality of sections, whereby links which are connected to the field contacts of one switch of a section of the secondary group of switches are also connected to the field contacts of all the other switches of said section.

According to another feature of the present invention the subscribers' lines can be connected to a set of line finders and final selectors, said set comprising groups of primary and secondary switches, and a great number of outgoing and incoming junctors and a great number of links. Such a set can be exposed to heavy unbalanced traffic without the risk of congestion.

The set of line finders and final selectors is relatively cheap and it can therefore be dimensioned for much heavier traffic than that which normally exists.

According to the same principle as used in the set of line finders and final selectors of the present system, such sets could be used "per se" for only outgoing or for only incoming traffic, for example as register finders or as line selectors for hunting and seizing an idle long distance or junction line or the like.

The present telephone system is cheap, thanks to the fact that each controller can direct a great number of switches, because instead of multiple contact relays used in the above mentioned known marker system the present system can use the very much cheaper crossbar switches.

The present system can, as before mentioned, be used with great advantage in small offices, whereby economy in group selectors can be made. See, for example, group selectors of the following described embodiment of a telephone system, which system can be provided with registers, although switching, particularly in small areas, can be made by direct dialling. The system is thus suitable for P. B. X exchanges, and the present system or part thereof can, for example, be used as part of or in combination with an automatic office, which operates according to another automatic telephone system, for example a Strowger system.

One or more sets of group selectors of this system can be used for the establishment of connections over long distance lines, whereby a register, which receives dial signals from a subscriber, directs group selectors or portions thereof and final selectors to a desired group of long distance lines. The final selectors must in such a case comprise a great number of primary and secondary crossbar switches in order to take care of heavy traffic over the lines.

Each group of lines and switches corresponding in the present switching system, for example, to first group selectors, second group selectors, third group selectors and line finders and final selectors, comprises, for example, a plurality of 100-point crossbar switches, each provided with hold magnets, for example 10 hold magnets, of which each is provided with contacts for reaching 10 lines.

Such a group of subscribers' lines are in known telephone systems so multipled in a plurality of switches, that all these switches can reach the same subscribers' lines in the same 10-point group, in order to avoid traffic congestion and to reduce the proportion of lost calls.

In such known switching systems, however, the number of necessary switches must be chosen with respect to maximum traffic, which may occur in any 10-point group, and which may have its traffic load most unevenly distributed with respect to other 10-point groups.

By the present invention a more even distribution of traffic over individual switches is obtained, so that a particular location in the contact fields of the respective hold magnets of, for example, subscribers' lines subjected to heavy traffic, is immaterial. A smaller number of switches can nevertheless be used, and a relatively even congestion over a number of different 10-point groups can be obtained.

The invention will be more fully described in connection with a crossbar switch telephone system, in which individual switching operations will successively take place in the ranks of switches in the direction from an A- to a B-subscriber.

According to a feature of the present invention the set of switches of a group selector or final selector, to which outgoing junctors links are connected, is divided in a plurality of groups of switches for extending an incoming line serially through a switch of each group of switches to an outgoing line, the traffic capacity of which is dependent on the order in which the groups of switches are reached and also of the time the links interconnecting said switches are occupied either in the group selector from which outgoing junctors depart or in the group selector where the junctors arrive, and where the traffic is disposed in such a manner, that the overflow traffic, which cannot be taken care of by the group of switches primarily encountered, will be distributed over the subsequent group of switches, and so on, whereby the controller of the corresponding set of switches comprises a selecting device arranged to test or to facilitate testing of such idle outgoing junctors, which can be reached over links of the set of switches, or which can reach a switch of a set of a subsequent group selector.

According to another embodiment of the invention the said controller is arranged to make the desired connection over at least three groups of switches or group selector, the switches of which can be located in the same group selector, or part of them can be located in a preceding or in a succeeding group selector.

The invention further comprises a great number of features which will be described in the following specification in connection with the accompanying drawings, in which:

Fig. 1 shows in block form the relationship between the various elements of a system according to the invention.

Fig. 2 makes up a diagrammatic showing of elements of a telephone system according to the invention. Only one set of switches is shown in each group selector or final selector.

Fig. 3*a* shows in a simplified schematic form an arrangement of a plurality of groups of switches in a set of line finders and final selectors and Fig. 3*b* shows the numerical order in which subscribers' lines can be connected to individual contacts in different rows of the switches of the primary groups of switches.

Fig. 4 shows in a simplified schematic form an alternative arrangement of a plurality of groups of switches in a set of line finders and final selectors for 200 numbers, in which certain switches can alternately be connected to two subscribers' numbers in each position.

Fig. 5*a* shows another alternative arrangement of a plurality of groups of switches in a set of line finders and final selectors for 100 subscribers, and Fig. 5*b* shows the numerical order in which the subscribers' lines can be distributed in primary groups of switches of said set.

Figure 11:
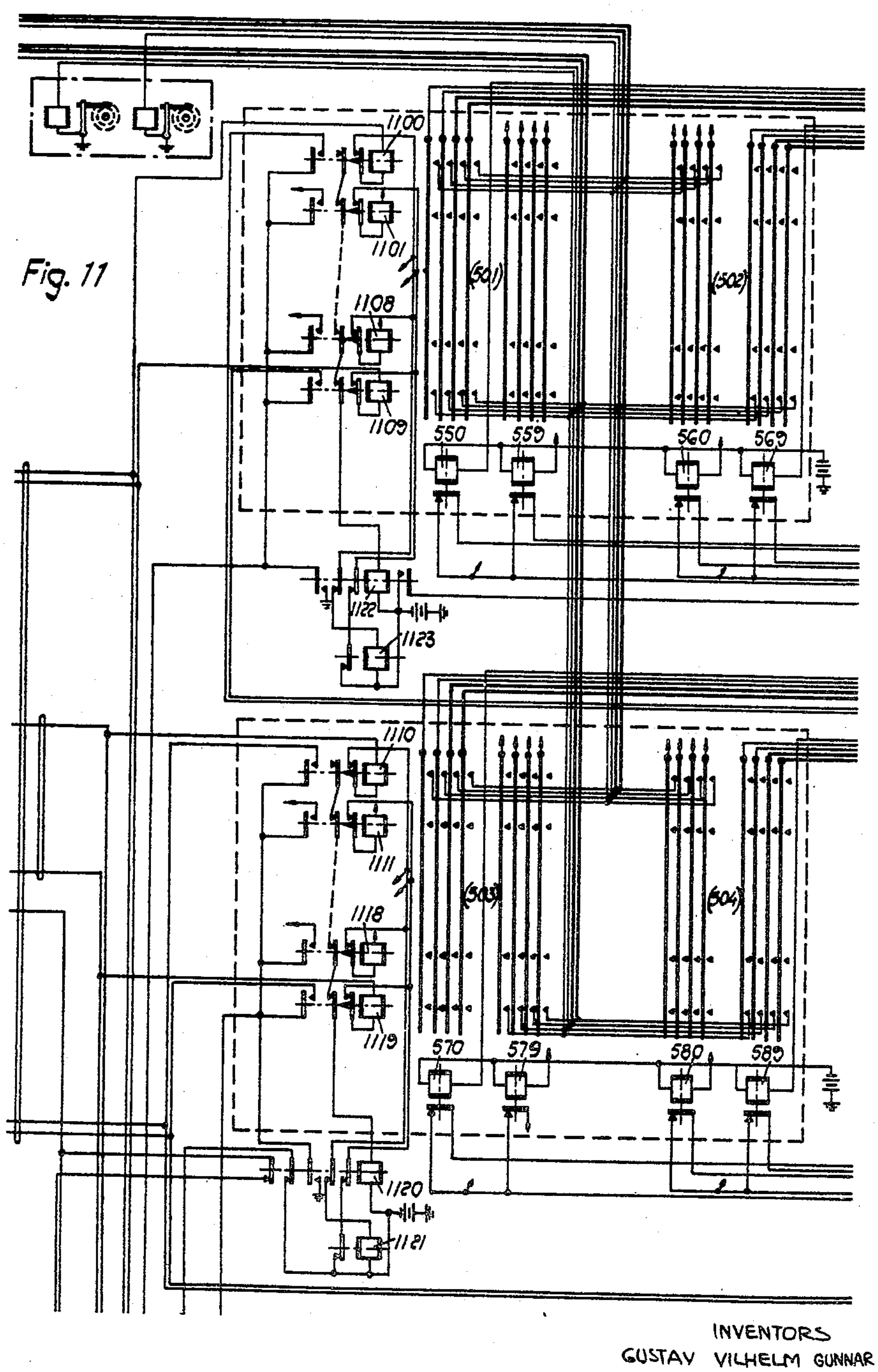
Figure 12:
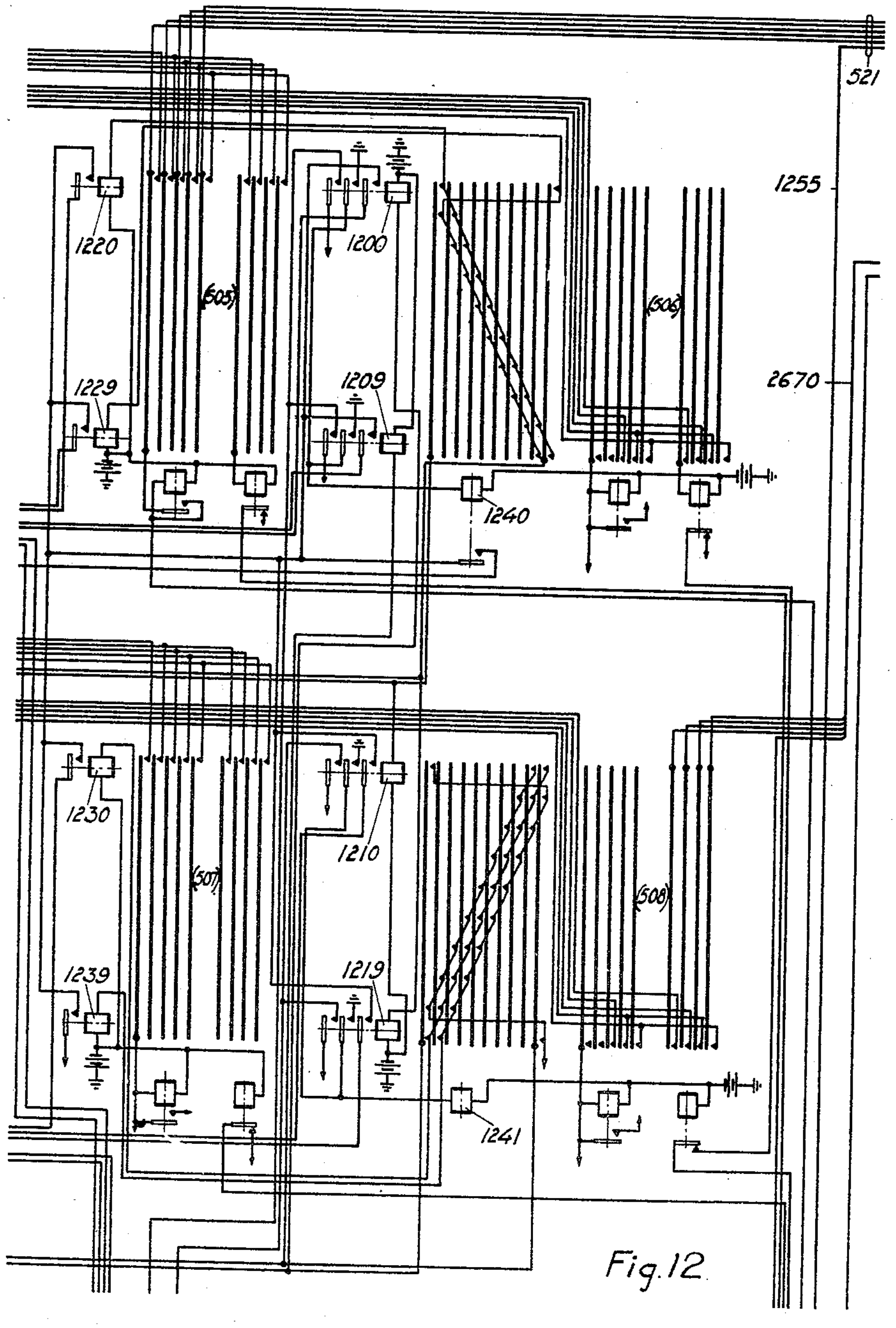

Figs. 11 and 12 show an alternative arrangement of a set of line finders and final selectors provided with a device for shifting or distributing subscribers' lines according to a numbering scheme very favourable for subscribers having unevenly distributed traffic load. Thus Figs. 11 and 12 can take the place of Figs. 7 and 8.

Figure 1:
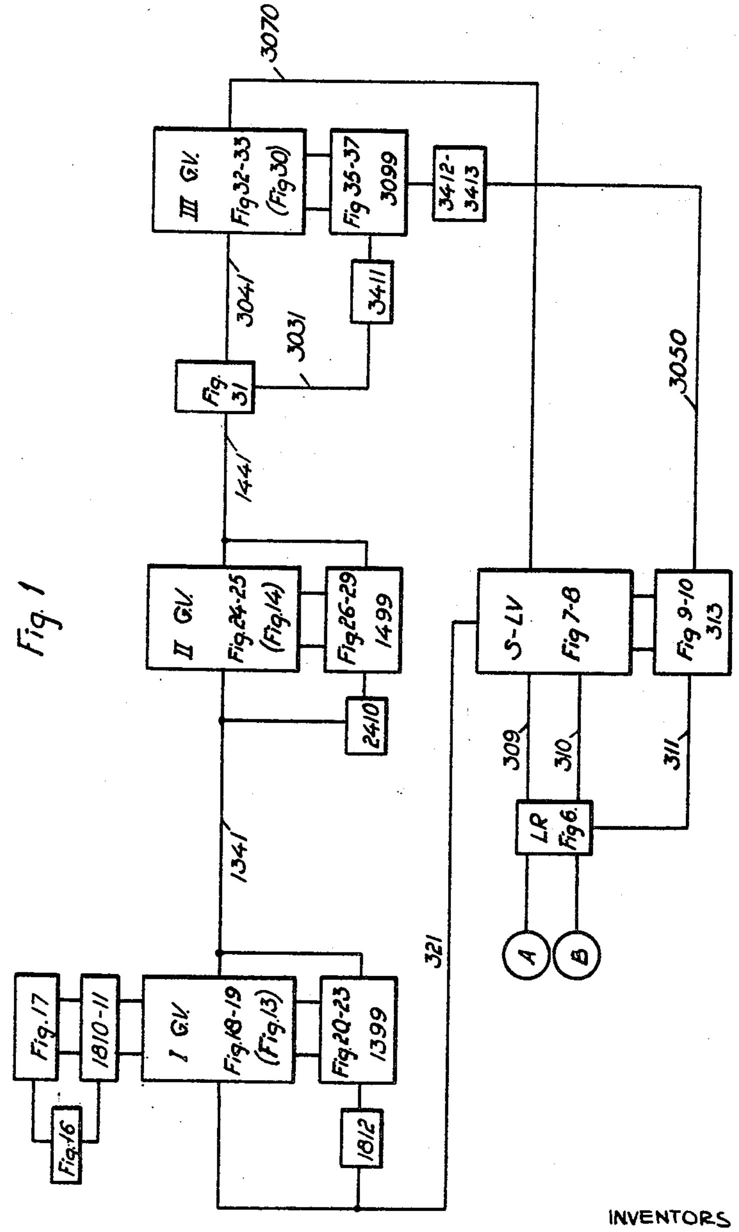
Figure 13:
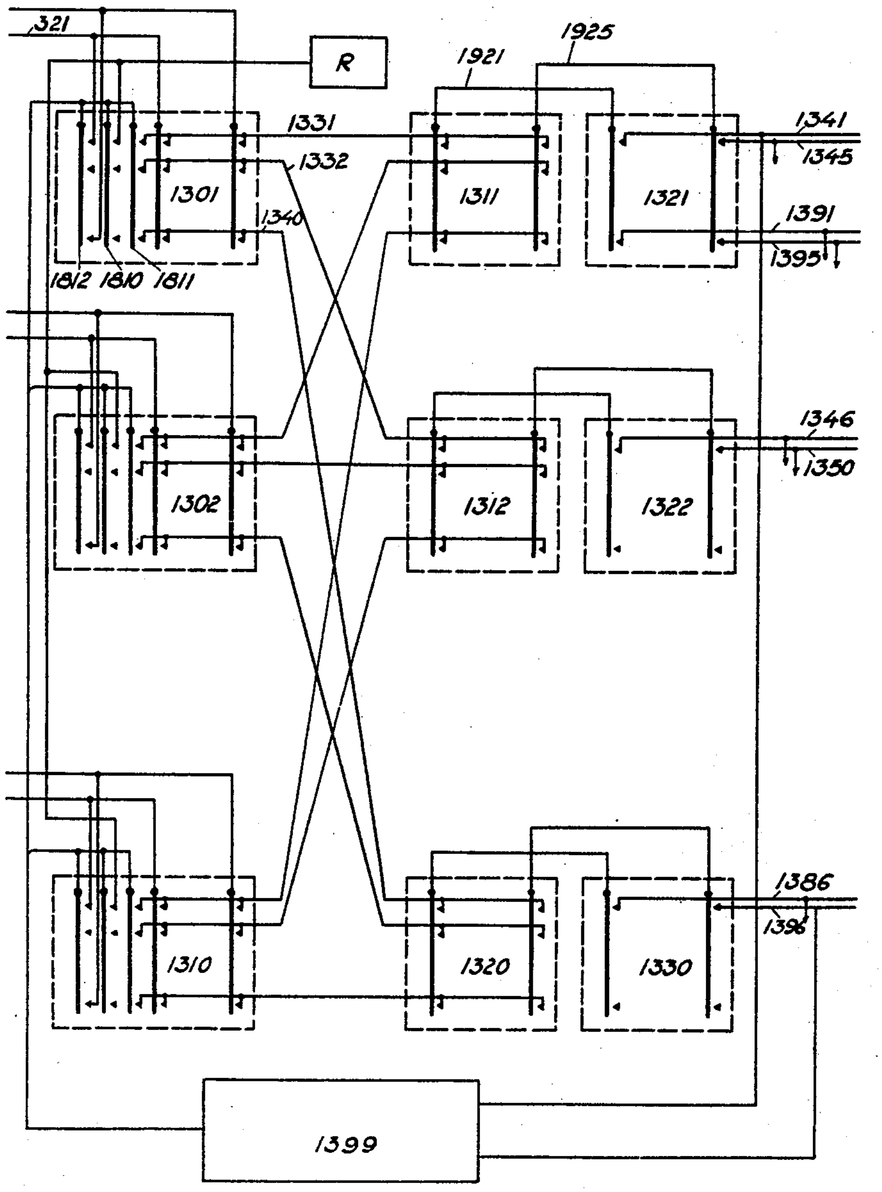
Figure 14:
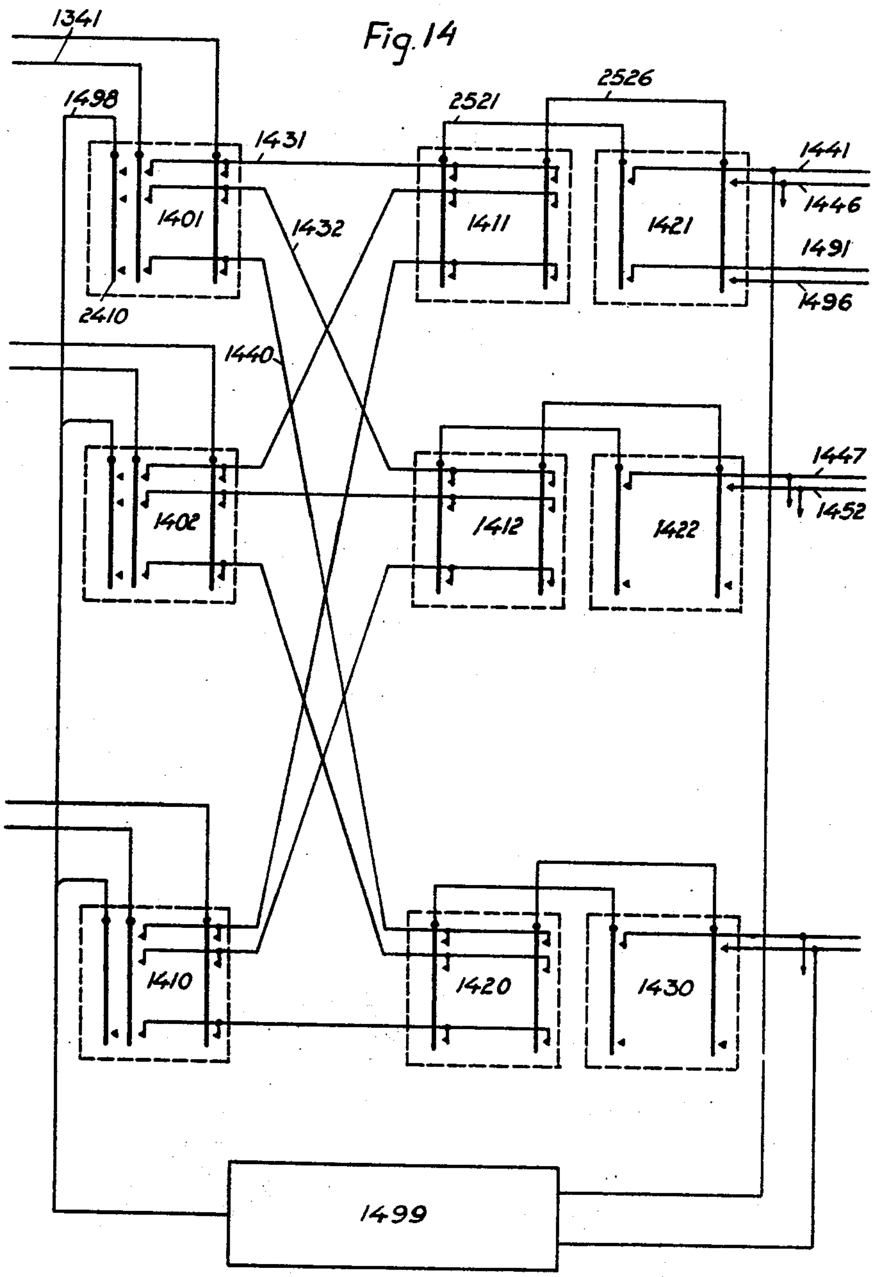

Figs. 13 and 14 show in a simplified schematic form an arrangement of a plurality of groups of switches respectively in sets of first and second group selectors (IGV and IIGV of Fig. 1).

Figure 15:
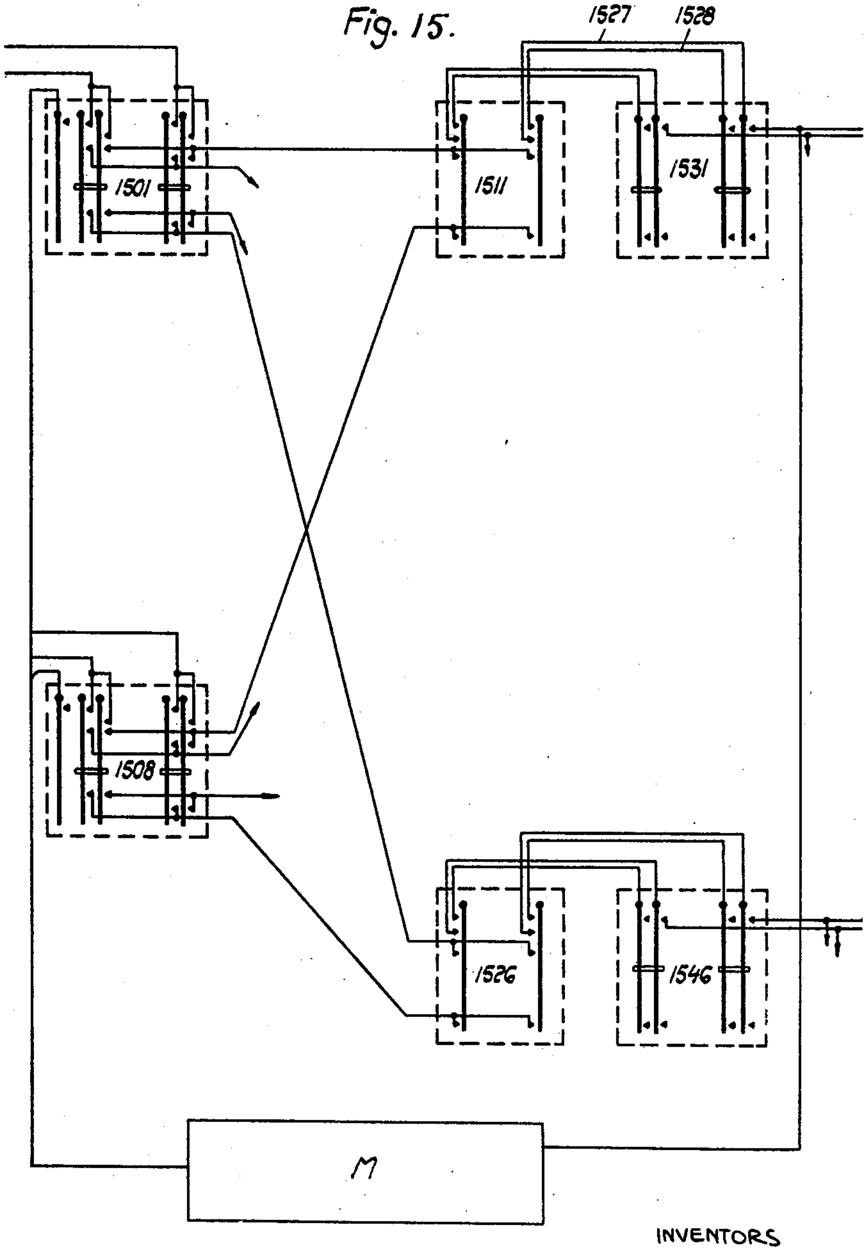

Fig. 15 shows in a simplified schematic form an alternative arrangement of a plurality of groups of switches in a set of second group selectors, in which the numerical capacity has been doubled by means of certain switches having been arranged to make two alternative connections in each position.

Figs. 16–23 show an embodiment of a set of switches in a first group selectors with register finder and auxiliary hold magnet for switching to registers (Fig. 17), a controller or marker (Figs. 20–23) and selecting device coupled thereto.

Figs. 24–29 show an embodiment of a set of second group selectors with its controller (Figs. 26–29) and selecting device.

Figure 30:
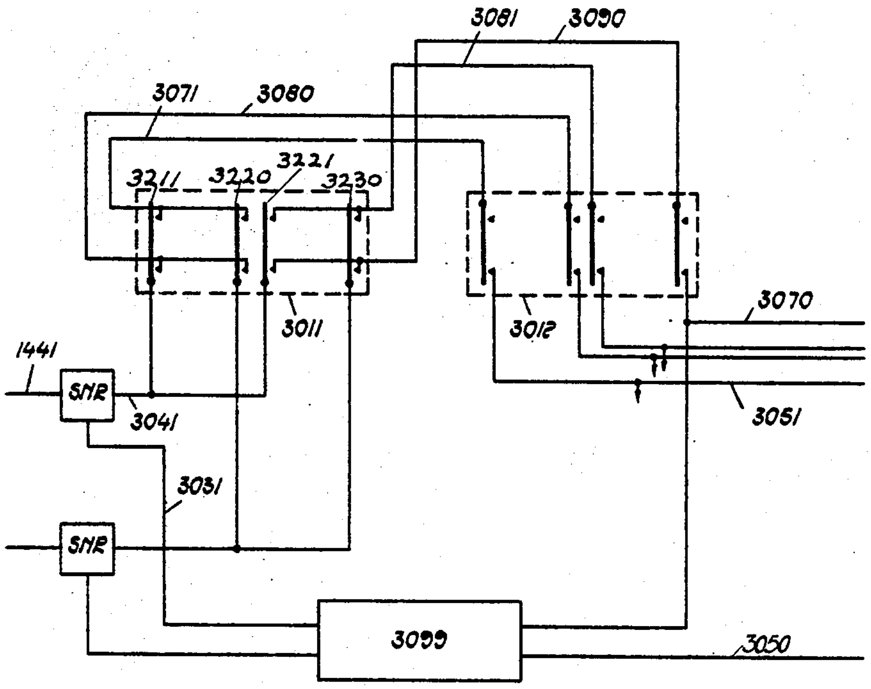

Fig. 30 shows in a simplified schematic form an embodiment of a plurality of groups of switches in a set of third or last group selectors, particularly for small exchanges, where only one set of group selectors is needed.

Figure 31:
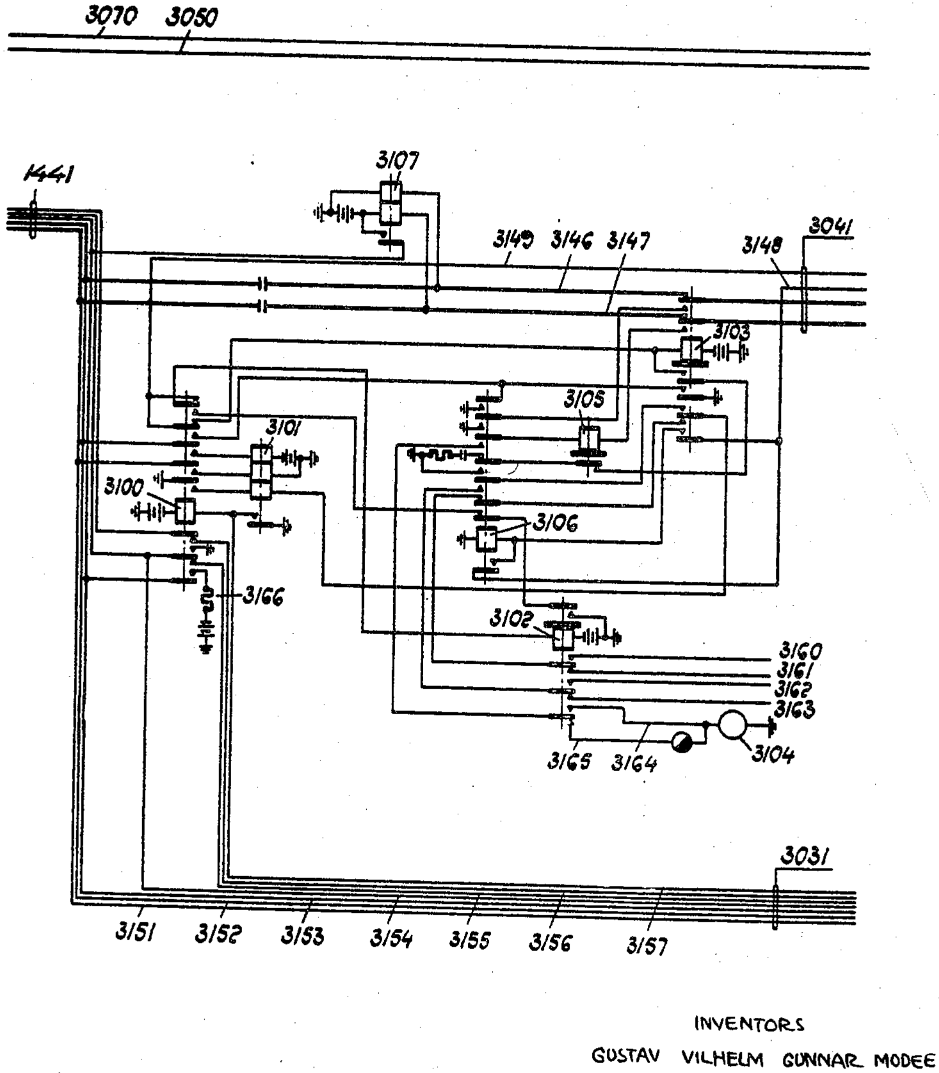

Fig. 31 shows an embodiment of a current feed device associated with junctors between the second and third group selectors.

Figs. 32–37 show an embodiment of a set of third group selectors (IIIGV) whereby Figs. 34–37 show its controller and its selecting devices.

Figure 37:
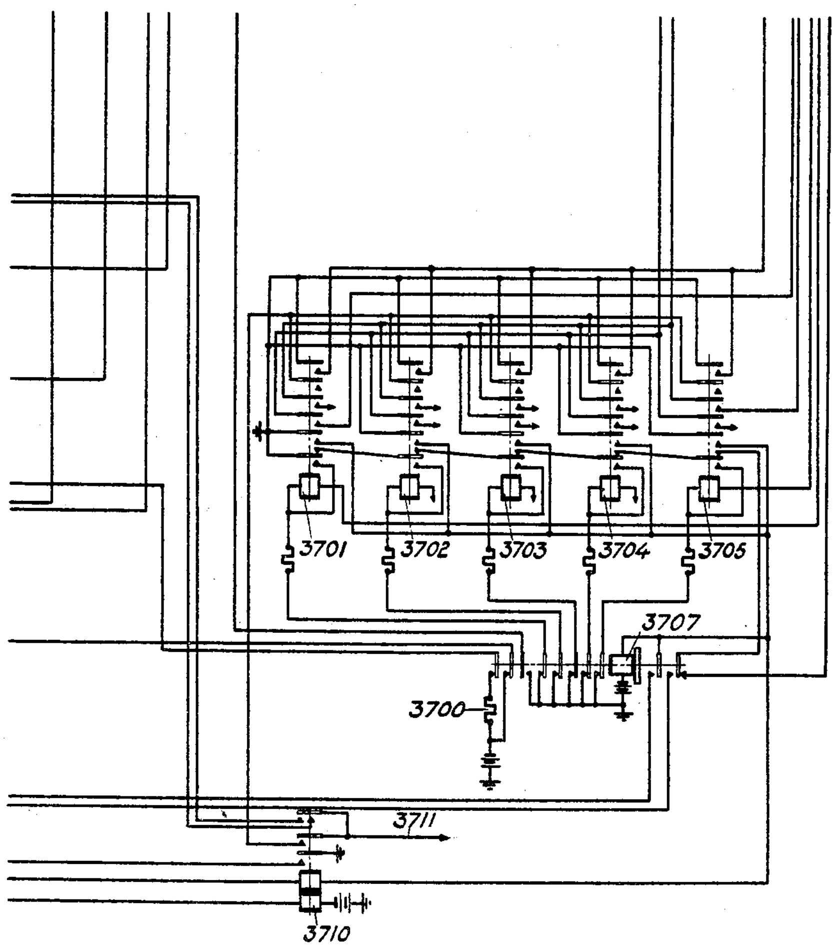
Figure 38:
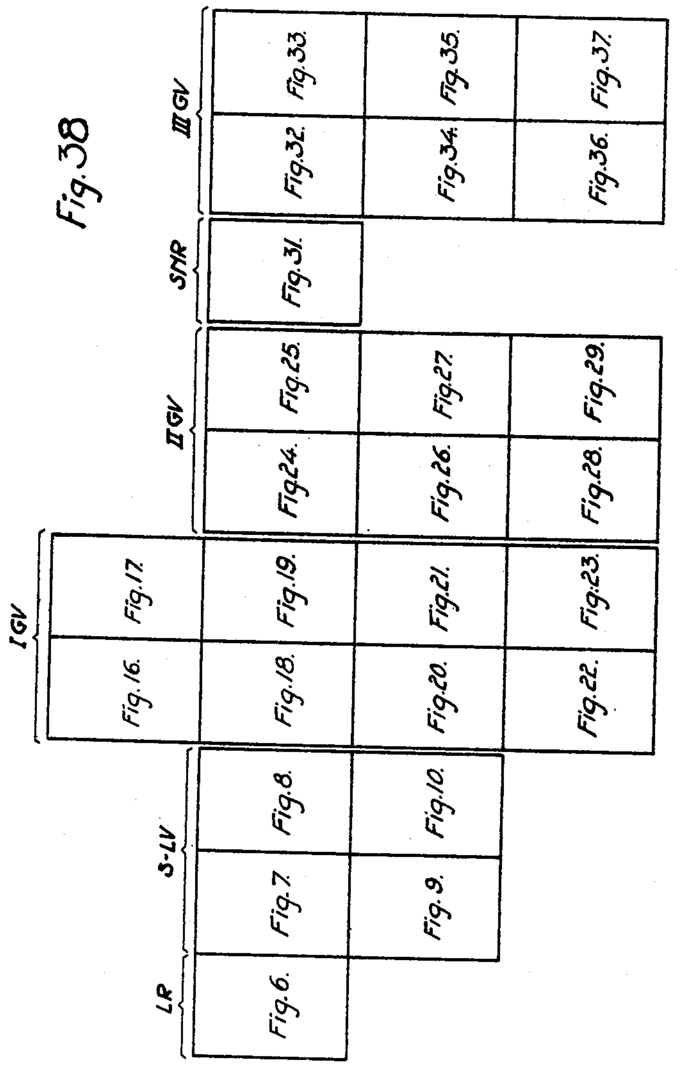

Fig. 38 shows the manner in which Figs. 6–10, 16–23, 24–29 and 31–37 are to be arranged.

Figure 39:
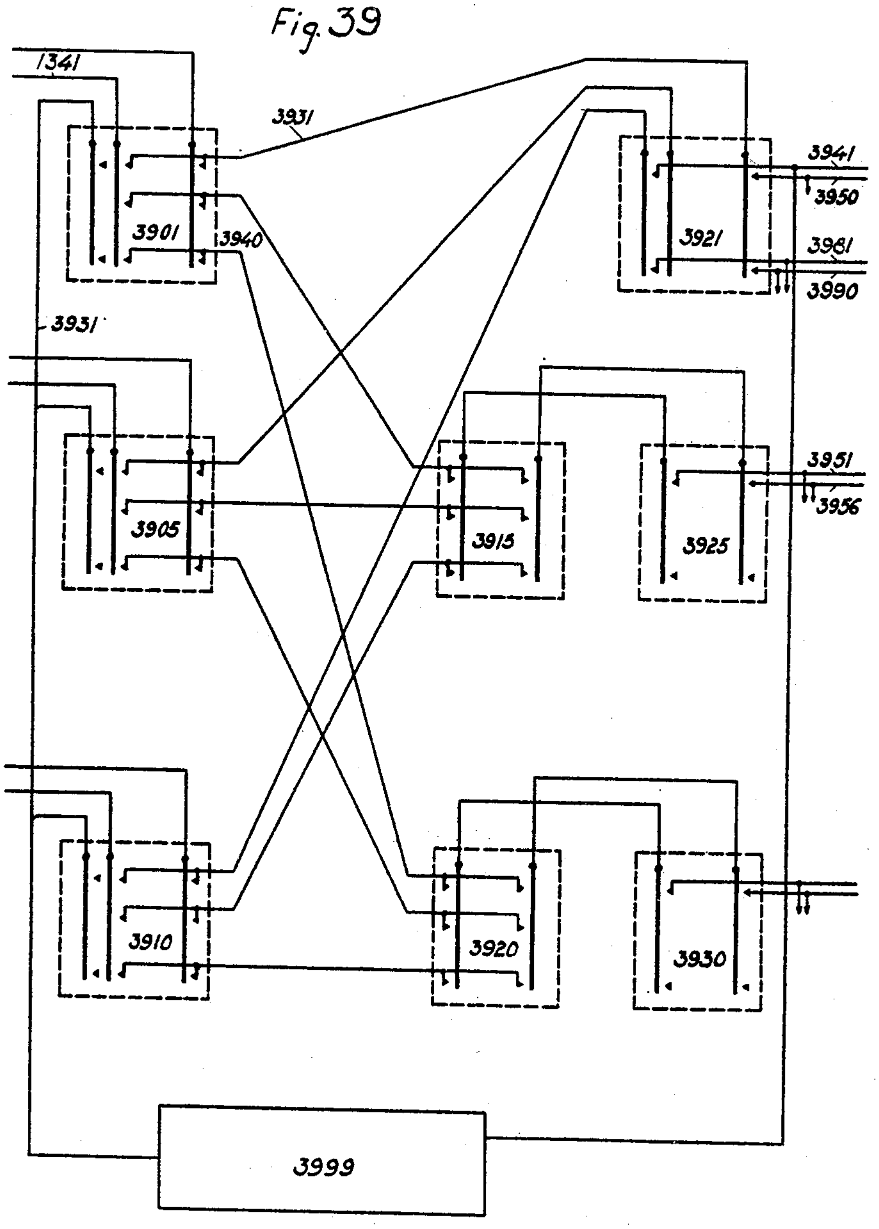

Fig. 39 shows in a simplified schematic form an alternative arrangement of switches in a set of group selectors, in which an economic arrangement of overflow traffic is obtained by using groups of switches arranged in two and three groups in the same set of selectors.

Figure 6:
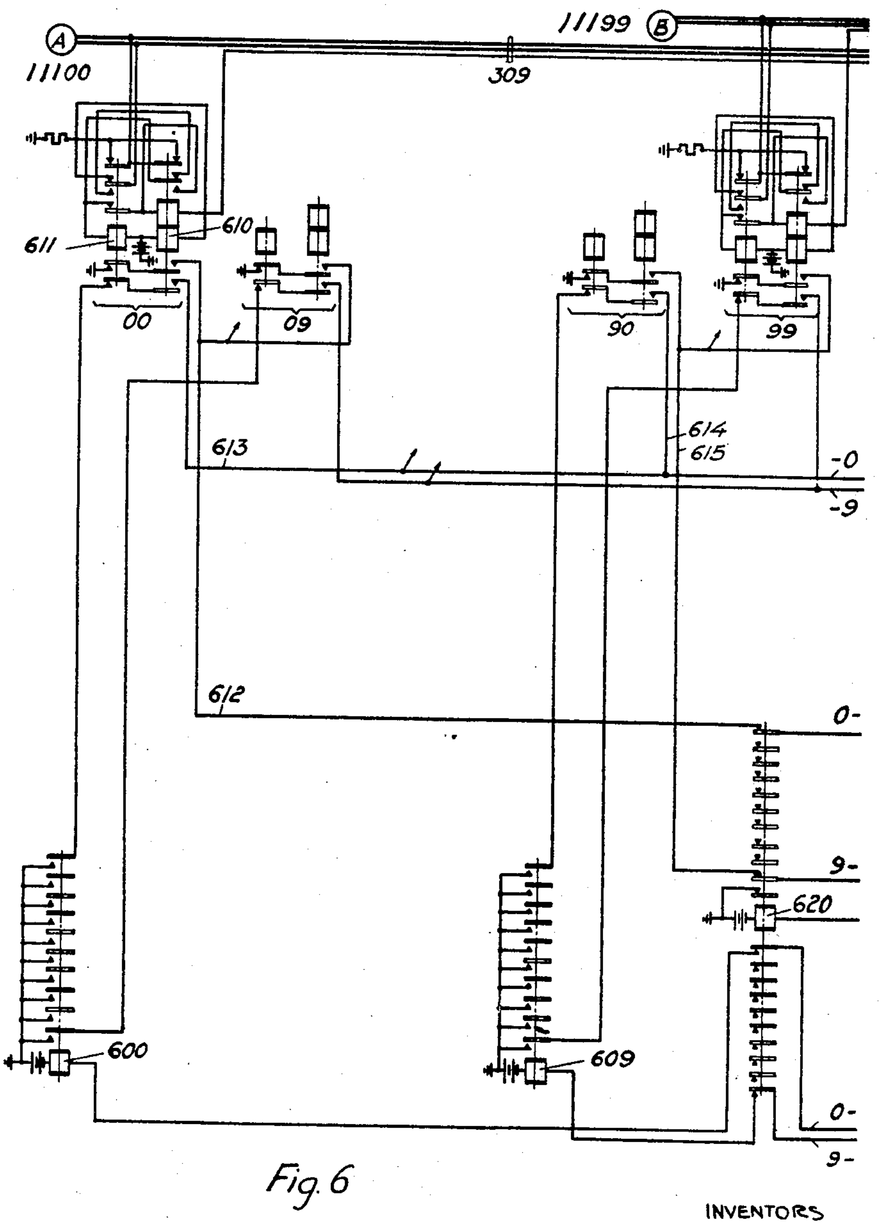
Fig. 6 shows an arrangement of a set of line relays for 100 subscribers.
Figure 40:
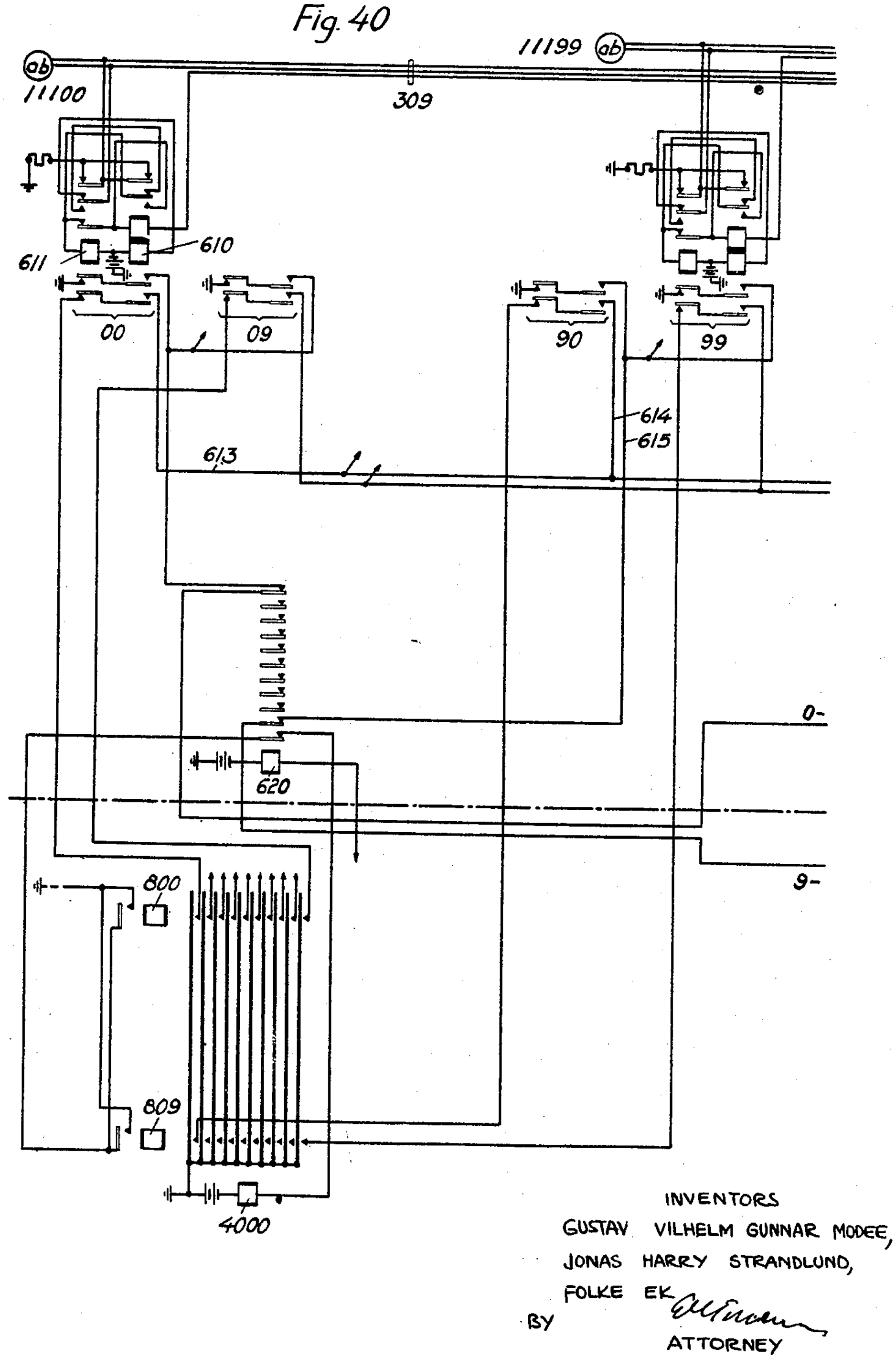

Fig. 40 shows a modification of the set of line relays shown in Fig. 6, whereby a single hold magnet in the set of line finders and final selectors (Figs. 7–8) can replace the ten 10-digit relays shown in Fig. 6.

Figure 41:
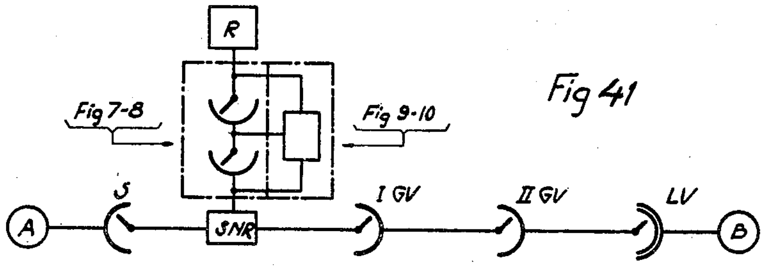

Fig. 41 makes up a diagrammatic showing of elements of a known, for example rotary or a step-by-step telephone system, in which a set of line finders and final selectors according to the present invention (Figs. 3*a*, 7–8, 11–12, 9–10) can be used as a register finder.

Figure 42:
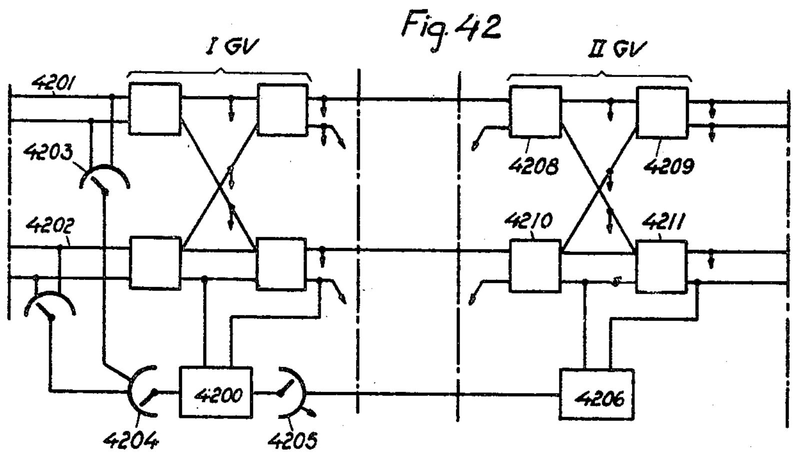

Fig. 42 makes up a diagrammatic showing of elements of two successive group selectors, for example first and second group selectors, whereby the controller of the two successive group selectors are so arranged that they only connect such outgoing lines from the first group selector, which can reach a line outgoing from the second group selector.

Figure 43:
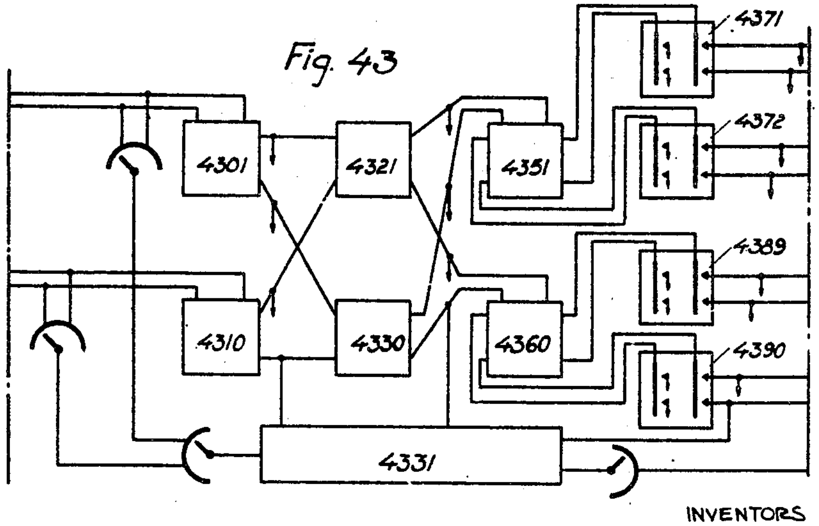

Fig. 43 is another embodiment of a set of group selectors provided with four groups of switches.

Figure 44:
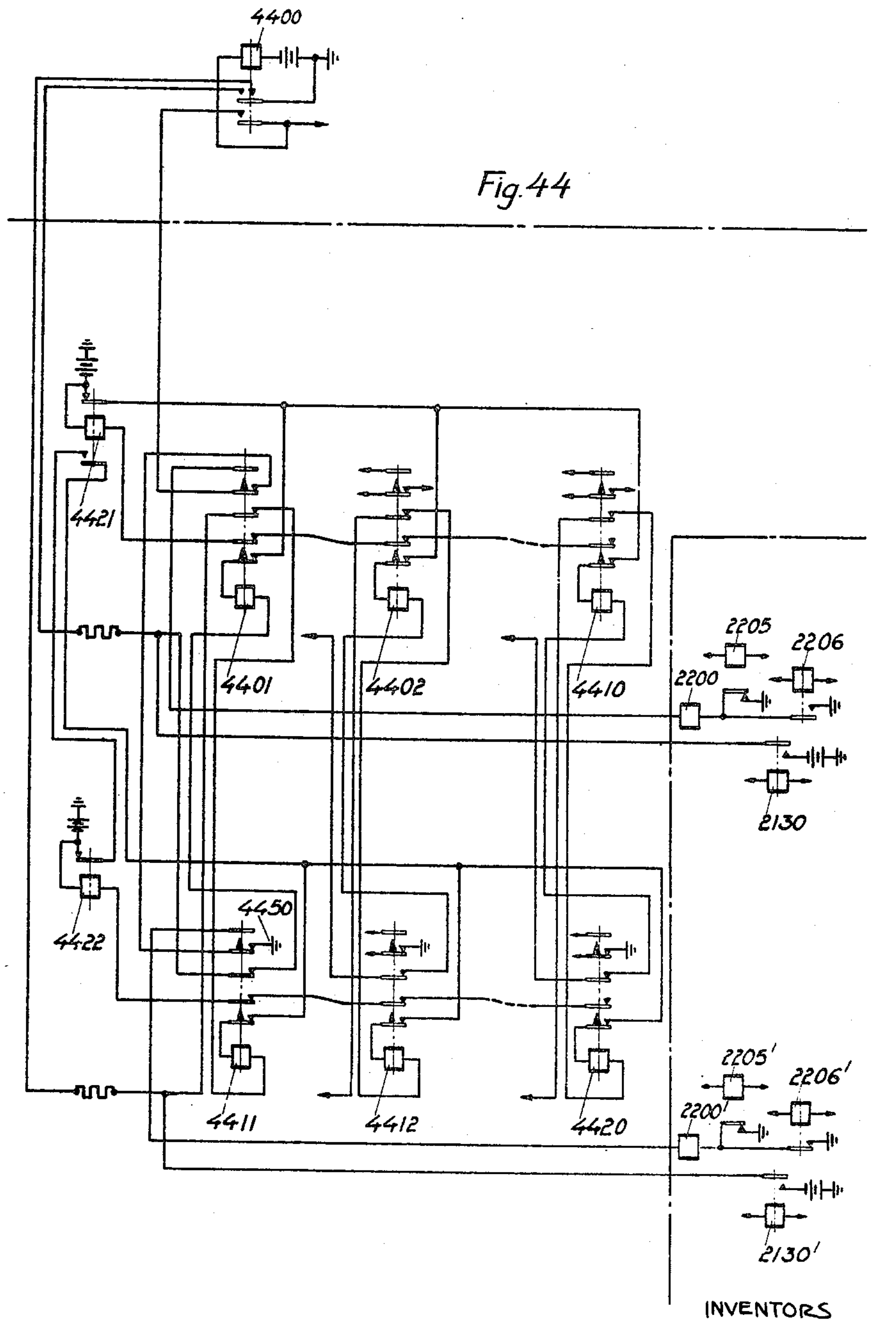

Fig. 44 shows in schematic form how a set of group selectors can be provided with two common controls.

Figure 45:
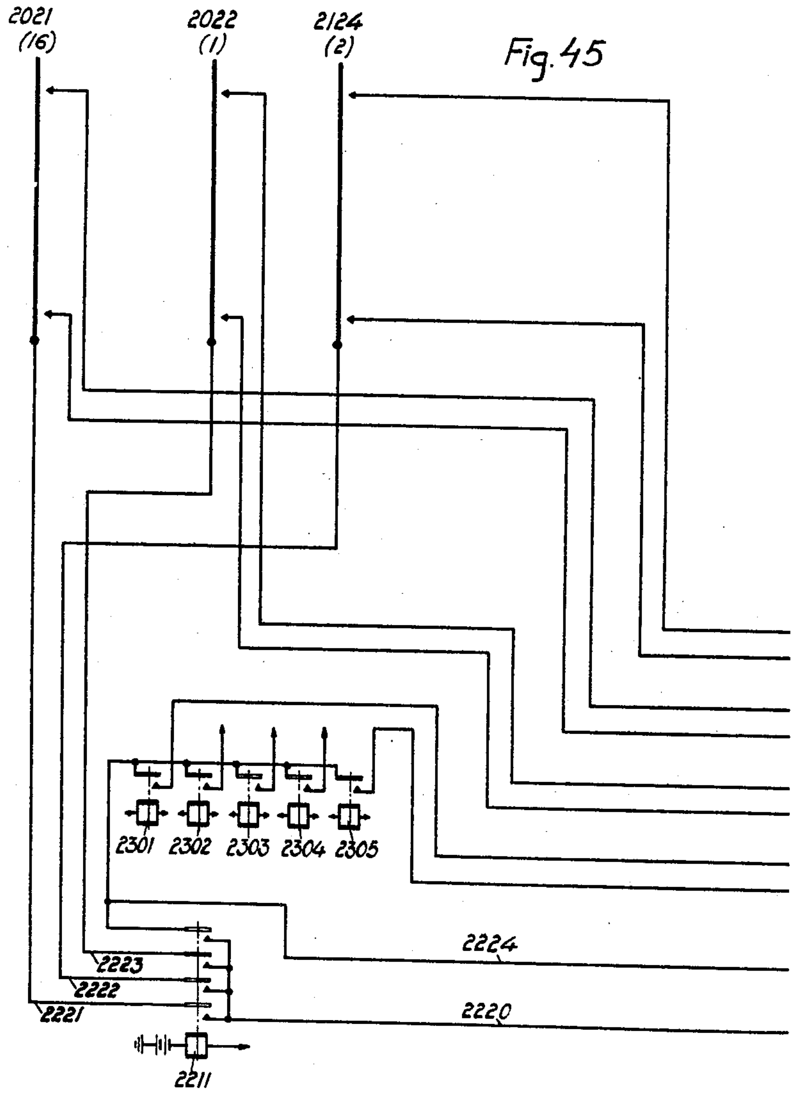
Figure 46:
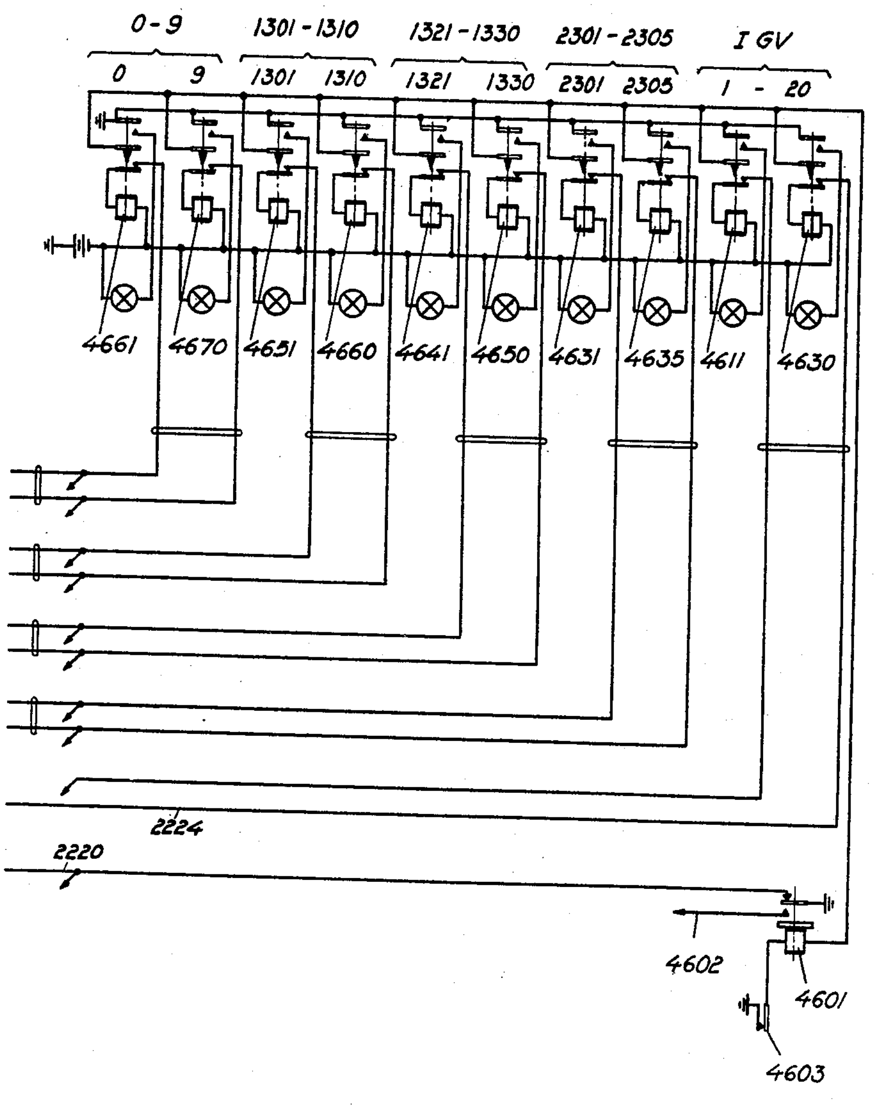

Figs. 45–46 show an out-of-order marking device, which in the shown embodiment relates to a set of first group selectors.

Figures 47A, 47B:
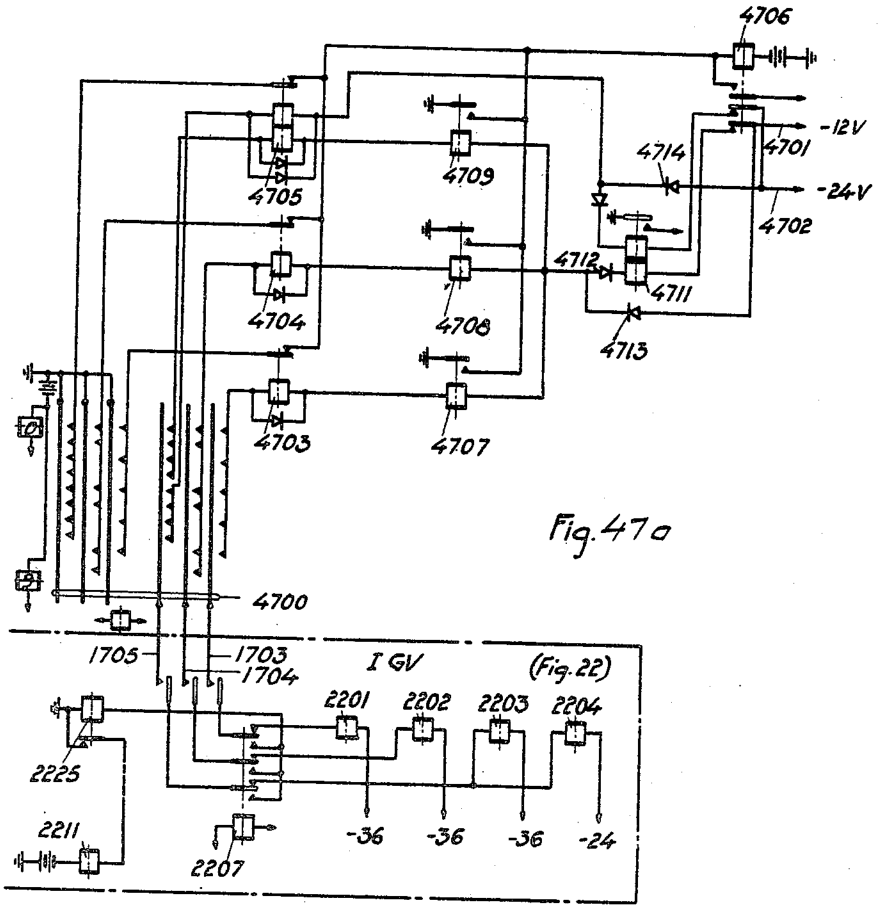

Fig. 47*a* diagrammatically shows how part of a register receives signals to indicate that a renewed combination of pulses should be transmitted, and also how a register determines whether talking and message register wires are in order.

Fig. 47*b* shows pulse combinations possible, for example in a set of combination relays belonging to a set of first group selectors.

Figure 2:
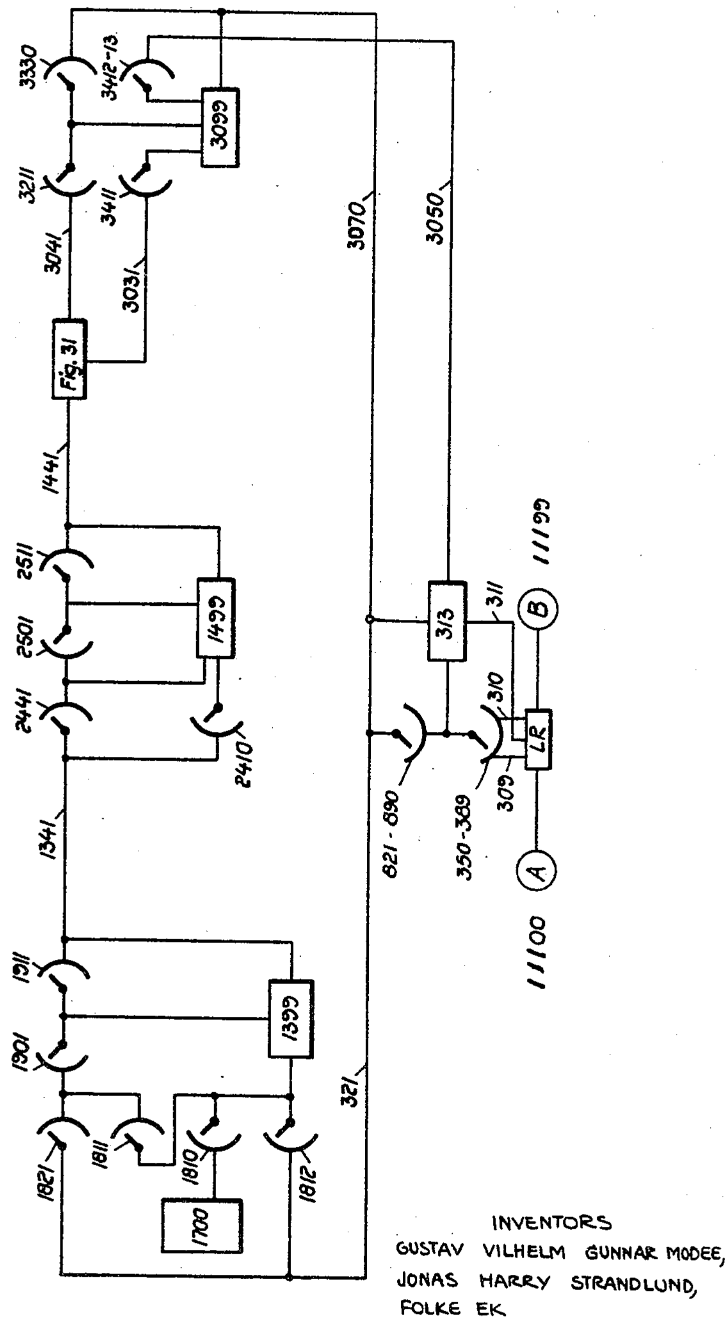

In Fig. 1 and Fig. 2 there are shown line finders and final selectors SLV, first group selectors IGV, second group selectors IIGV, and third group selectors IIIGV. In the sets of switches illustrated there are marked within respective blocks (Fig. 1) the corresponding figure numbers of the simplified schematic drawings and also the figure numbers of embodiments of the invention herein described.

From a group of 100 subscribers' lines to the corresponding set of line finders and final selectors SLV there are shown only lines 309 and 310 (Fig. 6), which are supposed to correspond to an A- and a B-subscriber having numbers 11100 and 11199 respectively.

The set of line finders and final selectors takes care of outgoing calls from an A-subscriber, so that by means of his line relay he will be switched to an idle first group selector. Necessary control signals for said purpose will be carried over circuit 311.

Figures 3A, 3B:
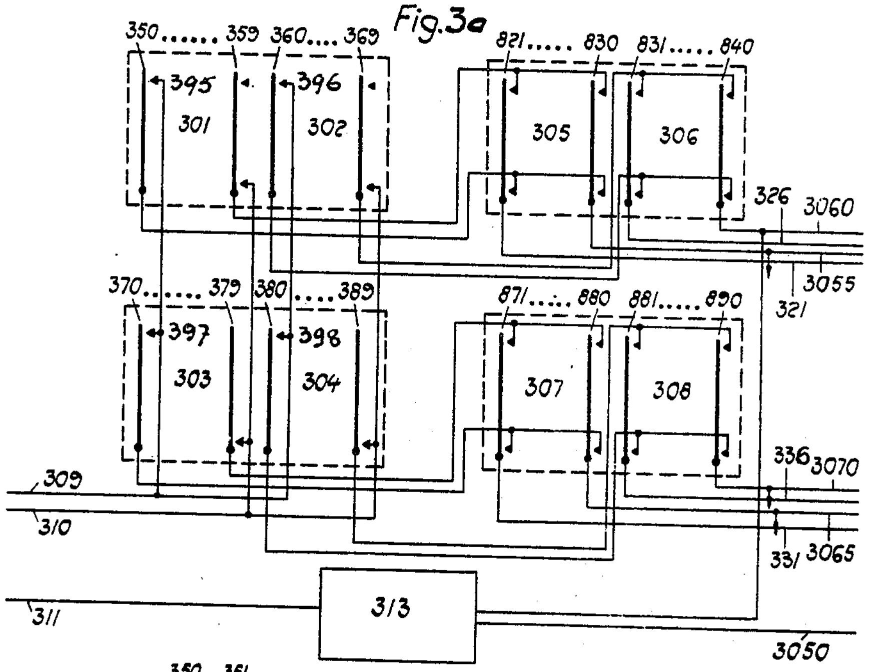
Figure 7:
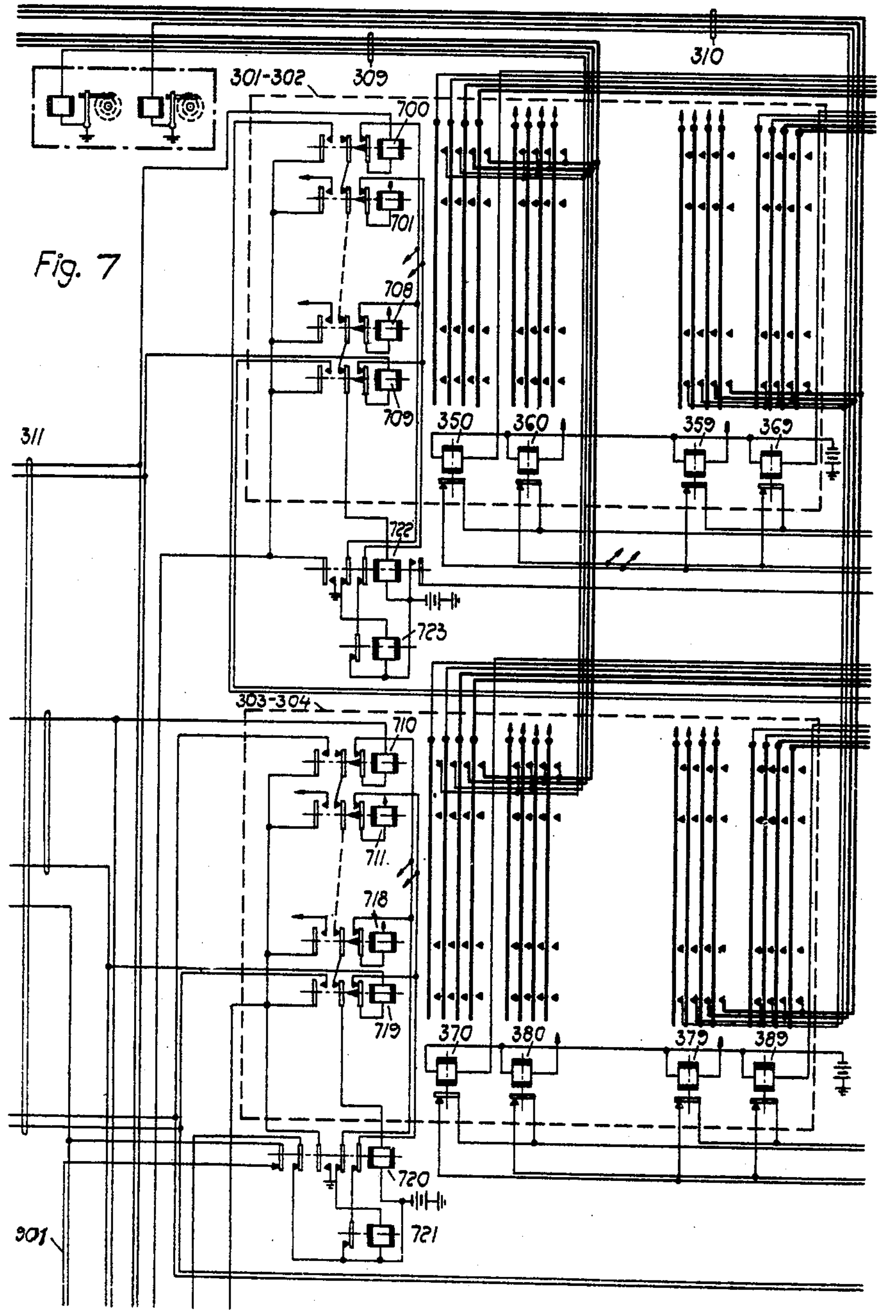
Figs. 7–10 show an embodiment of a set of line finders and final selectors comprising a controller arranged according to Figs. 3*a* and 3*b*.
Figure 8:
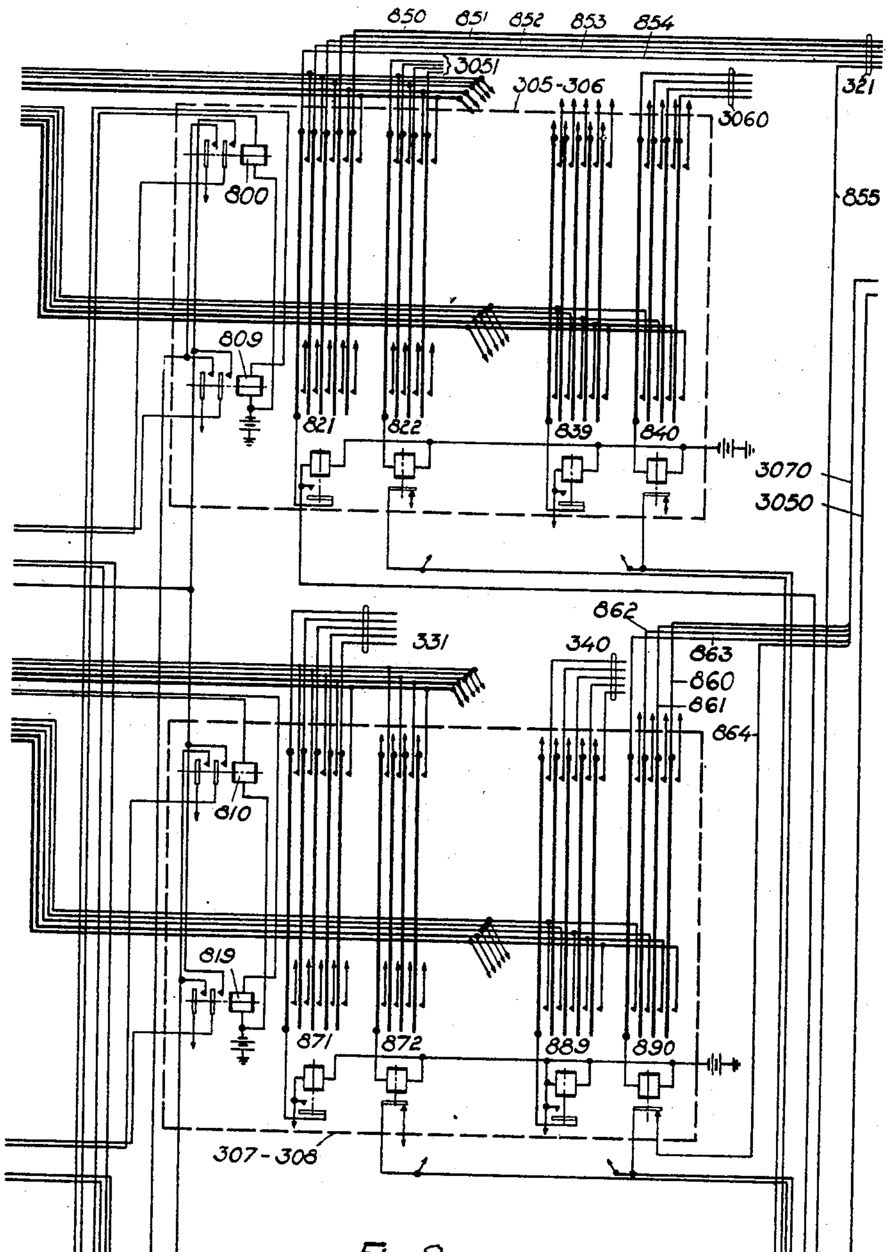

Calls to a called subscriber will be switched by means of a set of switches in the last group selectors to the desired B-subscriber, whereby the necessary control signals will be transmitted over circuit 3050 to a controller or marker 313 (Fig. 9–10) coupled to the set of line finders and final selectors (Fig. 3a, 7–8). Only one junctor 321 of 20 such circuits for outgoing traffic to a set of group selectors is shown, and only one junctor 3070 of 20 incoming junctors are shown in the drawing. A calling A-subscriber will be switched over an outgoing junctor 321, while a called B-subscriber will be connected over an incoming junctor 3070.

Figure 18:
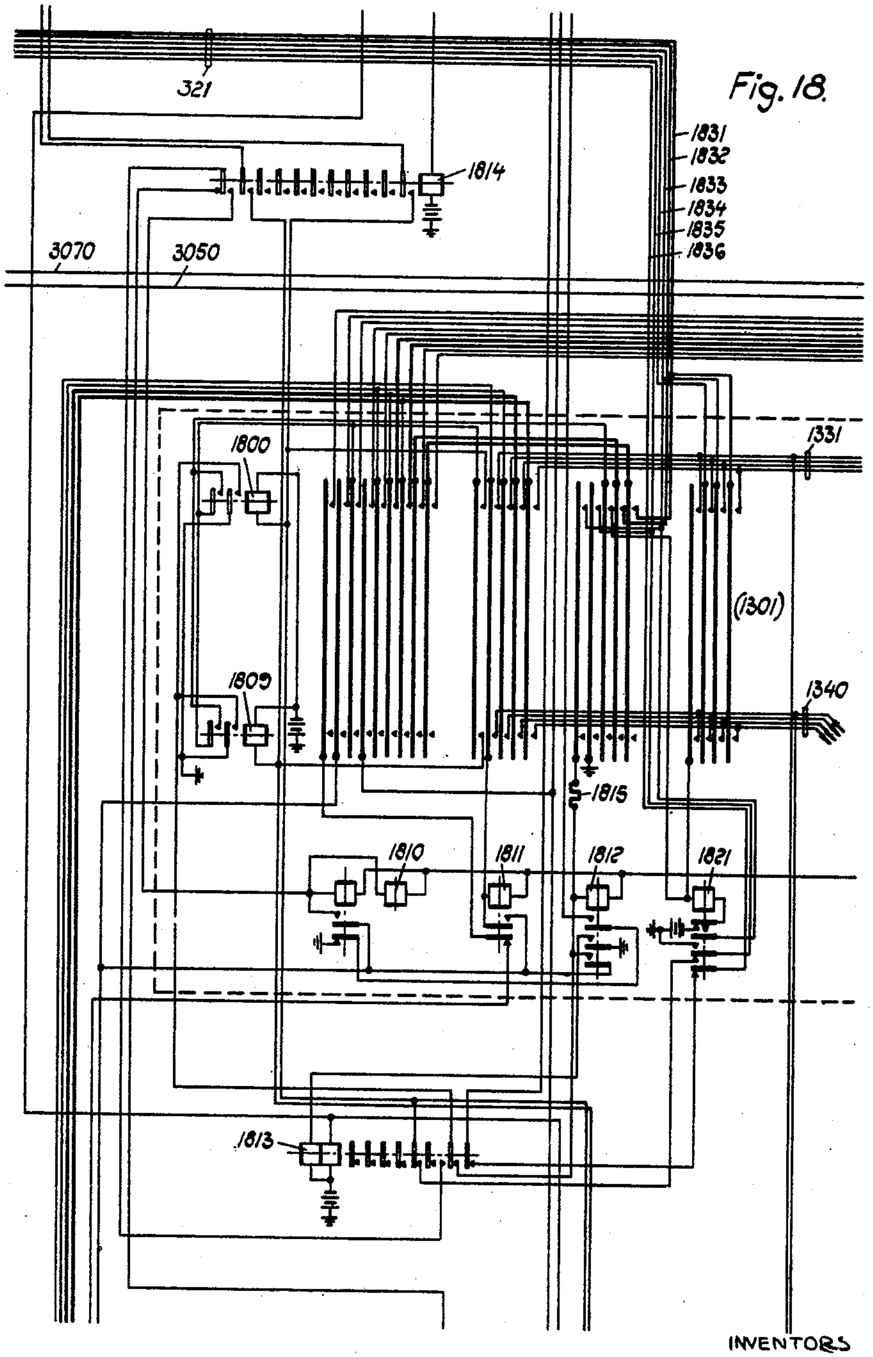
Figure 19:
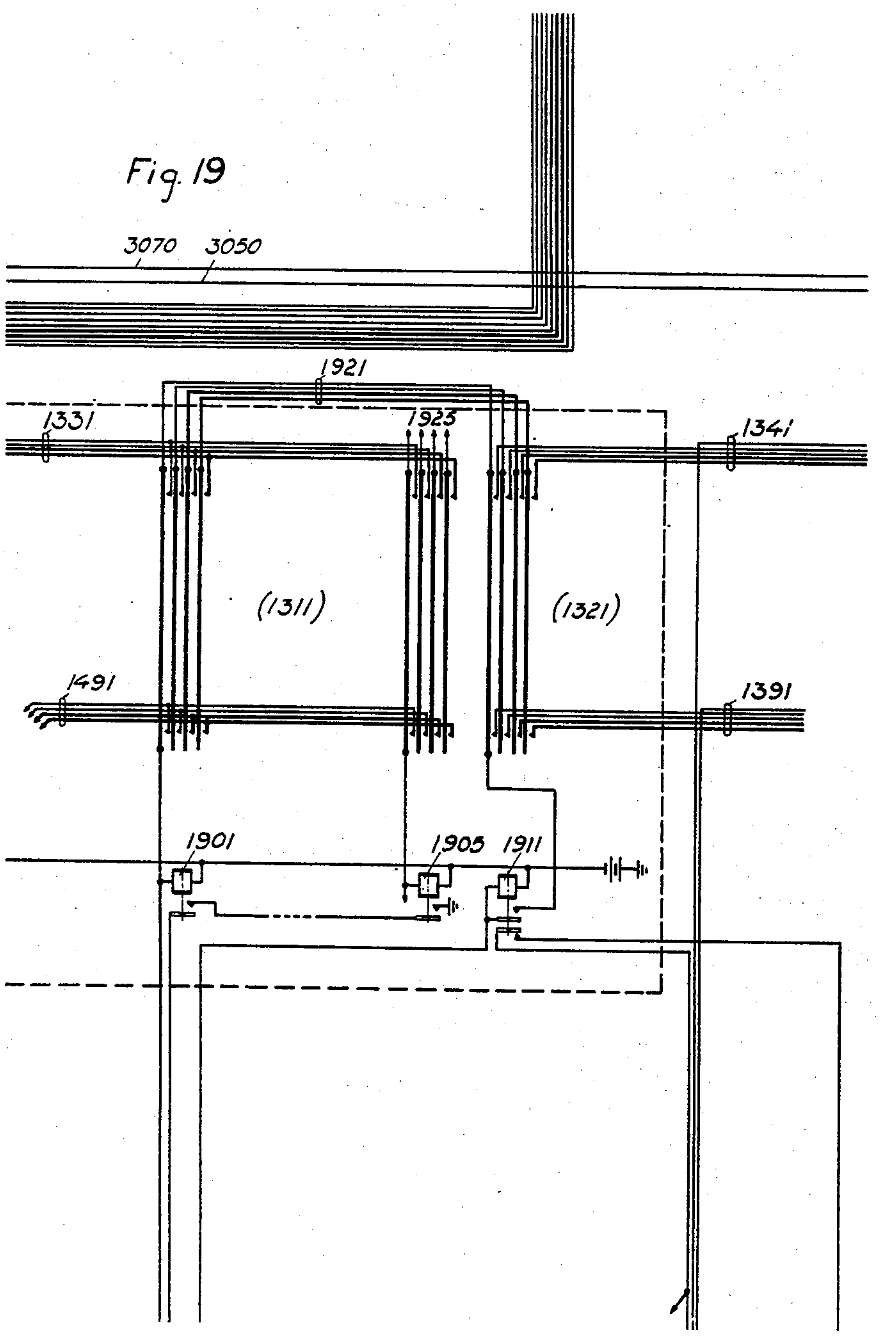

A great number of junctors are connected to each set of first selectors IGV (Figs. 13, 18–19).

Figure 16:
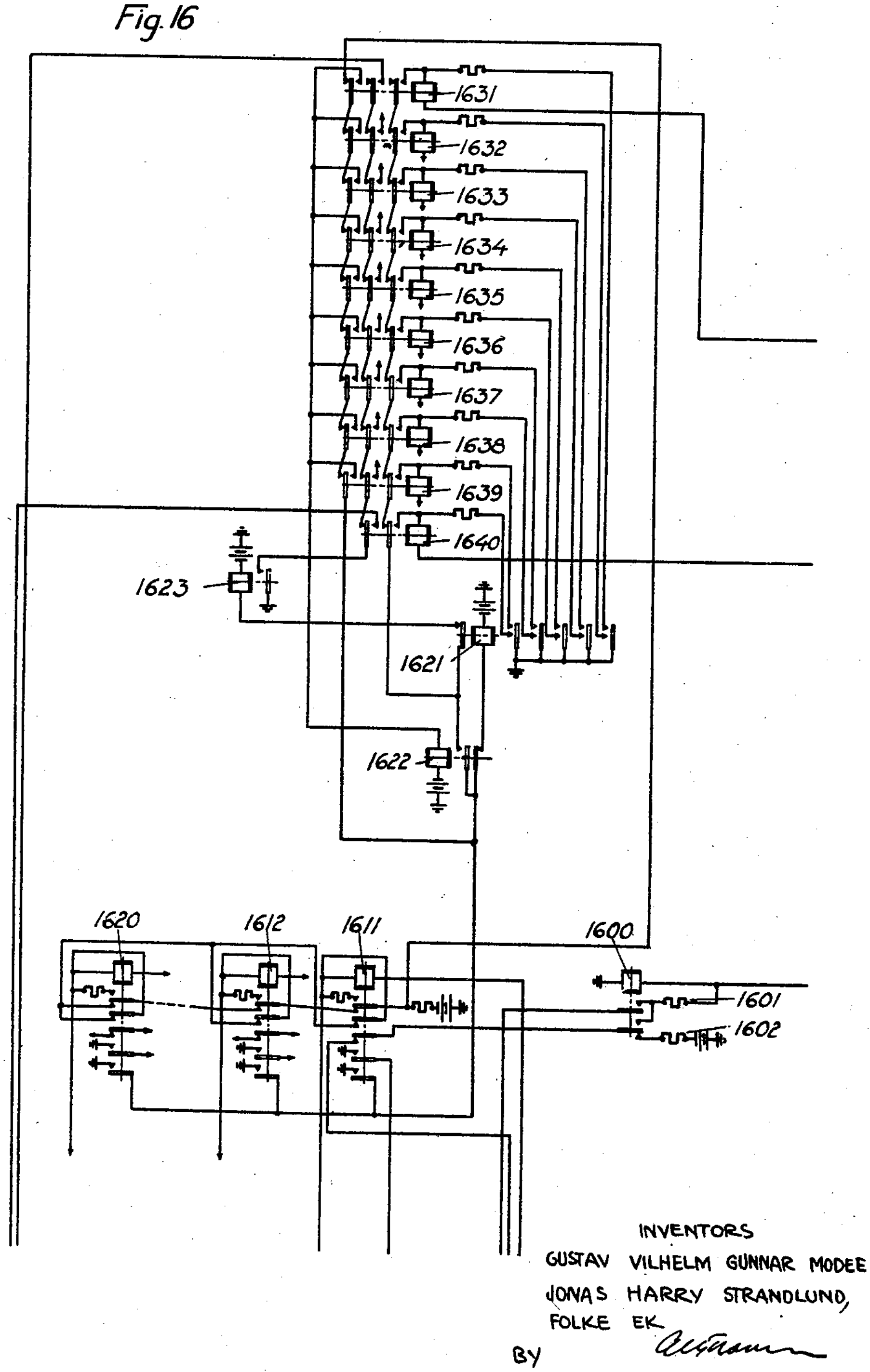

Certain switches of this set can operate also as register finders (1810, Fig. 18) for finding an idle register R, (Fig. 17) by the aid of auxiliary relays (Fig. 16). The set of first group selectors comprises a controller or marker 1399 for controlling connection to a set of second group selectors IIGV.

Junctors incoming to a set of first group selectors are arranged in a plurality of groups of junctors, which are so connected that only a minority of groups of junctors will be marked busy during the time that any of the controllers are busy. Incoming junctors belonging to a certain group of junctors will, however, be marked busy during all the time that any junctor within the group is connected to a register. It will therefore be necessary to distribute outgoing junctors from a certain set of line finders and final selectors so that, if possible, each junctor will be connected to a special group of junctors, which as far as possible should appear in different sets of first group selectors. By such an arrangement the advantage is obtained that outgoing traffic from a plurality of SLV sets of line finders and final selectors cannot be blocked by a faulty set of first group selectors. From the rank of first group selectors there is shown only one junctor 1341, which leads to the rank of the second group selectors.

Figure 24:
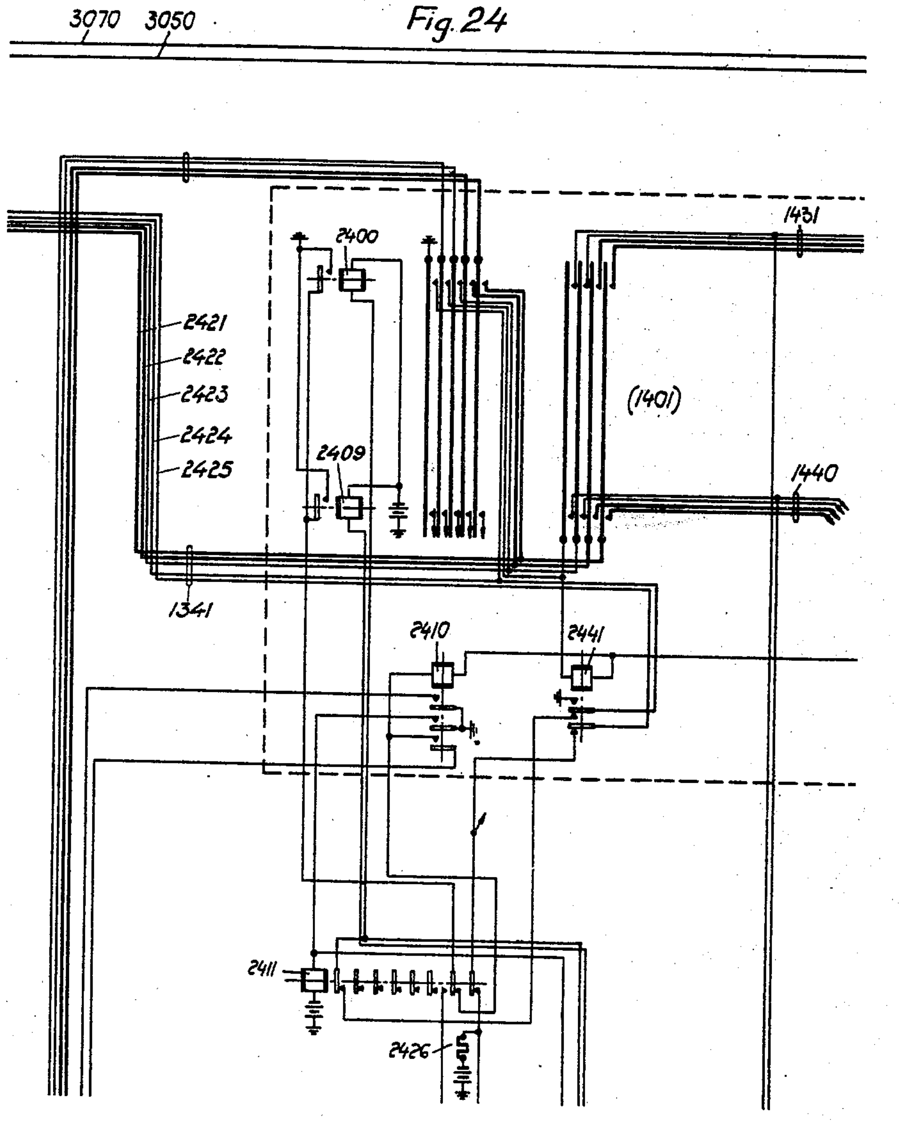
Figure 25:
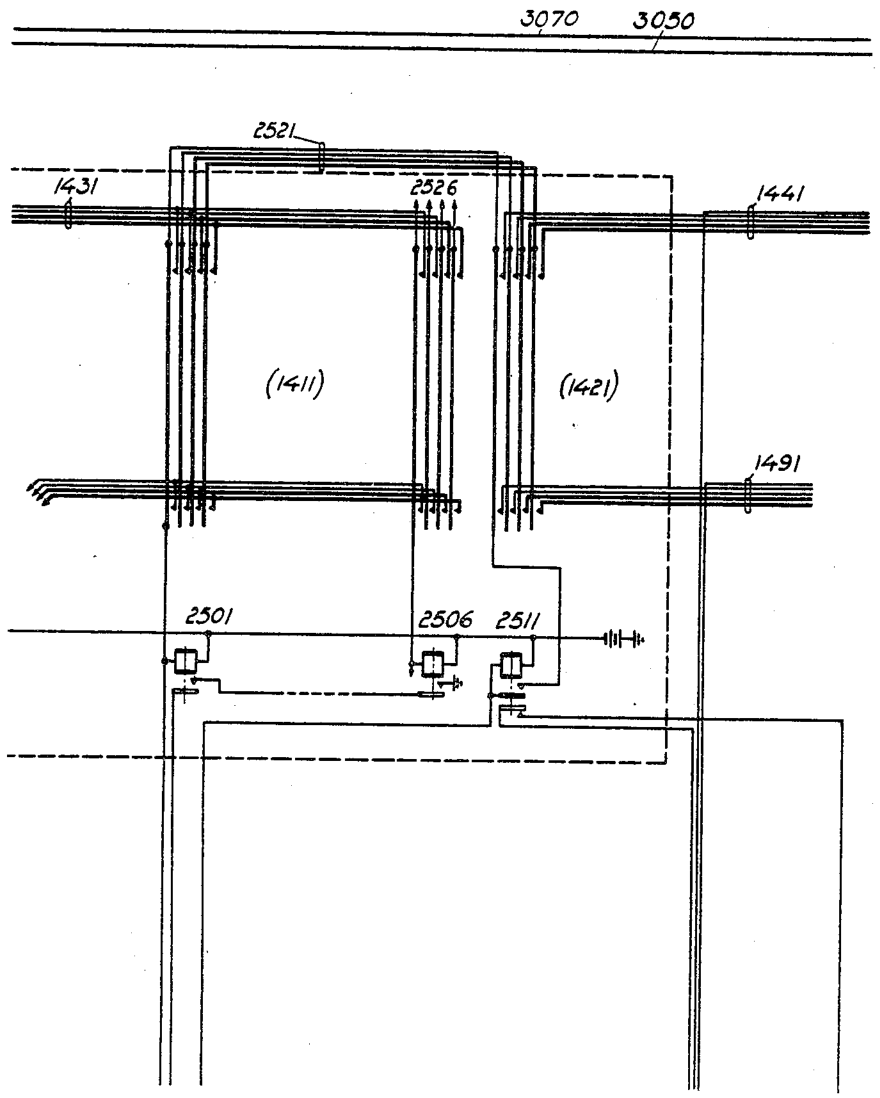
Figure 26:
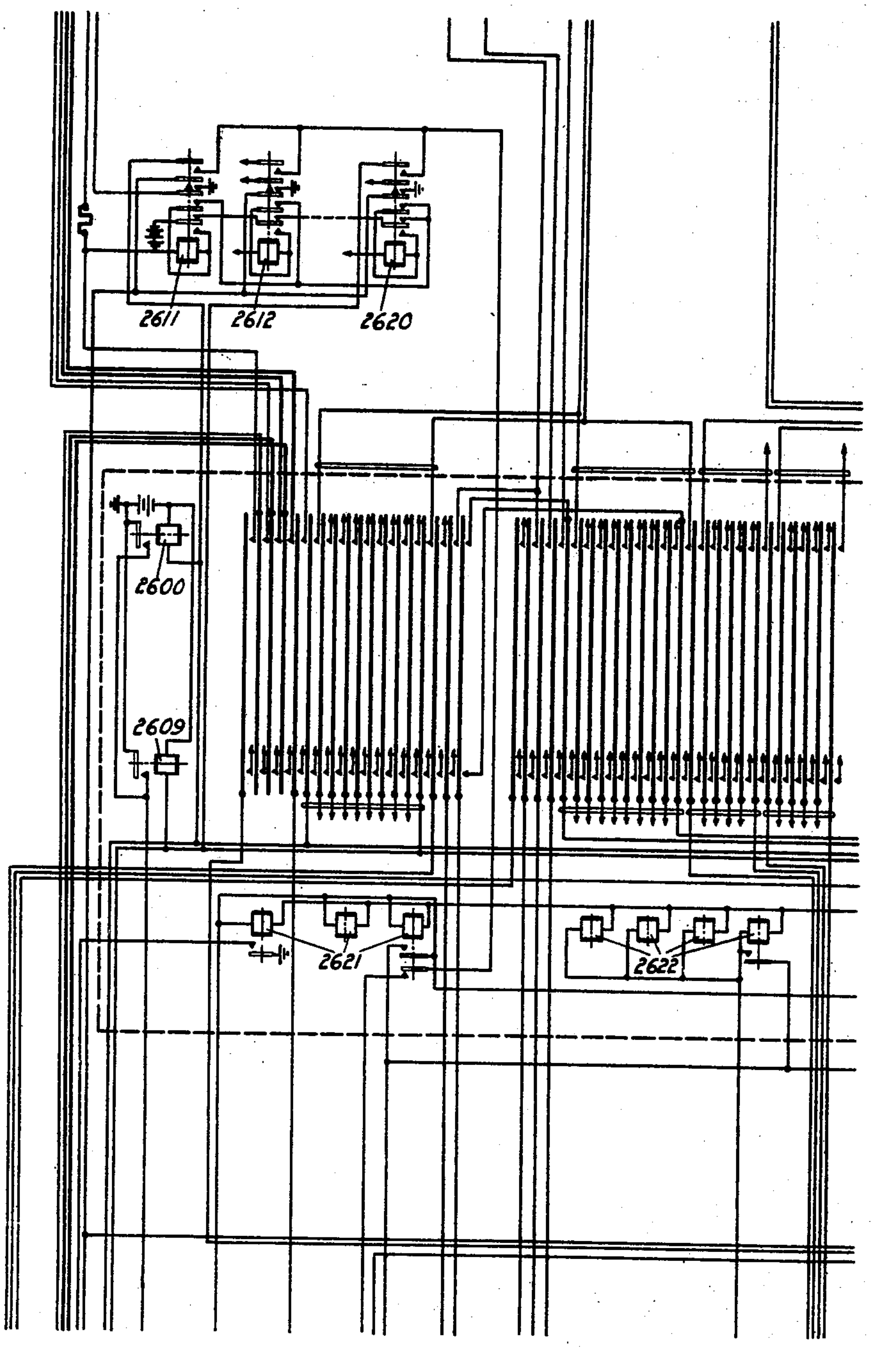
Figure 27:
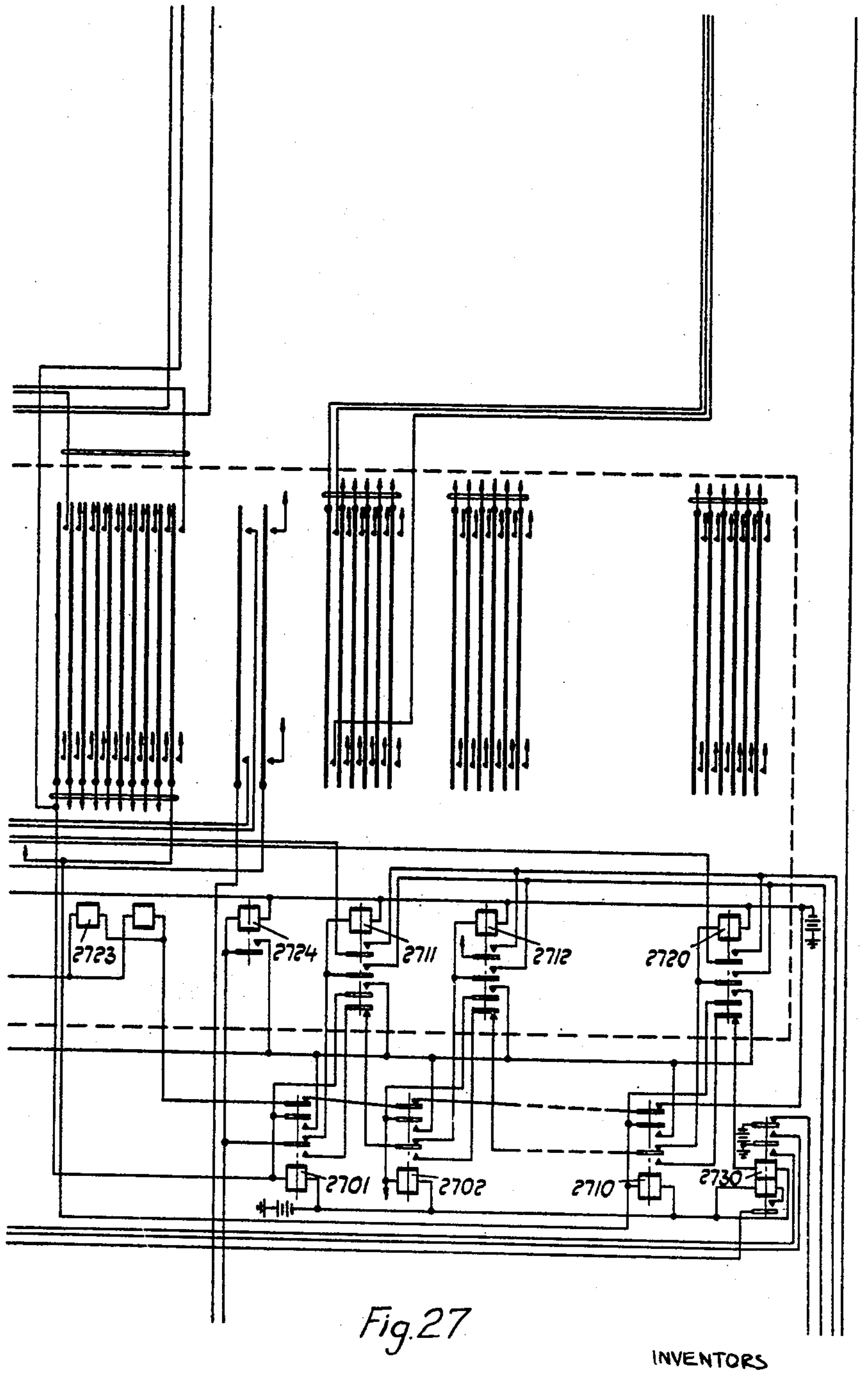
Figure 28:
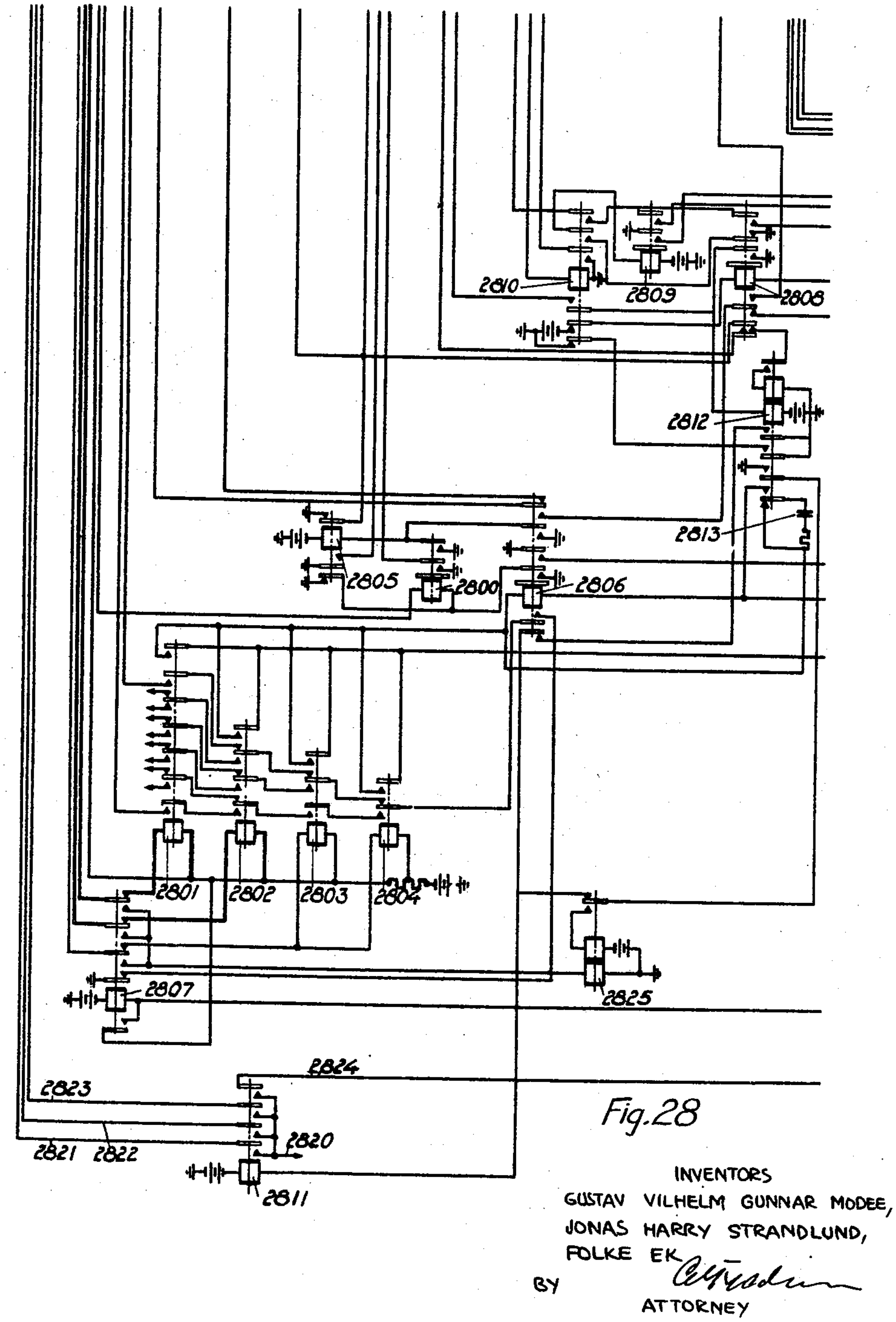
Figure 29:
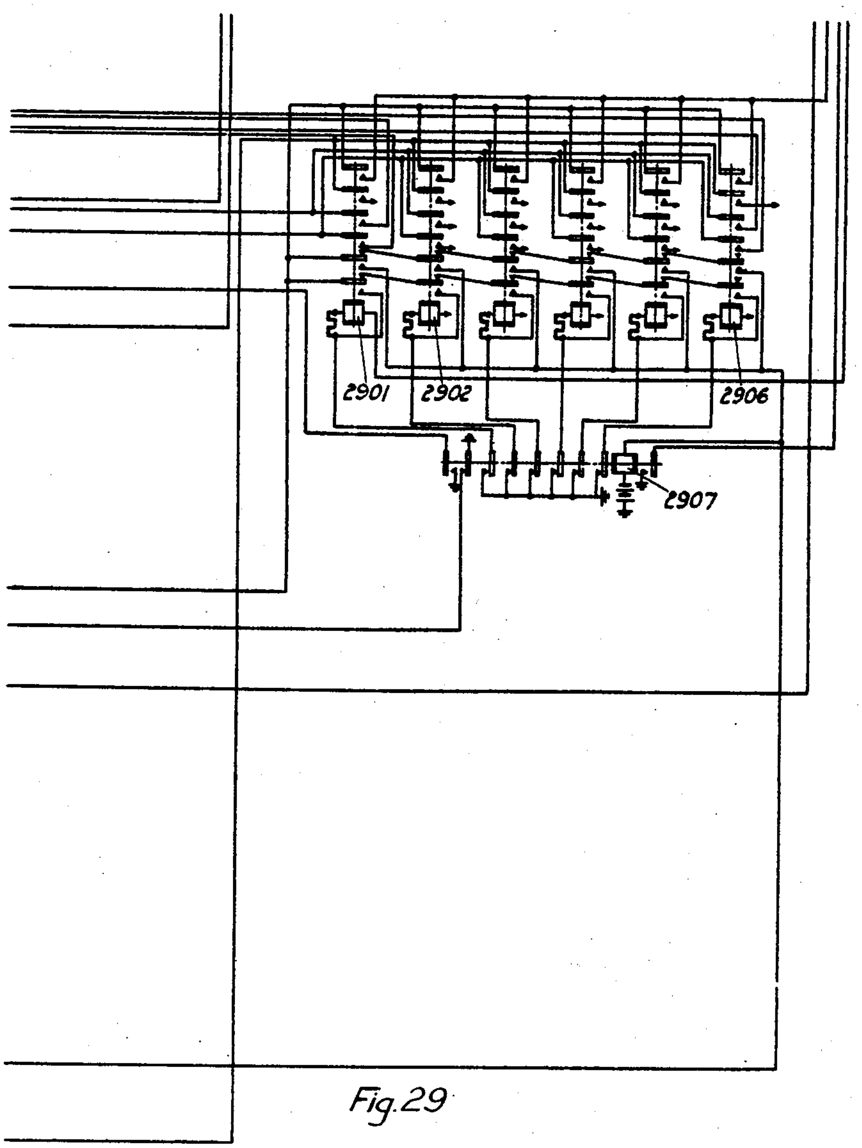

The set of second group selectors IIGV, Figs. 24–25, and its controller or marker, Figs. 26–29, are arranged in similar manner as shown in the set of first group selectors, with the exception that it lacks register finders and registers as well as selecting devices for the connection of the register finders. A selecting device 2410 connects junctor or link 1341 with the controller 1499 of the set of the second group selectors.

From the set of second group selectors there is shown only one junctor or link 1411 connecting a set of third group selectors over a current feed device (Fig. 31).

Figure 35:
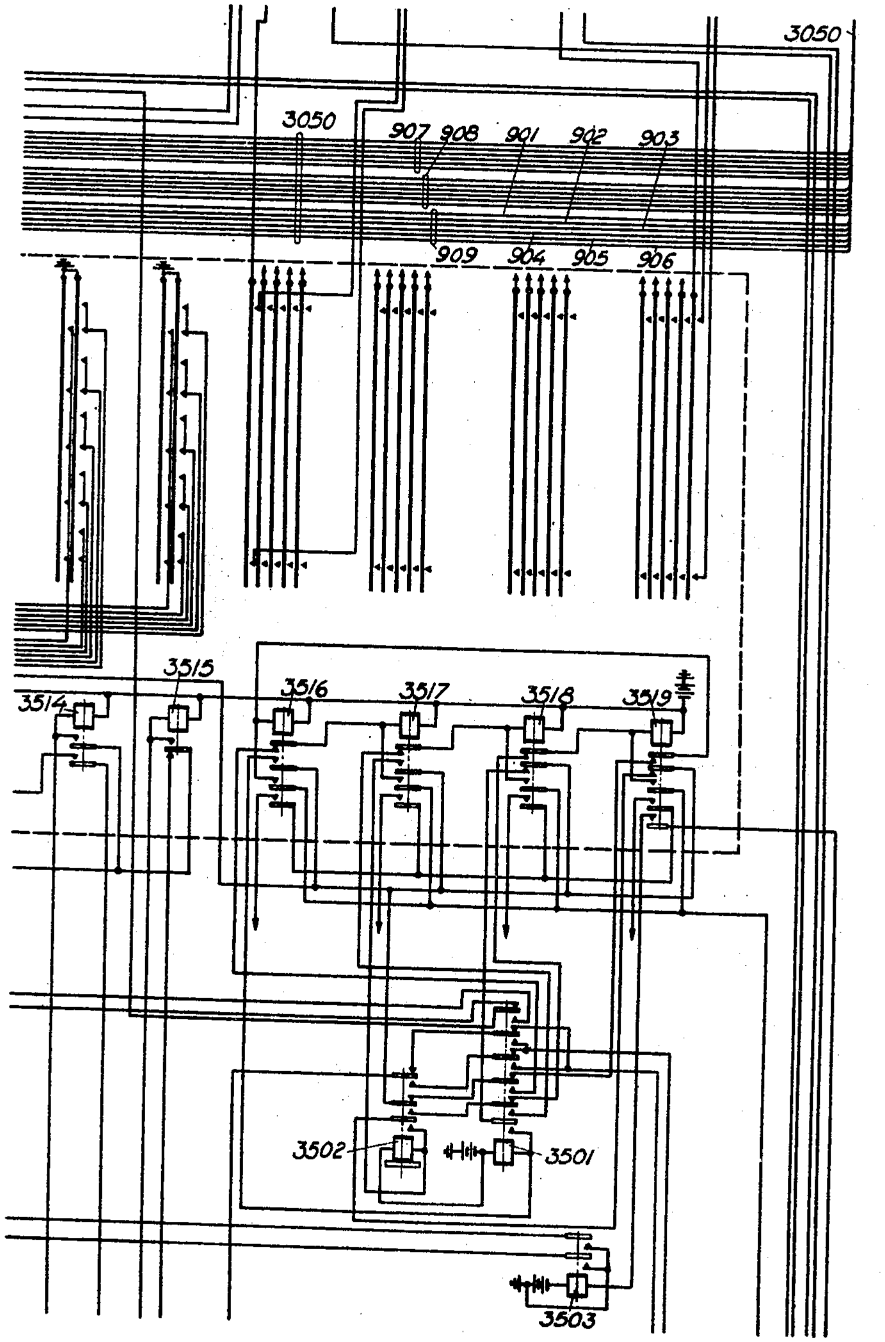
Figure 36:
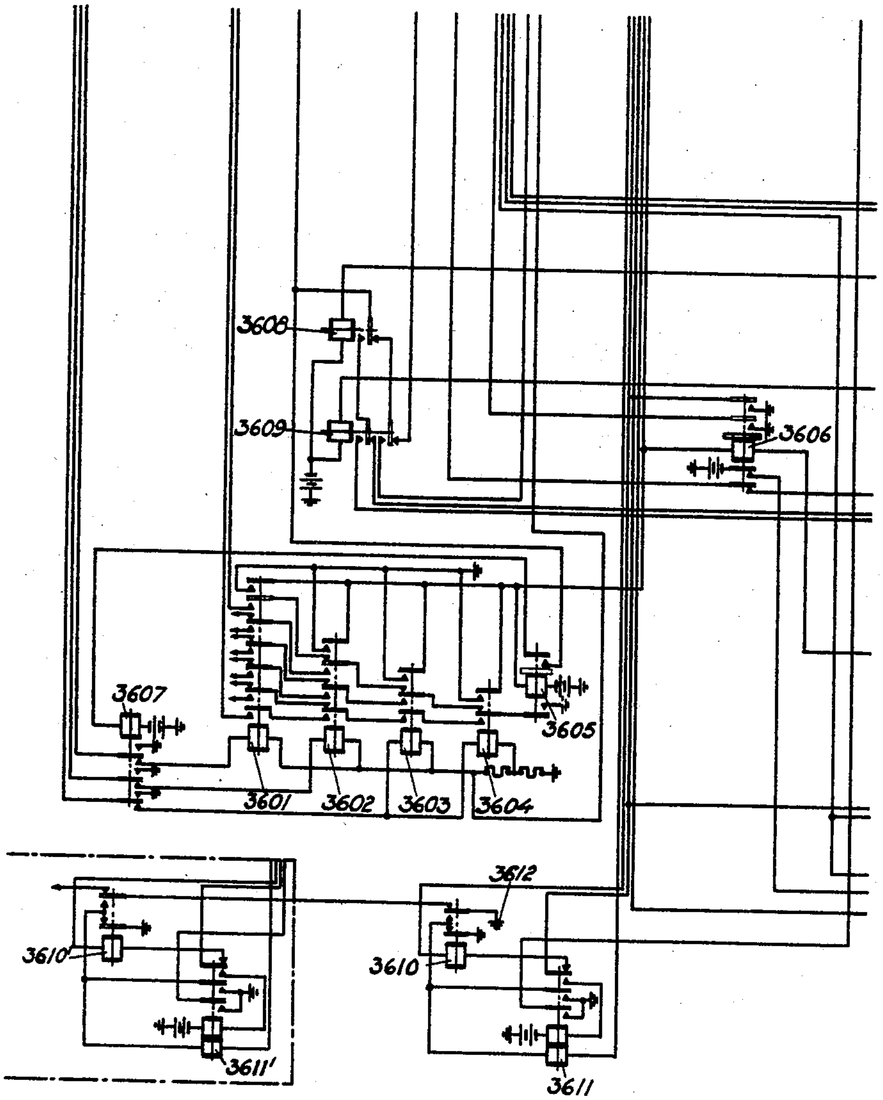

The current feed device is connected over a circuit 3041 to a set of third group selectors (Figs. 30; 32–33) and over a connecting circuit 3031 to a selecting device 3411 and to a controller or marker 3099 (Figs. 35–37). Each current feed device comprises battery supply relays for the A- and B-subscribers, test relays, tripping relays and so forth. The connecting circuit can, if desired, also be supplied with test relays for toll traffic, cut-off relays for establishing a toll line connection and relays for other purposes, for example the indication of a queue or the like.

Only a limited number of incoming junctors are connected to the set of the third group selectors IIIGV. In this manner it is possible to adjust the number of sets of third group selectors to the traffic volume, whereby a risk for blocking the traffic to a great number of subscribers is eliminated, if a set of third group selectors should be out-of-order.

As before mentioned, a set of line finders and final selectors corresponding to the desired numerical group of subscribers is connected to the set of the third group selectors by means of its controller 3099 and selecting devices 3412—3413, whereby said controller transmits and receives controlling currents over operating circuits 3050 between said controllers 3099 and 313.

As each group selector is supposed to have a numerical selection from 10 numbers and the final selectors of the set of line finders and final selectors are arranged numerically to select from 100 numbers, the shown series of selecting ranks can make connections to 100,000 numbers.

All junctors can in known manner be provided with repeating devices, not shown, for example pulse transmitting devices so that calls can be established over ordinary 2-wire or phantom circuits. Outgoing repeaters should be provided with current feed relays; the registers are made and used in known manner, with the exception of minor obvious changes for sending operating pulse combinations for internal connections, as later on will be described.

In Fig. 2 which is a simplified schematic showing of one set of switches characteristic of each group selector of a telephone system similar to that shown in Fig. 1, subscriber A, number 11100 is connected over a circuit, line frame LR and a circuit 309 to line finders and final selectors 350—389, 821—890 and a controller 313.

Another subscriber B, number 11199 is also connected over its circuit, line frame LR and a circuit 310 to the same line finders and final selectors and to the common controller 313 over circuit 311.

The final selectors 821—890 and the controller 313 are connected over circuit 321 to a primary group of switches of a set of first group selectors 1821, 1901, 1911 and to a selecting device 1812 associated with a controller 1399. A register finder 1810 is coupled over selecting device 1812 for finding an idle register 1700.

A junctor 1341 is shown connecting a set of first group selectors with a set of second group selectors, in which 2441, 2501 and 2511 are primary, secondary and tertiary switches respectively. Switch 2410 is a selecting device for connecting a controller 1499 for selecting an idle outlet, an idle incoming junctor and links connected thereto for setting up a through connection.

The set of second group selectors is connected by junctor 1441 to a current feed supply (Fig. 31), which in its turn is connected over junctor 3041 to a set of third group selectors 3211, 3330 and over a control circuit 3031 and selecting device 3411 to a controller 3099; controller 3099 is connected to a common controller 313 of a set of line finders and final selectors over selecting devices 3412–13 and over operating circuits 3050. The switches 3211, 3330 of the set of third group selectors are connected to line finders and final selectors over junctor 3070.

In all simplified diagrams of the present specification subscribers' lines and other circuits and junctors are marked with one line, no matter how many wires there are in each circuit. In line with this diagrammatic manner of illustration contact bars belonging to a hold magnet are shown as heavy lines. In certain cases, when one or more wires of a circuit are branched, an adequate indication by means of an arrow is accordingly shown.

The set of line finders and final selectors shown in Fig. 3*a* comprises hold magnets, not shown, corresponding to two primary and two secondary crossbar switches, each provided with 20 hold magnets. Each of the primary crossbar switches is divided in two half-parts 301—302 and 303—304. Each of the secondary crossbar switches is also subdivided in two half-parts 305—306 and 307—308. The 10 hold magnets of each of the primary half-parts can be connected to 100 groups of field contacts, to which 100 subscribers' lines are connected. There are thus four primary crossbar switch half-parts. Each subscriber's number appears in four groups of field contacts of the primary crossbar switches. In the figure subscriber's line 309 and 310 only, representing numbers 11100 and 11199, are shown. 40 junctors are connected to the secondary crossbar switches, whereby 10 such junctors are connected to 10 hold magnets in each half-part of the secondary crossbar switches.

In each half-part of the secondary crossbar switches 5 junctors are disposed for outgoing traffic and 5 junctors for incoming traffic. Each half-part of each secondary crossbar switch is connected by means of 10 links to the primary switches, whereby each link appears in 10 secondary rows of field contacts. Each half-part of a secondary crossbar switch is coupled over links to a corresponding half-part of a primary crossbar switch, whereby each interior link is connected to a primary hold magnet in the corresponding half-part of a primary crossbar switch.

The primary hold magnets of the rspective half-parts are in Fig. 3*a* separate, but in reality it might be more convenient to place hold magnets connected to the same subscribers' lines side by side, so that multiple wiring can be made by bare wires or non-insulated, see Fig. 3*b*.

In order to reduce the proportion of lost calls over the links and above all to avoid the task of even distribution of traffic over 10 groups of lines by fixed connections, the set of switches and links are so arranged that each one of four groups of links can make connection to any of 100 subscribers' lines, whereby each hold magnet of the first connected half-part of a primary crossbar switch is connected to subscribers' lines having unit numerical digits within a certain decade, for example 90, 91, 92, etc. different from the decades of the other hold magnets of the same half-part switch.

If the hold magnets of the first connected half-part of a primary crossbar switch cannot make the desired connection, hold magnets of another half-part of a primary switch are selected, of which each hold magnet is connected to subscribers' lines having a certain unit numerical digit in different decades, for example 09, 19, 29, etc. If a connection cannot be established in this second half-part of a crossbar switch, a third half-part of a crossbar switch is selected, and so forth.

Fig. 3*b* shows how the subscribers' numbers are disposed in the rows of field contacts of the two primary crossbar switches shown in Fig. 3*a*. In each of the two primary crossbar switches there are two hold magnets, which operate over the same tens numerical digit or over the same units numerical digit. The primary half-parts of the crossbar switches should, however, be connected in such a sequence that the crossbar switches will be alternately occupied. Thus a call may primarily try to get connection over half-part 301. The traffic, which cannot be set up in this half-part is therefore directed to half-part 303, and if it cannot be set up there, it is referred to half-part 302 and finally to half-part 304. This feature is true whether the traffic is outgoing or incoming.

Figure 4:
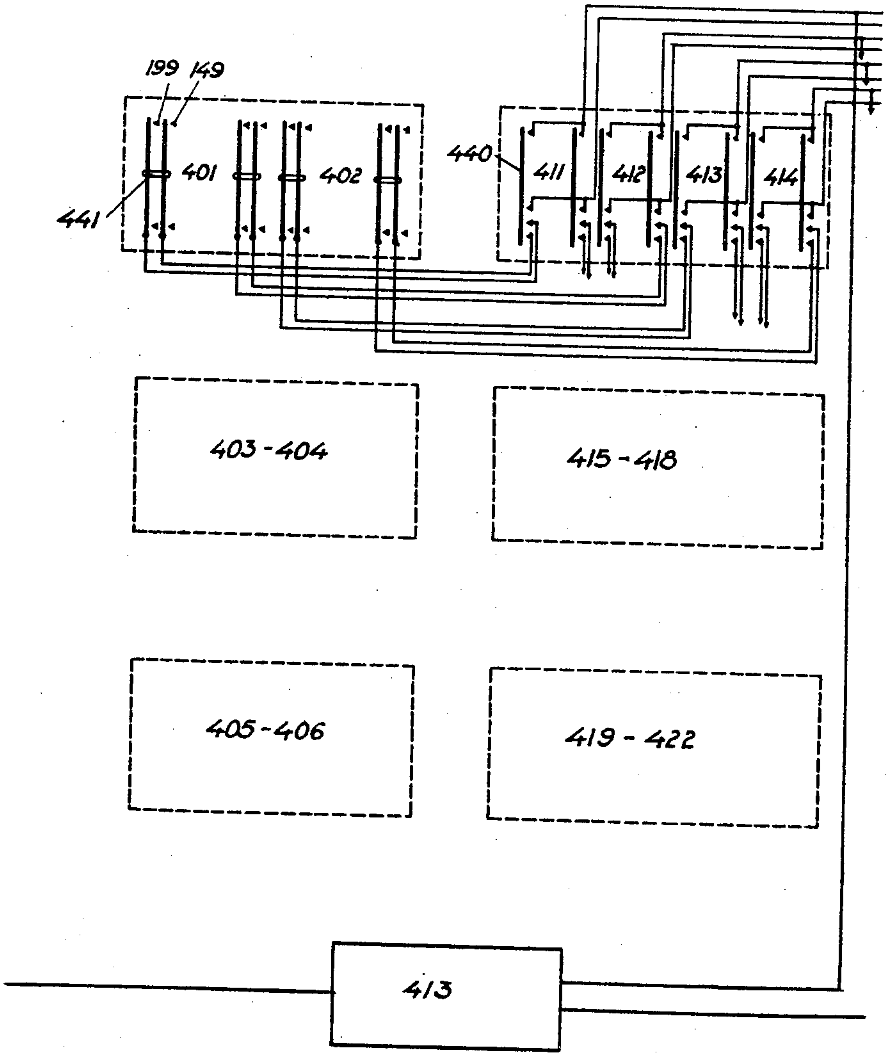

The number of crossbar switches provided in this case should be sufficient for normally occurring loads. When very heavy traffic occurs, the number of crossbar switches can be increased, so that the number of each subscriber may be multipled over 6 primary crossbar switch half-parts as shown in Fig. 4.

If crossbar switches were provided with 10 hold magnets, the number of crossbar switches could be more easily adjusted to the needs of the traffic load.

We suppose, for example, that a subscriber 11100 lifts his receiver from its hook. The set of line finders and final selectors obtains information over the subscriber's relay about the calling subscriber's tens and units numerical digits (0, 0). The controller 313 marks in which half-parts the desired connection can be made, and a hunting operation is started for finding an idle primary switch which can be coupled to a secondary switch and an idle junctor, for example 321 or any of junctors 321—340.

We now suppose that an incoming call to subscriber No. 11199 arrives. In this case the set of line finders and final selectors will be reached by any of the sets of third group selectors. This set of third group selectors will primarily be connected to the controller 313 for the transmission of necessary operating pulses over a number of control circuit wires 3050. The controller 313 marks as before described in which half-part the desired connection can take place, whereby it only transmits testing potential to the incoming junctors, which are connected to half-parts, over which the desired switching can take place. The controller transmits besides a signal to the last group selector, that it can start its selecting operation. Connection is here supposed to take place over junctor 3070, which is included in a junctor group 3051—3070 (see Fig. 33) for incoming traffic to the subscribers.

As soon as an outgoing or incoming call has been set up in the set of line finders and final selectors its controller 313 is idle for receiving new calls.

Fig. 4 shows in a simplified schematic form a set of primary and secondary line finders and final selectors for 200 subscribers in a rank of line finders and final selectors, in which the capacity of the primary switches is doubled so that alternatively each switch can make connection to two subscribers' line in each selective position.

Switches of the said set consist of hold magnets arranged in three primary and three secondary crossbar switches, each of 20 hold magnets. Each of the primary crossbar switches is divided in two half-parts groups 401—402, 403—404 and 405—406. The three secondary crossbar switches are here divided in quarter-parts 411—414, 415—418 and 419—422. 8 junctors connect each of such quarter-part, of which 4 junctors are disposed for outgoing and 4 junctors for incoming traffic.

Half the subscribers' lines connected to a primary half-part (401, 402) of a set of switches are accordingly accessible from each secondary quarter-part (411, 412, 413, 414). The secondary hold magnets can therefore be divided in different quarter-parts, each of which has access to 100 lines corresponding to half the subscribers' lines connected to the set. The total number of junctors for each traffic direction is 4 x 12=48 or 24 lines for each 100 subscribers' numbers. The 10 hold magnets of two secondary quarter-parts are connected to the 10 hold magnets of a primary half-part. Thus the hold magnets of half-part 401 are connected to the hold magnets of quarter-parts 411 and 412. The hold magnets of half-parts 402 are connected to hold magnets of quarter-parts 413 and 414 and so forth.

The contact bars of a hold magnet of a primary crossbar switch are connected to links leading to contacts in the corresponding secondary crossbar switch, which links can be connected to either of two subscribers' lines in the primary crossbar switches, as each group of field contacts is connected to a subscriber's number in the left bar and to another subscriber's number in the right hand contact bar.

For the connection of either of the two subscribers' lines in a double group, two auxiliary select magnets of each secondary crossbar switch are adapted to serve as switching relays. In this case the interior link is connected, which corresponds to a secondary select magnet, when said select magnet and the secondary hold magnets are operated.

Thus the subscriber's number 11149 and 11199 located in the same group of field contacts of the half-group 401 can be connected over primary hold magnet 441 and over one of two links to its corresponding group of field contacts in secondary hold magnet 440. The set of line finders and final selectors is otherwise generally arranged in the same manner as shown in Fig. 3*a*.

Figure 5A:
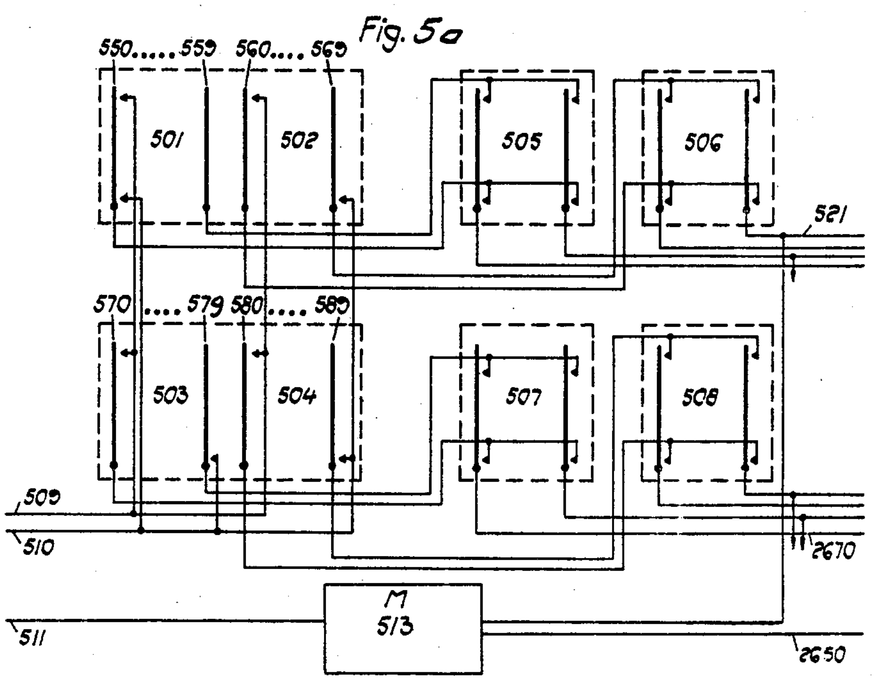

In Fig. 5*a* there are 4 primary and 4 secondary sections each of 10 hold magnets. Each of the 4 sections 501, 502, 503, 504 of the primary crossbar switches is connected with a corresponding section 505, 506, 507, 508 of the secondary crossbar switches. 40 junctors are connected to the 4 secondary crossbar switches, said lines being divided in outgoing and incoming junctors as before mentioned. The only principal difference from the diagram shown in Fig. 3*a* consists in that the order of the subscribers' numbers, which in Fig. 3 are multipled in two different sections, are in Fig. 5 multipled in four different sections.

Figure 5B:
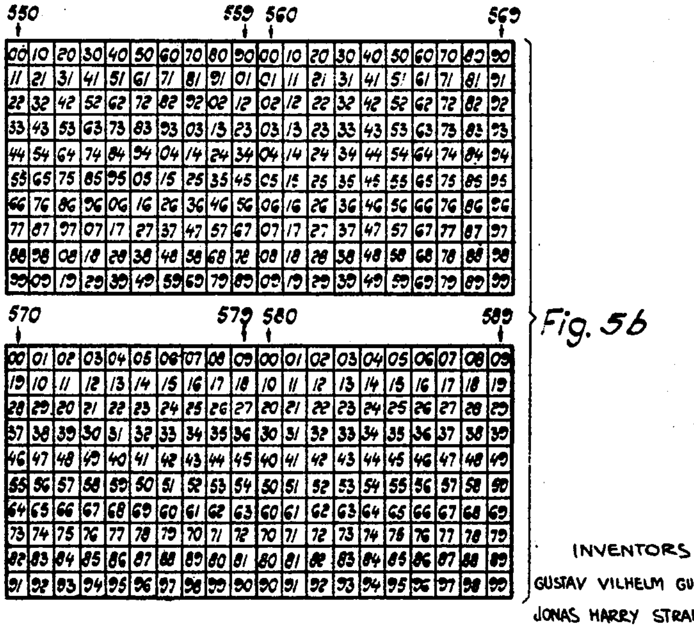

In Fig. 5*b* is shown an order of numbering in which a subscriber's number appears twice in each of four sections of switches and which can make connection to a certain desired subscriber. This feature has been obtained by shifting the numbers one or more steps for each row of numbers.

Considering the traffic load, which can be absorbed by different secondary sections for example the entire, half- or quarter-part crossbar switches, it might be desirable to vary the number of junctors outgoing therefrom, so that junctors would be unevenly distributed over different secondary sections, so that the last encountered secondary section would be provided with only a few exterior junctors. Such an arrangement, however, might be inconvenient from a manufacturing point of view. An excess of slightly utilized junctors in the last section is, however, beneficial, particularly when uneven distribution of load or excessive traffic occurs.

It should however be remembered that secondary sections can be differently loaded by multipling and grading the outgoing and incoming junctors of each section in different manners. Thus the first encountered section should, for example, have a relatively great number of outgoing junctors to a set of first group selectors, and for example incoming junctors could also be graded in such a manner, that a set of third group selectors could select over more outgoing than incoming junctors.

*Line finders and final selectors*

Figs. 6–10 show an embodiment of a set of line finders and final selectors as indicated in Figs. 1 and 2 together with the corresponding line frame. The switching steps are here arranged as indicated in Fig. 3*a*. In order to avoid congestion of the drawings means for counting calls and lost calls are not shown in Figs. 6–10. Means for out-of-order indication are, however, indicated. Fig. 38 shows the manner in which Figs. 6–10 are to be arranged.

Fig. 6 shows a line frame and corresponding relays.

Fig. 7 shows two primary crossbar switches and some blocking relays. Subscribers' call meters are also shown at the upper left corner. Fig. 8 shows two secondary crossbar switches, each showing only two of the 10 hold magnets for outgoing and two of 10 hold magnets for incoming traffic.

Figure 9:
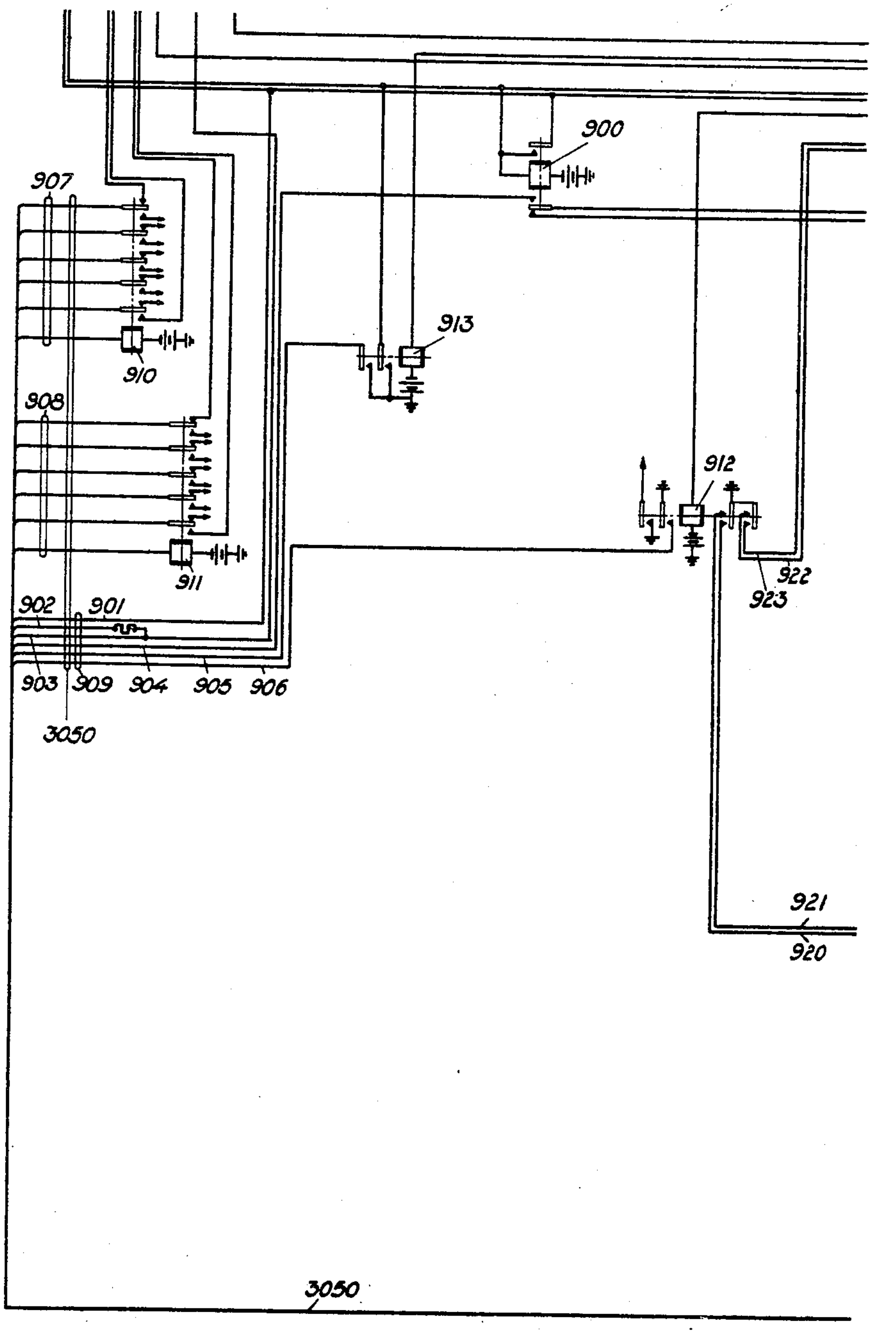
Figure 10:
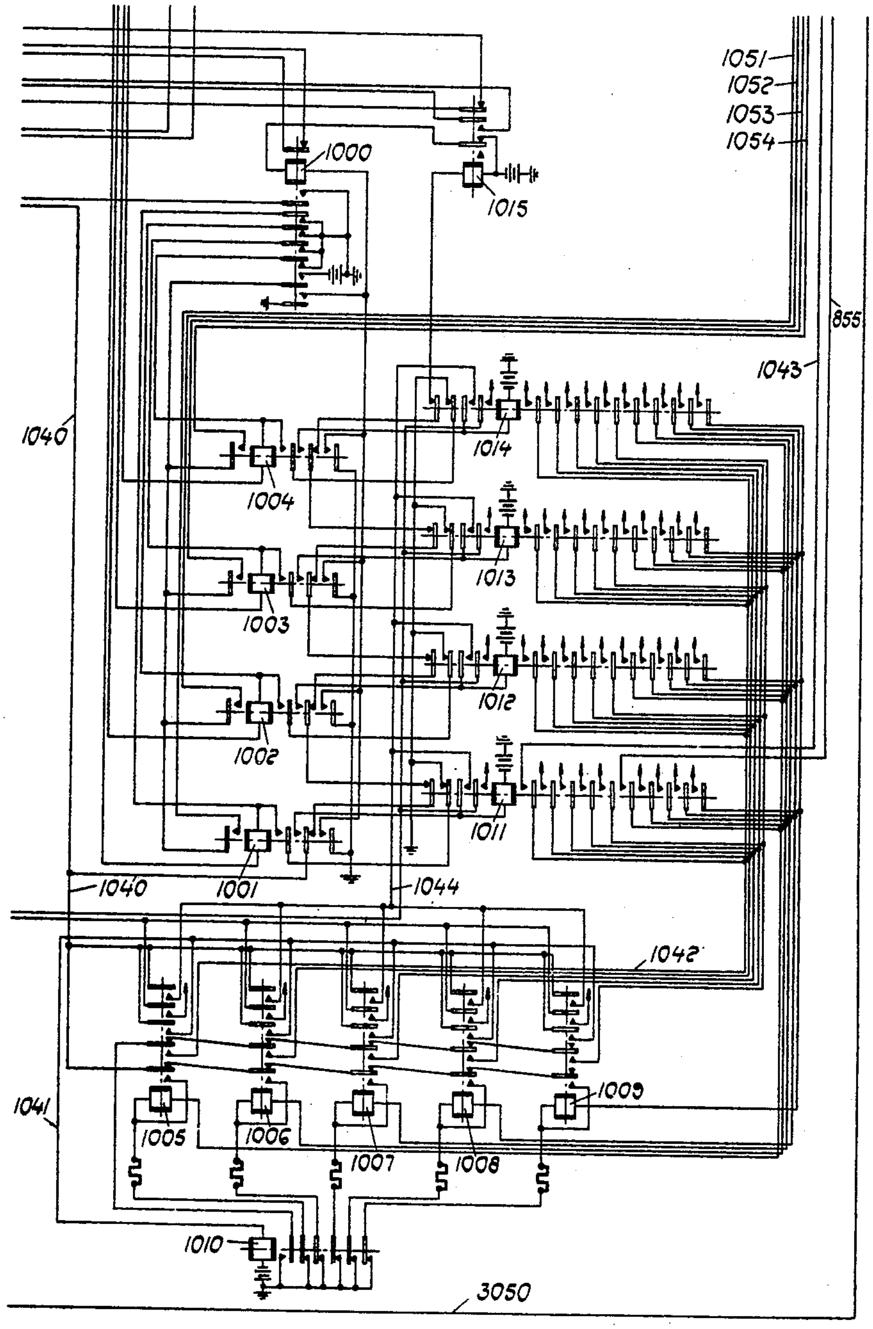

Figs. 9 and 10 show a controller for the set of line finders and final selectors.

100 subscribers' lines are connected to 100 line relays in the line frame shown in Fig. 6. The line relays are numbered 00–99. In the figure there is shown a subscriber's line No. 11100 connected to the corresponding line relay marked 610 and its cut-off relay 611.

Each line relay is in known manner (not shown) provided with time limiting means for preventing a subscriber from blocking a junction circuit.

The line frame also comprises tens numerical digit relays 600—609. If a subscriber No. 11100 lifts his telephone from its hook, line relay 610 is energized in known manner. A plus potential is then set out over a break contact in relay 611, a make contact in relay 610, wire 612 corresponding to the decade of the calling subscriber, which decade in the present case is 0–.

In a manner to be shown in the following the set of line finders and final selectors, if idle, will be blocked for other calls, and relay 600 of the corresponding tens numerical digit will be operated. If relay 600 has been energized, plus potential is set out over a make contact in relay 600, contacts in the cut off and line relays, and over wire 613 to all subscribers' relays belonging to the same decade, in this case to the subscribers' relays 00–09. The corresponding units numerical digit –0 corresponding to the number of the calling subscriber is thus marked by setting out plus potential over wire 613.

Relay 620 prevents calls incoming to the set of line finders and final selectors from a set of third or last group selectors by interrupting a circuit over wire 612, when said relay 620 is energized.

Fig. 7 shows among other things hold magnets indicated in Fig. 3*a*, 350, 360, 359, 369 and 370, 380, 379 and 389 respectively and pertaining to the two primary crossbar switches of the set of the line finders and final selectors. The hold magnets of the respective half-parts of the crossbar switches are adjacently located as indicated in Fig. 3b. The select magnets of the primary crossbar switches are marked 700—709 and 710—719 respectively.

If a call arrives within the decade "0–," wire 612 obtains plus potential as before described, whereby select magnet 710 operates, due to the fact that minus potential is obtained over a break contact of select magnet 710, a break contact of block relays 720 and 721.

When select magnet 710 has been operated it obtains holding current over a make before break contact of select magnet 710, in series with relay 720, whereby relay 720 operates cutting off minus potential over one of its break contacts so that the set of switches is blocked for other calls.

The select magnets are provided with such a series of break contacts that if two simultaneous calls are arriving to the crossbar switch, the higher decade cuts off the lower decade.

In order to facilitate the operation of only one of two select magnets, when two such select magnets are simultaneously operated, the select magnets are divided in two groups corresponding to even and uneven tens numerical digits in such a manner, that the select magnets, which actuate the same select bar, should not be able to interfere with each other.

The select magnets, which are operated by even tens numerical digits are provided with minus potential in series with relay 721 so that, if two select magnets, for example, 710 and 711 actuating the same bar interfere with each other, relay 721 will have time to operate. When relay 721 has been operated, the circuit of the select magnet having odd (711) tens numerical digits is interrupted, so that the other select magnet (710) of even tens numerical digit will be able to operate. Upon operation of relay 720, plus potential is set out over contact in all select magnets 710—719, so that the operated select magnet transmits the tens numerical digit corresponding thereto to a tens numerical digit relay, in the case relay 800, and also to the select magnet in the secondary crossbar switch, which is connected to links able to make a through connection (see Fig. 3a). In the present case plus potential is set out over a contact of relay 720 and over a make contact of select magnet 710 to select magnet 800.

When the tens numerical digit relay 600 operates, plus potential will be set out over wire 613 to primary select magnet 700 over the following circuit: Plus potential, a make contact in relay 600, a break contact and a make contact in relays 610—611, wire 613, select magnet 700, a break contact in select magnet 709, a break contact relay 722, relay 723, minus potential.

The corresponding primary crossbar switch comprises select magnets provided with a series of blocking break contacts and with block relays 722 and 723, which are arranged in the same manner as previously described with respect to block relays 720 and 721. The block relays 722 and 723 can be replaced by a single block relay, if desired. When block relay 722 operates, plus potential is set out over a make contact of relay 722 to make contacts of select magnets 700—709, so that the secondary select magnet 810 corresponding to primary select magnet 700 is actuated over the following circuit: Plus potential, make contact relay 722, make contact select magnet 700, select magnet 810, minus potential.

Over the secondary select magnets 800 and 810 actuated in corresponding groups, minus potential is set out from a make contact of relay 722 over break contacts of hold magnets 350—360 to the contacts of those primary hold magnets which can make connection to the calling subscriber, in this case hold magnets 350, 360 and 370, 380. If one, say 350 of the said 4 hold magnets is idle, an idle marking relay 1001, corresponding to said hold magnet, is operated over the following circuit: Minus potential, make contact relay 722, make contact select magnet 800, break contacts hold magnet 350, relay 1001, a break contact relay 1000, plus potential.

Idle marking relay 1001 corresponds to the left hold magnets 350—359 of the upper primary crossbar switch. Idle marking relay 1002 corresponds to left hold magnets 370-379 of the lower crossbar switch. Idle marking relay 1003 corresponds to the right hold magnets 360—369 of the upper crossbar switch, and idle marking relay 1004 corresponds to the right hold magnets 380—389 of the lower crossbar switch.

As soon as any of idle marking relays 1001—1004 operates, said relay also receives holding current over its make contact and over a break contact of one of the corresponding connect relays 1011—1014. Start relay 1000 simultaneously operates and cuts off the plus potential for the operation of idle marking relays 1001—1004, so that said relays are only kept operated on account of a holding plus potential over break contacts of the corresponding connect relays 1011—1014 and over their own make contacts.

When start relay 1000 has been operated, plus potential is set out over start wire 1040 over the following circuits: Plus potential, a make contact start relay 1000, a break contact relay 900, break contact of non-operated idle marking relays 1001—1004, break contact of non-operated connect relays 1011—1014, until the plus potential arrives at an operated idle marking relay, for example 1001. In this case the corresponding connect relay 1011 is operated due to the fact, that the plus potential imposed on wire 1040 will complete a circuit over a make contact of the operated idle marking relay 1001 and connect relay 1011 to minus potential.

When connect relay 1011 is operated, holding current of relay 1001 is interrupted over a break contact of connect relay 1011, and idle marking relay 1001 is deenergized, whereby the connect relay 1011 is also deenergized, if testing has not already been done.

During the time that the connect relay 1011 is operated, a test relay 1005—1009 is connected to each one of five outgoing junctors associated with the crossbar switch half-group, which corresponds to the idle marking and connect relays.

If during a test operation an idle outgoing junctor is not found, the next connect relay, for example 1012, will be connected in similar manner as before described, and so on, until all idle marking relays have been deenergized.

Start wire 1040 then applies plus potential to relay 1015 over a break contact in each of the idle marking relays 1001—1004 and over a break contact in each of the connect relays 1011—1014.

Upon operation of relay 1015 the operating circuit of start relay 1000 is opened over a break contact of relay 1015, and relay 1000 is released. Relay 1015 is then also released, as its operating circuit is opened over a contact of start relay 1000, when said relay is released.

The idle marking relays previously released can now be operated again and the hunting for an idle first group selector can be continued. If all idle marking relays are released, links which can make the desired connection are lacking. In such a case the call should be disconnected, so that other incoming calls might have a possibility of being connected. This disconnection takes place by means of a device later on to be described.

If there are some idle marking relays operated, but testing for a free circuit cannot take place on account of lack of idle outgoing junctors, the hunting operation is repeated, but every time relay 1015 is operated, an incoming call can be connected in a manner later on to be described.

Each secondary crossbar switch is divided in two parts, each corresponding to an idle marking relay. The ten hold magnets corresponding to a certain idle marking relay are divided in 5 hold magnets for outgoing and 5 hold magnets for incoming traffic.

When a contact relay corresponding to its idle marking relay, for example 1011, is operated, test wires are connected to their corresponding relays 1005—1009. If any or some of the connected outgoing junctors are idle, the corresponding test relays are operated, when they receive plus potential over break contacts of relay 1010.

When the test relays operate, the hunting operation is stopped, when stop wire 1044 obtains plus potential over a make contact of an operated test relay 1005—1009 and over 1040.

The actuated connect relay 1011 thereby obtains holding current over its own make contact, whereafter the hunting operation ceases. The corresponding idle marking relay is denergized in previously described manner. When wire 1041 receives plus potential relay 1010 will also be operated over the following circuit: Minus potential, relay 1010, two make contacts of relay 1005, a resistance associated with relay 1005, a break contact of relay 1010, plus potential. Holding current is obtained over a make before break (not shown) contact of relay 1010. Only the left test relay 1005 can remain operated, while other operated test relays will be de-energized.

When distributing outgoing junctors it is important that each junctor from each half-group of a crossbar switch should test over a corresponding test resistance in a set of first group selectors, because otherwise parallel testing might occur.

When a test relay has been operated, plus potential is impressed over a make contact of relay 1010 and over make contacts of the corresponding idle marking and connect relays, wire 855 (junctor 321) to the hold magnet, which in any of the secondary crossbar switches corresponds to the tested outgoing idle junctor.

Supposing, for example, that relay 1005 is operated. Plus potential is then applied over the following circuit: Plus potential, make contact relay 1010, make contact relay 1005, wire 1042, a make contact relay 1011, wire 1043 corresponding to test wire 855 of junctor 321, hold magnet 821, minus potential. Hold magnet 821 is energized.

Trunk 321 comprises two talking wires 850 and 851, a test wire 852, a wire 853 for subscriber's call meter, a wire 854 for calling and holding and a test wire 855 for testing for an idle first group selector.

Upon operation of hold magnet 821, junctor 321 obtains plus potential over calling and holding wire 854. The said plus potential is transmitted over make contacts of the field contact group of holding bars and over a link corresponding in this case to hold magnet 350 of the upper primary crossbar switch, the field contacts of which have been marked by select magnet 700.

At the same time as the connection is established within the set of line finders and final selectors, the outgoing junctor calls a first group selector and obtains holding plus potential from said first group selector instead of from the controller Figs. 9–10).

From the connected first group selector plus potential is applied over the now connected set of line finders and final selectors to the cut-off relay 611 of calling subscriber 11100. Said cut-off relay operates, whereby current is transferred to the first group selector. When cut-off relay 611 operates, the transmission of plus potential to the select magnets of the secondary crossbar switches is interrupted.

All relays of the set of line finders and final selectors are then released with the exception of the hold magnets necessary for the continuation of the connection, said hold magnets receiving holding potential from the next adjacent rank of switches, as before stated, until its release is effectuated by interruption of the said holding potential.

If the subscriber's line is grounded, the first group selector is disconnected in known manner by a time device located in the register. The call is then released, when the line relay is deenergized and the slow acting cut-off relay obtains holding current over ground on the subscriber's line.

*Incoming calls*

When an incoming call arrives to a set of line finders and final selectors, said set is found by a group selector IIIGV of the last group selectors. Plus potential is applied over wire 901 of a controlling wire group 3050. If the control is busy, an outgoing call being dispatched, said plus potential has no effect, because block relay 720 is operated in such a case.

If the controller, however, is idle, relay 620 will be energized over the following circuit: Plus potential, wire 901, break contact relay 720, relay 620, minus potential. Outgoing calls will then be prevented from arriving at the controller.

Call receiving relay 900 will further be operated over the following circuit: Plus potential, wire 901, break contact of relay 720, relay 900, minus potential. Relay 900 then obtains holding current over one of its own make contacts from the plus potential over wire 901.

As before mentioned, the set of line finders and final selectors can also be connected to a set of group selectors on an outgoing call in the case of a repeated hunting operation over the outgoing junctors, when idle junctors are lacking. Every time the steps of a hunting operation has been completed, and relay 1015 is energized, the incoming plus potential over wire 901 has the possibility of actuating relay 620 over a make contact of relay 1015 in the same manner as when the set of switches is entirely idle, whereby the line relay set can be cut off.

In order to allow only the last group selector to be connected to the final selector, the set of group selectors is arranged to test over wire 902, which wire is connected in series with an ordinary test resistance. In order to facilitate the connection of a group selector, when parallel testing takes place, the sets of group selectors are provided with a series of special relays, which are connected at the same time as the test relays of the sets of group selectors are connected and which special relays start to operate, if an idle junctor cannot immediately be found. Relays for such purpose are shown and described in connection with the description of the last group selectors.

Wires 902 and 903 must obtain minus potential, when block relay 720 is non-operated in order to facilitate testing for an idle junctor over wire 902 or for connection over wire 903 and series connected contacts. When testing for an idle junctor the test relay of the group selector obtains holding current over one of its make contacts. After testing has taken place and a junctor has been found, the set of group selectors transmits tens numerical digit and units numerical digit signal over wire groups 907 and 908 respectively. Select magnets corresponding to the tens numerical digit and units numerical digit of the subscriber's number are then actuated over make and break contacts of relays 910 and 911.

When an idle marking relay operates, start relay 1000 is automatically actuated, which impresses plus potential over a make contact of relay 900 to the set of group selectors over wire 904. This signal indicates that the set of line finders and final selectors is in position and that the set of group selectors can start its hunting operation.

When relay 1000 has been energized, minus potential is also applied over make contacts of the respective idle marking relays to some of wires 1051—1054, and from there to junctors intended for incoming traffic, which junctors are connected to the half-parts of the respective secondary crossbar switches. When a set of group selectors during its hunting operation finds an idle marked junctor, said junctor is connected and thereafter a call signal is transmitted over a make contact of an idle marking relay and over the corresponding calling and holding wire.

Of the incoming junctor 3070 wires 860 and 861 are talking branches, wire 862 is a testing wire for the cut-off relay associated with the line relay. 863 is a calling and holding wire, and 864 is a wire, over which the set of group selectors tests, when hunting for an idle junctor. The calling and holding wire 863 obtains plus potential from the set of group selectors. Hold magnet 890 operates, and a link indicated by the select magnet receives plus potential over its calling and holding wire and operates the hold magnet 389 of the primary selector. The break or cut-off relay of the line relay set then operates over test wire 862, now extended through the set of line finders and final selectors. The set of group selectors receives an indication that connection has been established by means of test wire 864, which is interrupted when hold magnet 890 is energized. The controller is then disconnected from the set of group selectors.

*Out of order indicating means*

The set of line finders and final selectors is provided with a relay 912 for an out-of-order indication and with an out-of-order indicating device comprising a number of lamps and pertaining relays (not shown in the drawing). A similar device will later on be described in connection with Figs. 45–46.

The out-of-order indicating device is common to a great number of sets of line finders and final selectors. When an outgoing or incoming call actuates block relay 720 the out-of-order indication relay 912 obtains plus potential over a break contact of relay 1015. Relay 912 is in known manner slow acting for energization. For normal calls relay 912 will not have time to operate during the time that the controller is occupied. If an outgoing call should make repeated hunting operations for an idle junctor, relay 912 obtains current interrupted over relay 1015 each time said relay operates, and a new sequence of hunting operations is started. In this manner trouble or out-of-order indication is prevented, when repeated hunting operations are made.

Upon operation of trouble indicating relay 912, however, plus potential is transmitted to an out-of-order indicating device, similar to that shown in Figs. 45–46, for indication of the position of the corresponding out-of-order switching device. Thus, for example, a connected junctor will be indicated by a ground over a make contact of relay 912. Similarly over wire 920 and make contacts of relays 1005—1009 indication is given which of test relays 1005—1009 is energized, and over wire 921 indication is given which of the connect relays 1011—1014 is energized.

The number of the calling and called subscriber can be ascertained by registering the position of select magnets over wires 922 and 923 and over make contacts of the respective reselectors. A signal is further sent over wire 906 to indicate that a connected set of group selectors should be disconnected.

If calls are lost or not completed due to lack of links, the controller will, as before mentioned, prevent a call from blocking the set of line finders and final selectors. In this case none of the idle marking relays 1001—1004 will operate, and relay 1000 will remain deenergized. Block relay 913, which is slow acting when energized, receives plus potential over a break contact of relay 1000 from a make contact of relay 722. Upon operation of relay 913, relay 620 is operated over a make contact of relay 913, so that the line relay set is disconnected.

If connection of an incoming call takes place, plus potential is applied over wire 905, a make contact of relay 913 to the connected set of group selectors, whereby said device receives a signal of disconnection, and a block signal is sent out. If, however, a connection of an outgoing call takes place, said call is disconnected, when relay 620 is operated. A new outgoing call can in such a case be received, if the calling subscriber belongs to a set having a higher hundreds numerical digit than the disconnected subscriber.

Figs. 11–12 show details of an embodiment of a set of line finders and final selectors as shown in Figs. 5*a* and 5*b*. Figs. 11–12 can take the place of Figs. 7–8 respectively in the already described set of line finders and final selectors.

In Fig. 11 the first and last hold magnets of each half-part of two primary crossbar switches, each containing 20 hold magnets are shown; the crossbar switches comprise primary sections 501—504 shown in Figs. 5*a* and 5*b*.

Fig. 12 shows four secondary crossbar switches, each provided with 10 hold magnets and corresponding to sections 505, 506, 507, 508 respectively shown in Fig. 5*a*. Each of the two secondary sections 506 and 508 is provided with one or more auxiliary hold magnets 1240 and 1241 respectively for shifting and identification of the subscribers' numbers in sections 501 and 503 according to Fig. 5*b*.

We assume, for example, that a subscriber's line No. 99 will be called. In this case primary select magnets 1109 and 1119 corresponding to 709 and 719, Fig. 7, and secondary select magnets 1209 and 1219 of sections 506 and 508 Fig. 5*a*, and which correspond to select magnets 809 and 819, are operated in the manner previously described in connection with Figs. 7–8. As soon as any of select magnets 1200—1209 and 1210—1219 are operated, hold magnets 1240, 1241 respectively are operated and take care of the shifting and identification of the called number.

In the auxiliary hold magnet 1240 the tenth bar, corresponding to select magnet 1209, receives plus potential over a make contact of relay 1122 and over a make contact of select magnet 1109.

In similar manner the tenth bar of auxiliary hold magnet 1241 receives plus potential over a make contact of relay 1120 and over a make contact of select magnet 1119.

In the two shifting devices 1240 and 1241 the field contacts are connected according to a desired predetermined numerical order as shown in Fig. 5*b*, so that the hold magnets of the crossbar switches, which correspond to the sections 501 and 503 will be operated over contacts in sections 505 and 507.

This means that select magnet 1220 in this case receives operating plus potential over a field contact of bar 10, corresponding to select magnet 1209, of hold magnet 1240, and that select magnet 1238 (not shown in the drawing) and corresponding to hold magnet 578, Fig. 5*b*, in which subscriber's number 99 figures, is actuated over bar 10 of hold magnet 1241.

Select magnet 1220 actuates idle marking relay 1001, Fig. 10, depending upon the operating condition of hold magnet 550, because minus potential is applied from a make contact of relay 1122, over a make contact of auxiliary hold magnet 1240, over a make contact of select magnet 1220, over a make contact of hold magnet 550 to idle marking relay 1001 in the manner previously described in connection with Figs. 6-10.

In the secondary crossbar switch, corresponding to section 507 select magnet 1238 (not shown) will be actuated, as previously mentioned, over a field contact in hold magnet 1241 (bar 10, position corresponding to select magnet 1219). Upon operation of select magnet 1238, idle marking relay 1002 will be actuated, if the hold magnet 578 is idle.

The two other idle marking relays 1003–1004, Fig. 10, will be actuated in the previously described manner, depending upon the operating conditions of the select magnets of sections 505 and 508, and depending on the operating conditions of the hold magnets of sections 502 and 504. It will be noticed that the desired subscriber's number 99 figures in primary hold magnets 550, 578, 569 and 589, and that said number 99 will be located by the primary switches according to the numbering scheme shown in Fig. 5*b*.

Any of the simplified diagrams shown in Figs. 13 or 14 can be used for connection of the respective switches of the sets of first or second group selectors. In Fig. 13 there are shown a great number of incoming junctors connected to a set of group selectors which in each numerical junctor group can seek a great number of outgoing junctors over three groups of switches. All links within the set are directed by a controller 1399.

The incoming junctors are divided in 10 groups, each junctor of each group being connected to a primary crossbar switch 1301—1310. Each primary crossbar switch serves as a preselector and causes an incoming call to be connected to any of the secondary crossbar switches 1311—1320 and to the corresponding tertiary crossbar switches 1321—1330.

In an embodiment to be described hereinafter the primary, secondary and tertiary switches belonging to the same horizontal row are located in a single crossbar switch.

The sets of group selectors are so arranged that only those junctors incoming to the same primary section will be marked busy during the time an incoming call is being switched through the set by the controller. Calls arriving in the meantime to other primary sections will have to wait until the controller becomes idle, when they will be connected to said controller in a sequence determined by the location of the respective primary switches.

In a set of first group selectors the incoming junctors will be marked busy during the time that any junctor belonging to the junctor group is connected to a register.

In a set of group selectors comprising register finders a crossbar switch provided with 20 hold magnets can be disposed in the following manner: 2 hold magnets as register finders (1810), 1 hold magnet 1812 as selecting device for connection of a calling junctor to the set, 1 hold magnet 1811 for the connection of an outgoing junctor to a register, 6 hold magnets 1821–1826 to operate as primary switches, 5 hold magnets 1901–1905 to operate as secondary switches and 5 hold magnets 1911–1915 to operate as tertiary switches.

In a set of group selectors without register finders a cross-bar switch provided with 20 hold magnets can be disposed in the following manner: 1 hold magnet as selecting device for connection of the controller, 7 hold magnets to operate as primary switches, 6 hold magnets to operate as secondary switches and 6 hold magnets to operate as tertiary switches.

In Fig. 13 there are special switches 1810—1811 and selecting device 1812 forming part of a section 1301 of the primary switching group for switching an incoming junctor of the controller 1399 and said controller to a register finder and to a link. The links between the primary 1821 Fig. 18 and secondary switches 1901 Fig. 19 are in known manner so distributed that outgoing junctors 1331—1340 from primary section 1301 are incoming to corresponding secondary switches. Each secondary switch, for example 1311, receives traffic from all the primary switches over corresponding links.

The outgoing junctors from the sets of group selectors have their test wires connected to the controller.

Said controller seeks an idle outgoing junctor in the desired junctor group connectable to the incoming junctor and thereafter makes the connection.

Each numerical junctor group corresponds to a select magnet of a tertiary section. In a certain junctor group of a set of group selectors having 10 times 50 outgoing junctors, section 1321 of tertiary section, for example, can make connection to outgoing junctors 1341—1345. Tertiary section 1322 can make connection to outgoing junctors 1346—1350 and so forth. In this case there are 50 links between the secondary and the tertiary groups of switches, of which for example the links 1921—1925 connect the secondary section 1311 with tertiary section 1321.

The present arrangement of three groups of switches within a rank of switches offers the advantage over an alternative switching arrangement of only two groups of switches, that in a rank of first group selectors certain or all outgoing numerical junctor groups can be effectively concentrated, and that a set of group selectors arranged in this manner will be cheap due to the good traffic qualities of the set and also due to the fact that the control can be made common to a great number of incoming junctors.

Fig. 14 shows a simplified schematic arrangement of switching groups in a set of second group selectors, and its construction and function is similar to that described in Fig. 13.

In a set of second group selectors a crossbar switch having 20 hold magnets can be utilized as follows: A hold magnet is used as selecting device, 7 hold magnets are used as primary switches, 6 hold magnets are used as secondary switches and 6 hold magnets are used as tertiary switches.

Fig. 15 shows a set of group selectors having 20 numerical groups of junctors.

Tertiary groups of switches 1531—1546 are here arranged in double groups, that is to say, twice the number of bars and field contacts as shown in Fig. 13 and Fig. 14. Two links, for example 1527 and 1528 are incoming to each tertiary group of switches. These links can be selected depending on to which numerical outgoing group of junctors connection shall take place.

Each one of the secondary groups of switches 1511—1526 is provided with two select magnets (not shown) for selecting for example link 1527 or link 1528, which operate as switching relays for connecting either of two links to the said tertiary switches. Each pair of links is here connected to two groups of field contacts located in the same hold magnet. The select magnets operating as switching relays determine which of said groups of field contacts shall be connected to the contact bars of the secondary hold magnets.

The links between the primary and secondary switches are distributed in the same manner as shown in Figs. 13 and 14. Primary groups 1501—1508 are here provided with double groups of contact sets so that the outgoing links can be connected to one or the other group of field contact sets of a certain select magnet.

In each primary group of switches two select magnets (not shown) are arranged as switching relays. The incoming junctors are connected to two groups of field contacts, of which one is situated at the left hand side of the double group and is actuated by the upper select magnet, while the other group is situated to the right, and is actuated by the other select magnet.

As from each primary section of switches 2 x 8 = 16 links depart, there will be 8 x 16 = 128 links departing from 8 primary sections of switches, and which can be received by the 16 secondary sections of switches.

*First group selectors*

Figs. 16–23 show an embodiment of a set of first group selectors as diagrammatically shown in Fig. 13.

Fig. 16 shows control relays and connect relays for controlling the operation of register finders shown in Fig. 18.

Figure 17:
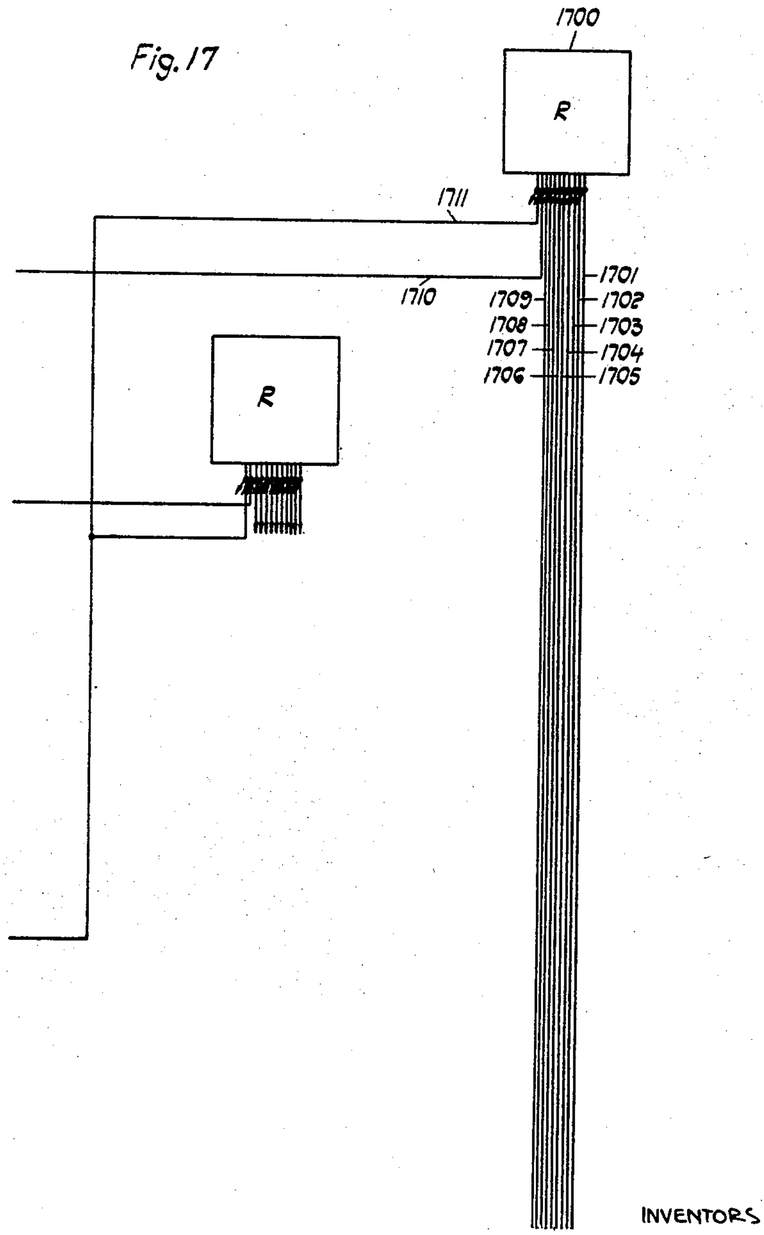

Fig. 17 only indicates two of 10 registers, which can be connected to the controller by the register finders.

Fig. 18 shows a primary group of switches of a set of first group selectors and some extra hold magnets to be used (*a*) as a selecting device; (*b*) as a register finder; (*c*) for establishing a connection to a desired secondary group of switches during the time a register is connected.

Fig. 19 shows a secondary and a tertiary group of switches. Figs. 20–23 show a controller and connect relays for connecting the different primary groups of switches to the controller.

As before mentioned a set of the first group selectors comprises primary, secondary and tertiary groups of switches all arranged in a common crossbar switch provided with 20 hold magnets of which however 4 hold magnets are used for other purposes.

The controller of the set of group selectors comprises an individual crossbar switch provided with 20 hold magnets for connecting test relays to the outgoing junctors from the set of first group selectors and to the primary, secondary and tertiary switches of the set. The different manners, in which this crossbar switch can be disposed, constitute important advantages to the shown embodiment of the system.

In Fig. 18 only junctor 321 is shown of the incoming junctors shown in Fig. 13. Of the links from the primary section 1301 only links 1331 and 1340 are shown. Between the secondary and tertiary sections there are shown links 1921 and 1925.

Of the 50 outgoing junctors connected to the field contacts of the tertiary section there are shown only junctors 1341 and 1391, which are connected to the first and last numerical junctor circuits of the hold magnet, to which the link 1921 is connected.

An incoming junctor, for example 321, comprises two talking branches 1831—1832, a wire 1833 for the connection of cut-off relay 611 of the A-subscriber in series with selecting devices 1812 to which the junctor is connected, a call meter wire 1834, a calling and hold wire 1835 and a test wire 1836.

If a preceding set of line finders and final selectors tests over junctor 321, this operation takes place over test wire 1836, break contact of hold magnet 1821, break contact of relay 1813, make contact of relay 1600 and over a resistance 1601. This resistance is common to all incoming junctors to a primary group of switches. The test wire 1836 obtains upon testing and connection such potential from the preceding test relay of the set of line finders and final selectors, that other junctors incoming to the primary group of switches cannot be connected.

Testing and connection can only be made to such a set of first group selectors, which are able to find an idle register. Each idle register applies minus potential over one or a plurality of wires, particularly when graded registers are used. Register 1700 thus applies minus potential in known manner over wire 1711. The minus potential from the registers operates one or more relays 1600, as long as any register accessible from the set of first group selectors is idle. If all the registers are busy, relay 1600 is deenergized and cuts off the testing potential, so that the set of first group selectors will be marked busy for new calls. The control relays and the registers, however, must be able to make testing operations with respect to connection of links between the secondary and tertiary switches and to disconnect the registers.

When relay 1600 is deenergized, the testing takes place over a test resistance associated with each crossbar switch. The crossbar switch here shown is thus provided with a test resistance 1602.

After the set of line finders and final selectors has tested and found an idle junctor, said set of line finders and final selectors calls over the found junctor by applying plus potential over its calling and hold wire 1835. A select magnet 1800 corresponding to the calling line will then be energized over the following circuit: Plus potential from 1010, wire 1835, break contact hold magnet 1821, break contact relay 1813, select magnet 1800, minus potential. When the select magnet 1800 has been energized, the calling junctor is registered by the operation of a selecting device 1812 over the following circuit: Plus potential, make contact select magnet 1800, break contact relay 1813, selecting device 1812, minus potential. The selecting device 1812 obtains holding current over its own make contact and over a make before break contact of relay 2011 to plus potential.

When relay 2011 has been energized, the selecting device obtains further holding current over a make contact of relay 2011, relay 2200, a break contact of relay 2205, to plus potential.

When the controller has been disconnected, the selecting device 1812 receives holding current over the following circuit: Minus potential, selecting device 1812, make contact of selecting device, 2nd bar and contact of hold magnet 1810, wire 1708, plus potential in the register 1700.

When selecting device 1812 operates, it causes relay 1813 to operate over the following circuit: Plus potential, make contact of selecting device 1812, relay 1813, minus potential.

Upon operation of selecting device 1812, the connect relays of the register finders are called, whereby connect relay 1611 obtains plus potential over the following circuit: Plus potential, break contact hold magnet 1810, make contact selecting device 1812, relay 1611, relay 1813, minus potential.

Simultaneously with the above described operations of selecting device 1812 the cut-off relay 611 of the A-subscriber is operated over the following circuit: Minus potential, relay 611, make contact line relay 610, coil 610, one of wires 309, make contacts of primary and secondary switches of the set of line finders and final selectors, wire 852 of junctor 321, wire 1833, contact and first bar of selecting device 1812, resistance 1815, make contact of selecting device 1812, make before break contact of relay 2011, plus potential.

When cut-off relay 611 is operated, the controller of the set of line finders and final selectors is disconnected.

When relay 1813 is operated the test potential for the incoming junctor is cut off. During the time interval from the time when relay 1813 operates until the test relays 1631—1640 of the register finder are connected by operation of connect relay 1611, the controller can test and prepare the connection of the crossbar switch, because the test wire 1836 of the incoming junctor is now cut off. If the controller is connected, relay 1611 will be shunted by plus potential from selecting device 1812 and relay 2210 (operated), so that the control relays of the register finders cannot be called during the time the controller of the set of first group selectors is connected to the crossbar switch.

When the A-subscriber later on is connected to a register and when afterwards said register is disconnected after having directed pulses to the respective sets of switches, the disconnection must be preceded by a testing operation to ensure that the crossbar switch, to which the register is connected, is not occupied by the controller.

The test relays 1631—1640 for the registers and the test relay 2210 of the controller are thus supposed to be so made and adjusted that upon parallel testing of a plurality of registers, the test relay of the controller only is energized.

When connect relay 1611 is energized, test potential from relay 2210 of the controller is cut off and relays 1814 and 1621 are energized. Relay 1621 then connects test relays 1631—1640 to plus potential over its make contacts, whereby the test relays test which of the registers connected to the set of the first group selectors is idle.

Should there be no idle register on account of the fact, that the register or registers, which were idle at the time of testing, during the interval have been occupied by other sets of first group selectors, relay 1611 is shunted over series contacts of the deenergized relays 1631—1640, so that the controller may have a chance to make the necessary connections. As the calling plus potential to the connect relays of the register finder remains, the test operation is repeated, until an idle register is encountered.

If one or more of the test relays 1631-1640 are energized, relay 1622 will be energized over the following circuit: Minus potential, relay 1622, a make contact of, for example, relay 1631, a series of break contact of relays 1632—1640 a make contact of relay 1611, plus potential. When relay 1622 is energized, relay 1621 will be deenergized and plus potential for the test relays will be cut off, whereby relay 1623 will be energized over the following circuit: Minus potential, relay 1623, break contact relay 1621, make contact relay 1622, make contact relay 1611, plus potential. One of the test relays, for example 1631, receives holding current over the following circuit: Minus potential, from a register 1700, relay 1631, make contact relay 1631, make contact relay 1622, make contact relay 1611, plus potential.

When relay 1623 has been energized, a select magnet corresponding to the operated test relay is energized, said select magnet being situated in the primary select group which corresponds to connect relay 1611 and to relay 1814. If test relay 1631 is energized, select magnet 1800 is energized over the following circuit: Minus potential, select magnet 1800, make contact relay 1814, make contact relay 1631, break contacts relay 1632—1640, make contact relay 1623, plus potential.

Upon operation of select magnet 1800, hold magnet 1810 is energized over the following circuit: Minus potential, hold magnet 1810, make contact relay 1814, make contact relay 1813, make select magnet 1800, plus potential. The hold magnet 1810 then obtains holding current over the following circuit: Minus potential, hold magnet 1810, make contact hold magnet 1810, break contact relay 2011, plus potential.

Hold magnet 1810 serves as register finder and in this case cannot register 1700. When the hold magnet is energized, the register is switched to the A-subscriber over junctor 321, and the register is simultaneously called by impressing plus potential over the following circuit: Plus potential, break contact relay 2011, field contact bar 2 of hold magnet 1810, wire 1708, register 1700, minus potential. After the register has been called, said register transmits holding plus potential over the same wire 1708 to the selecting device 1812, until disconnected.

The incoming junctor 321 will be connected to the incoming talking branches 1701 and 1702 of the register over field contacts and bars 4 and 5 of selecting device 1812 and over field contacts and bars 8 and 9 of the register finder 1810. Outgoing talking branches 1703 and 1704 and message register wire 1705 are connected to field contacts of the cross bar switch of the controller over field contacts and bars 7, 6 and 5 respectively of the register finder 1810.

The register receives in known manner the dial pulses from the A-subscriber. After a desired number of such pulses has been registered, the register transmits the operating combination which corresponds to the numerical position of the set of the first group selectors and calls its controller by applying plus potential over call wire 1709 of the register, so that the call relay 2011 of the controller receives plus potential over a field contact of bar 1 of register finder 1810.

Call relay 2011 is energized over the following circuit: Plus potential over wire 1709, bar 1 of hold magnet 1810, break contact relay 1811, call relay 2011, break contact relay 2011, break contacts 2020—2011, minus potential; whereafter call relay 2011 obtains holding current over its own make contact before break contact.

If the controller has been connected by the operation of relay 2011, a select magnet 2000, for example, corresponding to the primary group of switches 1301 will be energized over the following circuit: Minus potential, select magnet 2000, make contact call relay 2011, break contact hold magnet 2021, break contact relay 2205, plus potential.

Upon operation of relay 2011, relay 2200 will be energized over the following circuit: Minus potential, hold magnet 1810, make contact hold magnet 1810, make before break contact of relay 2011, relay 2200, break contact relay 2205, plus potential.

Relay 2205 will now be energized over the following circuit: Minus potential, relay 2205, make contact relay 2200, plus potential. Relay 2200 is slow-acting and must not release after energization of relay 2205, before it receives new holding plus potential over make contact of relay 2206, when said relay operates.

Relay 2205 disconnects the controller by cutting off the holding current of relay 2200, if the register should not immediately transmit a numerical operating signal, for example because of the A-subscriber having put his receiver on its hook. When select magnet 2000 operates, the hold magnet 2021 will be energized over the following circuit: Minus potential, hold magnet 2021, break contact relay 2206, make contact select magnet 2000, plus potential.

Hold magnet 2123 receives minus potential over series break contact of relay 2101—2110 and is operated. When hold magnets 2021 are energized select magnet 2000 is deenergized due to the fact that its holding circuit is opened over a break contact of hold magnet 2021, and relays 2201—2204 are connected to the talking and call meter wires of the calling junctor over field contacts and bars 2—4 of hold magnet 2021 and over field contacts and bars 5, 6, 7 of hold magnet 1810 and bars 3—5 of hold magnet 1811. Relays 2201—2204 register the numerical signals transmitted from the register and which is supposed to be transmitted to the said relays in the form of coded digits.

Relays 2203—2204 are here connected to the call meter wire in such a manner that relay 2203 can be energized by all potentials transmitted by the register over said wire, while relay 2204 obtains a certain pre-potential over a potentiometer, so that the relay cannot be energized. The number of wires in the circuit can be reduced to two, if the register is allowed to transmit currents of different intensity and different directions. The relays 2201—2204 receive plus potential, when hold magnet 2021 is energized.

Suppose that relays 2201—2204 are being set in the combination that corresponds, for example, to the last or the 9th numerical group of junctors. It is understood that in each combination of operating positions at least one relay is energized. The slow acting relay 2206 thereby obtains operating current over the following circuit: Plus potential, break contact relay 2307, relay 2206, an operated contact of 2201—2204, make contact relay 2130, minus potential.

When relay 2206 is energized, it applies plus potential to the combination contacts so that in this case select magnet 2009 is energized over the following circuit: Minus potential, select magnet 2009, make contact relay 2201, break contacts relays 2202—2204, make contact relay 2206, break contact relay 2207, plus potential.

Hold magnet 2123 has its field contacts connected to the call and hold wires of the outgoing links from the primary select group 1301 of the first group selectors. These wires have plus potential when the corresponding links are busy. In this case primary section 1301 is connected to the crossbar switch of the controller, whereby the links 1331—1340 are connected to the bars of hold magnet 2123 over its upper field contacts. Each busy link in the calling primary group of switches actuates one of the corresponding 10 relays 2101—2110.

As the links of the primary group of switches are connected to a secondary group of switches 1311—1320, these relays 2101—2110, which are energized will indicate the secondary sections, which cannot be reached from the corresponding primary group of switches.

The relays 2101—2110, which are energized, receive holding current over their own make contacts and over a make contact of relay 2200. Relays 2101—2110 have a short time of actuation compared to the time of deenergization of relay 2123. The seeking of an idle outgoing junctor takes place only in the tertiary group of switches, the corresponding secondary group of switches of which can be reached by the calling primary groups of switches.

A certain secondary section may, however, not be accessible, due to the fact that all of its links to the tertiary section might be busy.

In this case the relay corresponding to the secondary section receives operating current over series contacts of the five secondary hold magnets. Thus, for example, relay 2101 corresponding to the secondary section 1311 can be operated in the following manner: Plus potential is applied to the relay either over the calling and holding wire of the inner link 1331, over a field contact and bar of hold magnet 2123, or directly from the hold magnet of the secondary section 1311 over make contacts of hold magnet 1901—1905. By marking not accessible tertiary sections in the said manner, the selection of an idle junctor in a numerical group of junctors can be accelerated, whereby such tertiary sections do not enter into the seeking or hunting operation.

Test wires belonging to outgoing junctors from different tertiary sections are connected to field contacts of hold magnets 2111—2120 in such a manner that each hold magnet corresponds to a certain tertiary section and so that each bar of a certain hold magnet corresponds to a hold magnet of the tertiary section and to the corresponding numerical group of junctors. Thus, for example, the outgoing junctor 1341 from tertiary section 1321 has its test wire connected to a field contact bar of hold magnet 2111, group of junctors 0, while an outgoing junctor 1391 from the same tertiary section and the same hold magnet has its test wire connected to the same hold magnet 2111 and the same bar, but to group of junctors 9.

In order to ensure that the outgoing junctors connected to different groups of field contacts of a certain tertiary hold magnet can be connected to the corresponding secondary section over a link connected thereto, said link is tested by the test relay over a break contact of this hold magnet or over a hold magnet of the secondary section. In this case testing is simultaneously made by five test relays 2301–2305 over five junctors outgoing from a tertiary section.

When select magnet 2009 of the controller is energized and thus indicates that a numerical connection shall be made over trunk group 9 hold magnet 2124 is energized over the following circuit: Plus potential, make contact select magnet 2009, make contact relay 2206, break contact relay 2208, hold magnet 2124, minus potential. The hold magent then receives holding current over its make contact and over a make contact in relay 2200. When the select magnet 2009 is operated, a seeking operation is also started, whereby hold magnet 2111 is operated over the following circuit: Minus potential, hold magnet 2111, a break contact relay 2101, a break contact relay 2208, a make contact relay 2206, a make contact select magnet 2009, plus potential. When hold magnet 2111 is energized, test relays 2301—2305 are each connected to respective test wires of outgoing junctors from the tertiary section 1321.

If no connection can be obtained by the test relays, relay 2101 is energized over a make contact of hold magnet 2111, whereby relay 2101 obtains holding current over its own make contact and over make contact of relay 2200. When relay 2101 operates, hold magnet 2111 is deenergized. Hold magnet 2112 and afterwards relay 2102 are energized. When relay 2102 is energized, hold magnet 2112 is deenergized. In similar manner the subsequent hold magnets and corresponding relays are operated. Each time a hold magnet is energized, the test relays 2301—2305 are connected to the test wires of the corresponding junctors outgoing from the tertiary section. It is obvious that if certain of the relays 2101—2110 are energized at the beginning of the hunting operation, the corresponding hold magnets do not take part in the seeking operation.

If no idle connectable outgoing junctor is found after hunting over the entire group of junctors, relay 2130 is energized over the following circuit: Minus potential, operating coil of relay 2130, break contacts of relays 2120—2111, make contact of operated busy marking relays 2110—2101, break contact relay 2208, make contact of operated relay 2206, make contact of select magnet 2009, plus potential. Relay 2130 obtains holding current over its holding coil over the following circuit: Minus potential, coil 2130, make contact 2130, make contact of operated relay 2205.

When relay 2130 has been operated, minus potential is applied over field contact of bar 1 of hold magnet 2021 to calling relay 2011, so that said relay is shunted and deenergized.

In order to prevent holding plus potential to the preceding switching rank from being interrupted, relay 2130 also applied plus potential to call relays 2011—2020. When relay 2011 is deenergized, the entire controller is disconnected and call relay 2011 cannot be called again until the shunt connection ceases, whereby relay 2130 is deenergized, when the controller has been disconnected. In the meantime other waiting calls have the possibility of using the controller by actuating the connect relays of the respective primary sections.

If, however, one or more idle accessible outgoing junctors are found, for example in the tertiary section 1321, some of the test relays 2301—2305 are energized.

When any of the test relays 2301—2305 is operated, relays 2207 and 2307 are actuated. When relay 2207 is operated, select magnet 2009 and relays 2201—2204 are deenergized, whereby plus potential is applied over talking and call meter wires. This application of plus potential is a signal to the register, that a new numerical signal shall be transmitted.

When relay 2307 is operated, the plus potential to the test relays is interrupted, so that the actuated test relay to the left only can receive holding plus potential over its make contact.

Upon actuation of relay 2307, select magnet 2000, corresponding to section 1321 and to hold magnet 2111, is also actuated over the following circuit: Plus potential, make contact relay 2307, make contact hold magnet 2111, select magnet 2000, minus potential.

At the same time as select magnet 2000 is energized, the corresponding select magnet 1800 in the primary switching group 1301 is energized so that switching can take place to the secondary section 1311 which can make the desired connection. The select magnet 1800 is operated over the following circuit: Plus potential, make contact relay 2307, make contact hold magnet 2111, a field contact and bar 6 of hold magnet 2021, select magnet 1800, minus potential.

The select magnets of the said section are here connected in parallel with the select magnets of the controller, whereby each of the first mentioned select magnets receives plus potential over a field contact of one of bars 6—15 of hold magnet 2021.

When relay 2307 is actuated, slow-acting relay 2208 is energized and relay 2206 is deenergized. When relay 2208 is operated, relay 2212 is also energized.

Relay 2212 later on receives holding current over its make contact, break contact relay 2208, field contact of bar 5 of hold magnet 2021, and over field contacts of the call and hold wires of the links connected later on.

Relay 2206 is slow-acting, due to an electrolytic condenser 2213 and will remain actuated, until the controller is disconnected.

Select magnet 2000 actuates hold magnet 2022 over make contacts in relays 2206 and 2208. Hold magnet 2022 receives holding current over its make contact and over make contact of relay 2200. Hold magnet 2022 registers the secondary and tertiary groups, over which the selected junctor can be connected.

When select magnet 1800 is actuated at the same time as select magnet 2000 as previously mentioned, hold magnet 1811 is actuated over the following circuit: Plus potential, make contact select magnet 1800, make contact relay 1813, break contact relay 1814, field contact and bar 17 of hold magnet 2021, make contact relay 2208, field contact and bar 5 of hold magnet 2021, hold magnet 1811, minus potential. Hold magnet 1811 obtains holding current over its make contact, partly from the controller and partly from the register (over a field contact and bar 2 of the register finder 1810 and over wire 1708).

The call is now temporarily switched in the primary switching group. Switching takes place over the register finder 1810, until the register is disconnected. Before any switching can take place in the secondary and the tertiary groups of switches, the controller must busy-mark the crossbar switch, in which the secondary and tertiary group of switches exist in order to prevent the select and hold magnets of the said crossbar switch from being actuated from other directions.

Testing will take place as soon as hold magnet 2022 operates. The following testing circuit is obtained: Plus potential, testing relay 2210, field contact and bar 3 of hold magnet 2022, break contact of the corresponding connect relay 1611 to the operating devices of the register selector, a contact in relay 1600, testing resistance, minus potential.

If a call has arrived to a primary group of switches of a crossbar switch, or if any other switching takes place in the same, relay 2210 cannot test, because the test circuit has either been opened by the connect relay 1611 or parallel testing in usual manner makes testing impossible.

If a crossbar switch is idle, in which sections 1301, 1311 and 1321 are located, test relay 2210 operates, and busy-marks the crossbar switch by causing operation of relay 1813 over the following circuit: Plus, make contact relay 2210, field contact and bar 4 of hold magnet 2022, relay 1813, minus. When relay 2210 operates, the operating circuit of relay 2208 is opened, relay 2208 is deenergized, and the select magnet 1800 is operated for connection of a secondary section to a link leading to the calling primary section.

Relay 2208 which is slow acting remains operated, until the hold magnet of the secondary section has been operated. The select magnet of the secondary section, in this case select magnet 1800, is operated over the following circuit: Plus, make contact relay 2208, make contact relay 2210, field contact and bar 18 of hold magnet 2021, field contact and bar 5 of hold magnet 2022, select magnet 1800, minus.

Upon operation of select magnet 1800, the secondary hold magnet which has been indicated by test relays, in this case hold magnet 1901, corresponding to test relay 2301, is operated over the following circuit: Plus, make contact select magnet 1800, make contact relay 1813, break contact relay 1814, field contact and bar 2 of hold magnet 2022, make contact relay 2210, make contact relay 2208, make contact test relay 2301, field contact and bar 15 of hold magnet 2022, hold magnet 1901, minus. Hold magnet 1901 receives holding current from the controller and also from the register over one of its break contacts, over field contacts in the switches operated by hold magnets 1901 and 1811 and over a make contact of hold magnet 1811. When the slow acting relay 2208 is deenergized, select magnet 1800 is disconnected and relay 2209 is energized. When relay 2209 is energized, the select magnet corresponding to the secondary and tertiary sections is operated according to the desired numerical group of junctors. Said group of junctors has previously been registered by hold magnet 2124, and hold magnet 2022 has already registered in which secondary and tertiary section the connection should take place. In this case select magnet 1809 (group 9 of junctors) is operated over the following circuit: Plus, make contact relay 2209, field contact and bar 1 of hold magnet 2124, field contact and bar of hold magnet 2022, select magnet 1809, minus.

When select magnet 1809 operates, one of the hold magnets of the tertiary section, which has been indicated by the test relays, in this case hold magnet 1911, will be operated. Hold magnet 1911 is operated over the following circuit: Plus, select magnet 1809, make contact relay 1813, break contact relay 1814, field contact and bar 2 of hold magnet 2022, make contacts relays 2210 and 2209, make contact test relay 2301, field contact and bar 20 of hold magnet 2022, hold magnet 1911, minus. The tertiary hold magnet 1911 obtains holding current over its make contact and over field contacts pertaining to the call and holding wires of the links.

The call is now switched through the first group selectors and a call signal is transmitted over the call and holding wire of the outgoing junctor by impressing a plus potential over the following circuit: Relay 2212, make contact relay 2212, break contact relay 2208, field contact and bar 5 of hold magnet 2021, field contact and bar 2 of hold magnet 1811, field contacts and bar 1 of hold magnets 1901 and 1911 and call and holding wires of junctor 1391.

If an idle set of switches in the next group of switches has been found, a device in said set transmits a revertive signal in the form of plus potential to the calling set of the first group selectors, whereby relay 2212 is short-circuited and deenergized.

In this manner an indication is obtained that the controller can be disconnected. When relay 2212 is deenergized, an electrolytic condenser, which makes relay 2206 slow acting, is disconnected, and relay 2206 is deenergized.

When relay 2206 has been deenergized, disconnection takes place. Ordinarily, when establishing a connection, relay 2212 will have time to be deenergized before relay 2206 is deenergized. If such is not the case, relay 2211 will register an erroneous switching operation. A plurality of relays located in a panel common to a plurality of sets of first group selectors, will indicate the operating positions of the different switches. These relays shown in Figs. 45–46 receive plus potential over wire 2220 and register which first group selector unit is indicated as out-of-order.

Furthermore, indication is given over wire 2221 and a field contact and bar 16 of hold magnet 2021, to which primary section a call has arrived. The numerical group of junctors connected is indicated over wire 2222 and a field contact and bar 2 of hold magnet 2124. Over wire 2223 and over field contacts of bar 1 of hold magnet 2022 information is given, which secondary and tertiary sections have been selected. Over wire 2224 and over make contact of any of test relays 2301—2305 notice is given which hold magnets have been found in the secondary and tertiary sections.

Thus the group of junctors is determined with the exception that one does not know which incoming junctor has been called in the primary section. If information about said junctor is desired, such information can be obtained over a field contact of the selecting device 1812.

If a calling incoming junctor, due to some bad contact, cannot call the controller, all incoming junctors to the corresponding primary section will be blocked, although the out-of-order control device continues to function. In this case a time relay, common to the group, lights an alarm lamp shown in Figs. 45–46.

When the register has transmitted the necessary signals, it should be disconnected and a normal switching route should be established. Before such switching operations can take place, the register must determine that the crossbar switch will hold magnet 1810, over which the register is connected, is not busy with the controller for establishing a connection.

The register, therefore, must test for a test resistance 1601 or 1602 over the following test circuit: Plus, a test relay (not shown) of the register, test wire 1706, field contact and bar 4 of hold magnet 1810, break contact connect relay 1611, test resistance 1601 or 1602, minus. When simultaneous testing operations take place, arrangements have been made so that the test relay of the controller cannot operate, for example by momentarily disconnecting the test relay of the register, if testing should not take place immediately.

When the test relay of the register tests for and marks busy the crossbar switch, a disconnection signal is transmitted by means of a plus potential over wire 1707. A select magnet corresponding to the connected link is then operated. Select magnet 1800 corresponds to junctor 1331. This select magnet is actuated over the following circuit: Plus, wire 1707 from the register, field contact and bar 3 of register finder 1810, field contact and bar 1 of hold magnet 1811, select magnet 1800, minus.

When the select magnet has been operated, hold magnet 1821 corresponding to calling junctor 321 is operated over the following circuit: Plus from the register over the wire 1707, field contact and bar 3 of register finder 1810, make contact of select magnet 1800, field contact and bar 3 of seletcing device 1812, hold magnet 1821, break contact (make before break) of hold magnet 1821, minus.

Hold magnet 1821 receives holding current over the following circuit: Holding plus potential over the call and holding the wire of the encountered switch, field contacts in the tertiary, secondary and primary hold magnets entering into the call, hold magnet 1821, make contact (make before break) of hold magnet 1821, wire 1833 in junctor 321, field contacts in secondary and primary hold magnets in the set of line finders and final selectors, contacts and lines in the line relay (610 and 611) of the calling subscriber, minus.

About 100 milliseconds after the register has transmitted the signal, the disconnect plus potential is disconnected, which the register had sent out over its call and holding wire 1708, and which existed on a field contact and bar 2 of register finder 1810. Register finder 1810, hold magnet 1811 and selecting device 1812 are then released, and when selecting device 1812 is released, relay 1813 is deenergized. Normal switching route has now been established, and the idle junctors incoming to the primary switches are available for new calls.

*Second group selectors*

Figs. 24–29 show an embodiment of a set of second group selectors diagrammatically shown in Fig. 14. The arrangement of primary, secondary and teritary groups of switches shown in Fig. 14 is similar to that shown in Fig. 13.

Fig. 24 shows a primary group of switches of a set of second group selectors, an extra hold magnet being used as a selecting device and a relay associated therewith.

Fig. 25 shows secondary and tertiary groups of switches of the said set.

Figs. 26–29 show a controller for the set of the second group selectors of about the same construction and functioning as that shown in Figs. 20–23. Similar parts in Figs. 26–29 have similar numerals adjusted to the corresponding figure numbers 26–29 as those shown in Figs. 20–23. A detailed description of said parts is therefore not given here.

In the set of second group selectors there are 6 test relays 2901–2906 connected corresponding to 6 outgoing junctors in each tertiary section, and in each numerical junctor circuit.

In Figs. 24–25 there are shown only one incoming junctor 1341 and two outgoing junctors 1441 and 1491.

From the first primary section 1401 there are only shown links 1431 and 1470 to secondary switches, and between secondary and tertiary switches there are shown links 2521 and 2526 only.

Of 60 outging junctors connected to the field contacts of the tertiary switches there are shown only junctors 1441 and 1491. An incoming junctor, for example, 1341 comprises two talking branches 2421 and 2422, a call meter wire 2423, a call and hold wire 2424 and a test wire 2425.

When a preceding set of switches has tested and found an idle switching device over a common testing resistance 2426 corresponding to a primary switch, test wire 2425 obtains such potential from a test relay of the preceding group of switches, that other incoming junctors connot be connected. After the said preceding set of switches has tested and found an idle switching organ, plus potential is applied over call and hold wire 2424. A select magnet 2400 corresponding to the found junctor is thereby energized in known manner. When the select magnet 2400 operates selecting device 2410 is operated over a break contact of relay 2411 and a make contact of select magnet 2400. When selecting device 2410 operates, it causes relay 2411 to be energized, whereby select magnet 2400 is deeneregized and the test potential is interrupted.

When relay 2411 is energized the calling junctor receives holding current over its call and hold wire 2424 by applying plus potential over a field contact of bar 1 of selecting device 2410.

Simultaneously the controller, Figs. 26–29, is called, whereby call relay 2611 operates over the following circuit: Plus potential, make contact selecting device 2410, relay 2611, break contact 2611, break contacts relays 2620—2611, minus potential, if none of the relays 2611—2620 is operated, that is to say, the controller is idle.

If any of the said relays is energized, the call must wait. If there are several waiting calls, the primary switch, the connect relay of which is first to the left in the chain, is called first. In the meantime selecting device 2410 receives holding current over its make contact and over a make before break contact in connect relay 2611.

When a select magnet 2400 of the primary group of switches 1401 operates, a hold magnet 2441 of the calling junctor is energized over the following circuit: Plus potential, make contact select magnet 2400, a make contact relay 2411, a field contact of bar 17 of hold magnet 2621, a make contact relay 2808, a field contact of bar 5 of hold magnet 2621, a field contact of bar 2 of selecting device 2441, minus potential.

The hold magnet 2441 of the calling junctor afterwards receives holding current over a make before break contact of the non-operated relay 2808, over a make contact of relay 2812 and over a low ohmic resistance coil of said relay.

The hold magnets of the secondary and tertiary groups of switches can afterwards receive holding current from similar circuit as described in connection with sets of first group selectors. When connection has been established, the hold magnets obtain holding current over the call and hold wire of the encountered junctor.

Other switching circuits and their functioning are similar to those already described in connection with the set of the first group selectors and therefore will not be described here.

The above described sets of group selectors, to which certain incoming junctors can be connected, even when the corresponding controller is busy, can be made in a plurality of different manners. Thus each set of group selectors can be provided with one or more controllers, which alternately can be connected to any primary group of switches. A set of group selectors could thus be provided with several controllers, if a single controller should be busy for a relatively long time in establishing a connection, for example if it is to receive ordinary series of dial pulses, or if it is to operate in a set of third group selectors, where they will receive also numerical operating signals for the set of line finders and final selectors.

In a set of group selectors comprising a plurality of controllers care must be taken, however, that only one of the controllers be connected, when parallel testing for the same secondary and tertiary sections takes place.

A switching device is provided for connecting any of the controllers. The said switching device can consist of two connect relays for each primary section, whereby each such connect relay forms its own circuit over contacts of the other relays in such a manner that the other relays can be cut out. Each primary section can call either of its two connect relays over contacts in a switch relay common to all primary sections, which switch relay, for example, is operated, when the first encountered controller is busy. A more detailed description will later on be given in connection with Fig. 44.

*Third group selectors*

Fig. 30 is a schematic diagram of a set of third group selectors and Figs. 31–37 show an embodiment of such a set and a current feed circuit.

Fig. 31 shows a connecting and current feed circuit. A time control device is not shown, but if such a device were used, it could cause a subscriber to be disconnected a certain time after a busy tone has been given, or when only one of the subscribers has put his receiver on its hook.

Figure 32:
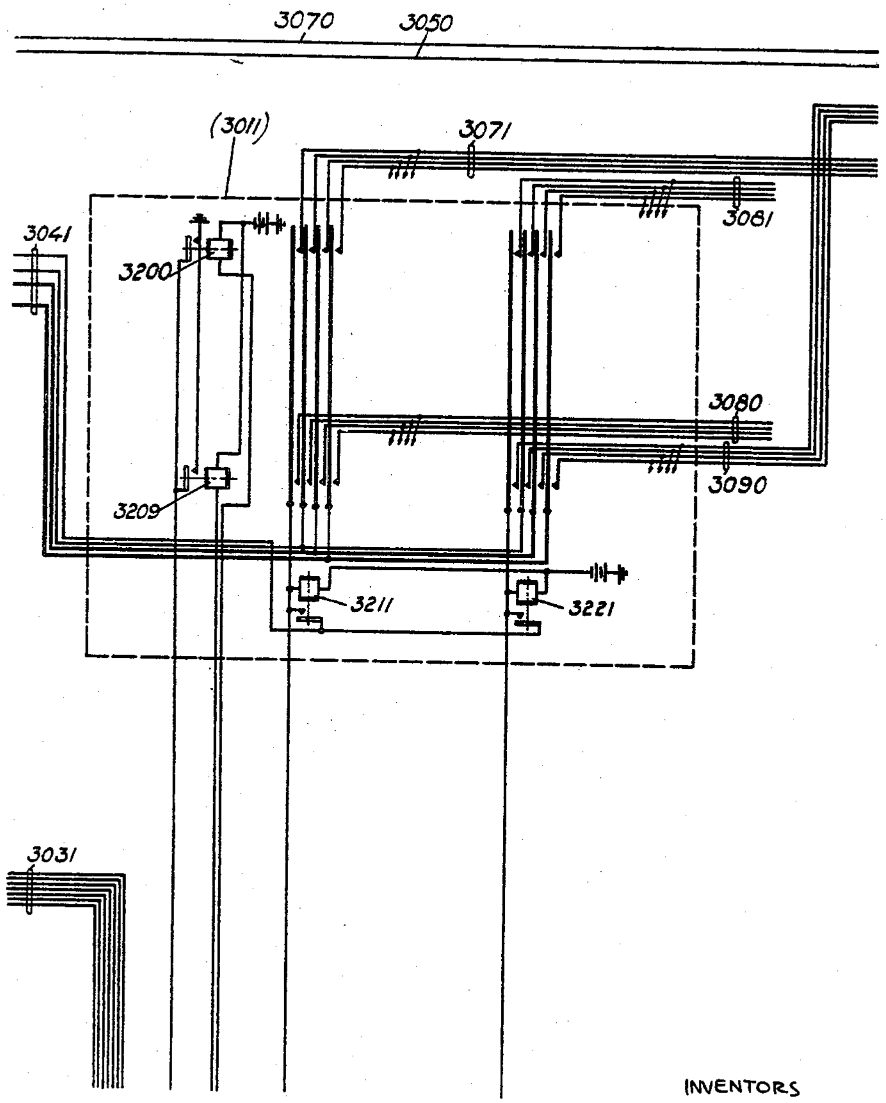
Figure 33:
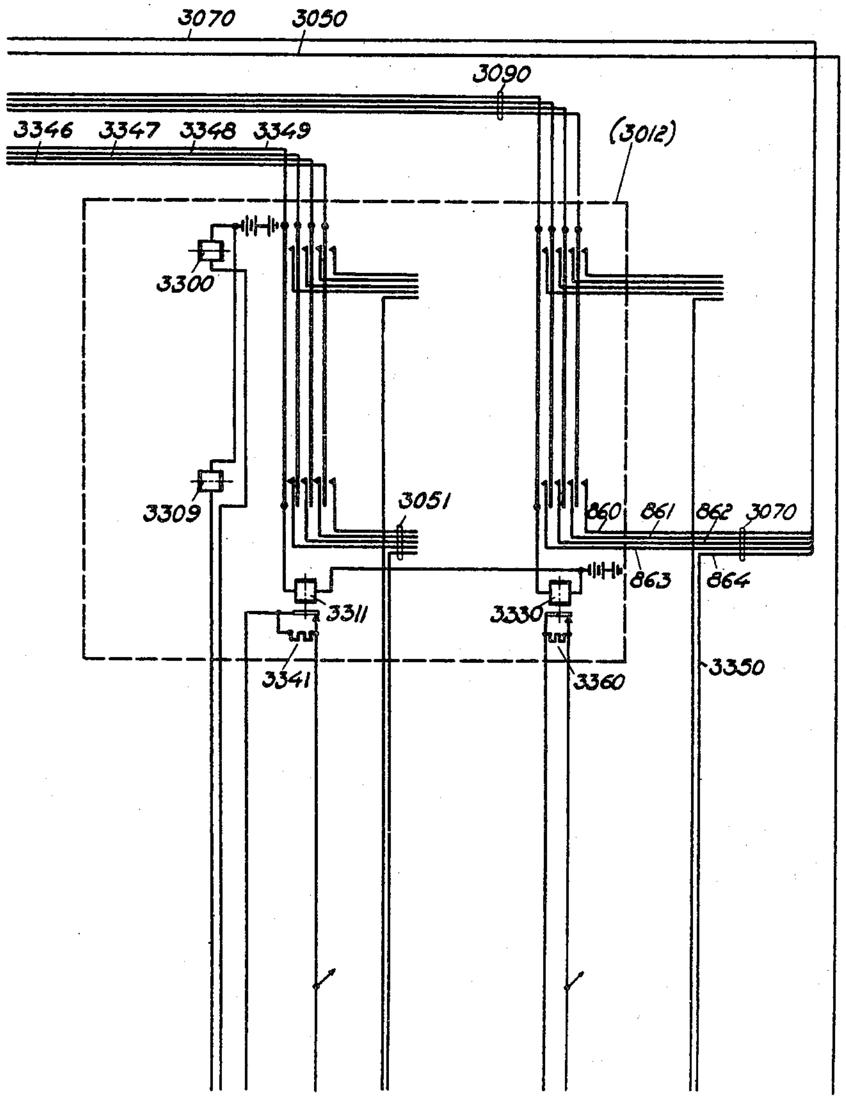
Figure 34:
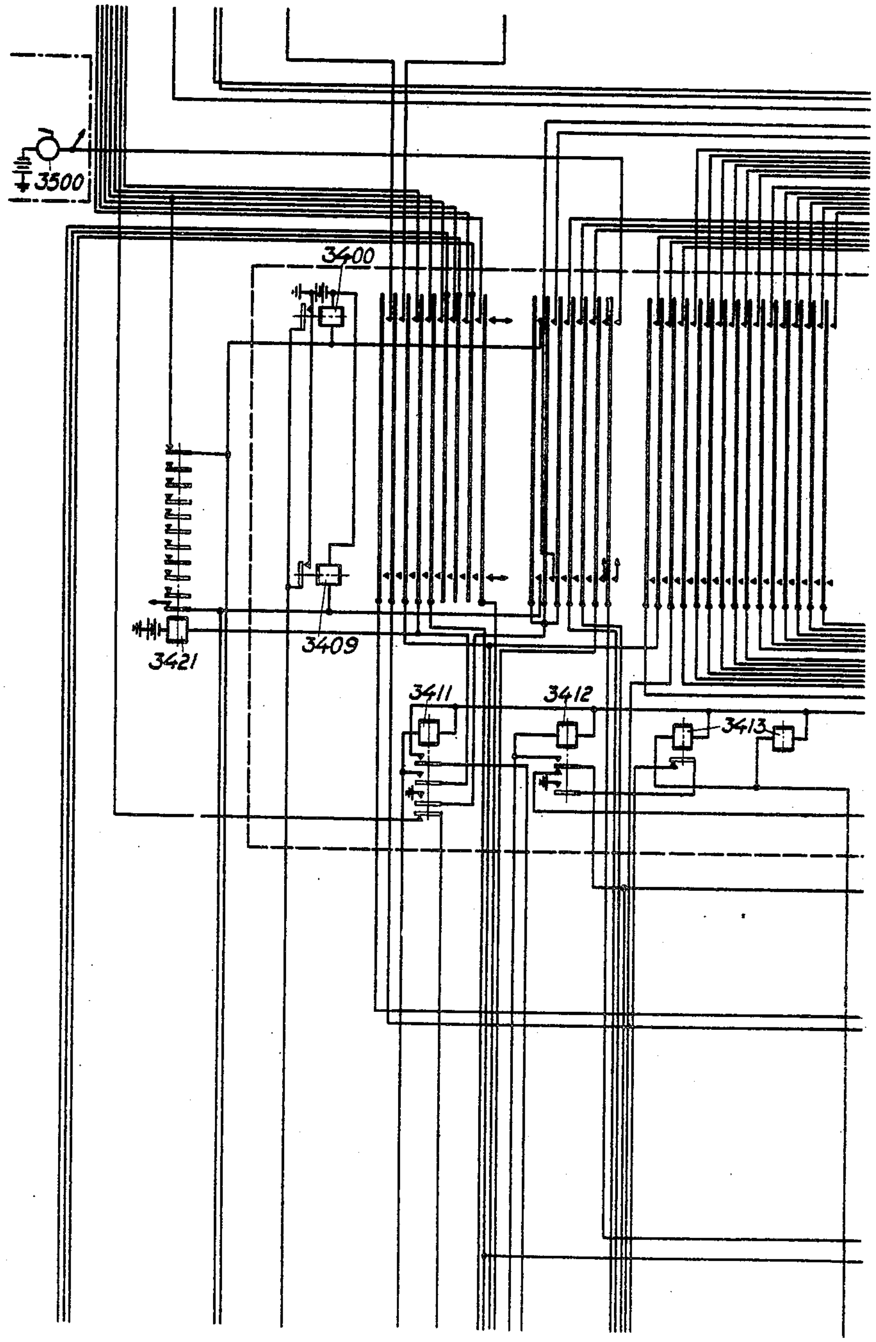

Fig. 32 shows a primary crossbar switch. Fig. 33 shows a secondary switch. Fig. 34 shows selecting devices for the controller of the sets of third group selectors, the line finders and final selectors.

Figs. 35–37 show a controller for the set of the third group selectors.

In the schematic diagram shown in Fig. 30 there are 10 junctors incoming to primary crossbar switch 3011 although only one junctor 1441 is shown. Between primary 3011 and secondary 3012 crossbar switches there are 20 links provided, although only links 3071, 3080, 3081 and 3090 are shown.

Each junctor incoming to the connecting circuit Fig. 31, for example 1441, will in the said circuit be divided in two wire groups of which one group 3041 is connected over break contacts in the talking branches to the bars of two hold magnets in the primary crossbar switch, while the other group 3031 connects to a selecting device 3411 and the controller 3099, Figs. 34–37, which is used for controlling the connection through the set of the third group selectors.

In Figs. 31–37 the upper incoming wire group 3041 has four wires, of which 3146 and 3147 are talking branches, 3148 is a wire, over which the cut-off relay of the B-subscriber is actuated and wire 3149 is a holding wire.

The lower incoming wire group 3031 contains 7 wires, of which 3151 and 3152 are wires connected to talking branches. 3153 is a call meter wire (to be used together with wires 3151 and 3152 for the transmission of operating signals). 3154 and 3155 are call and hold wires. Holding plus potential is applied from the hold relay of the controller over wire 3154. When the controller is to be disengaged, the plus potential over wire 3155 is interrupted by relay 3100. Wire 3156 is used for testing for the controller. The controller can also be disengaged by a disconnecting signal transmitted over wire 3157. These operations will be more fully described later on.

In Figs. 32–33 links 3071 and 3090 of the 20 links are shown. Of 200 outgoing junctors from the field contacts of the secondary crossbar switch 3012, there are shown only four, of which two, 3051 and 3070, are located in the last numerical group and represent respectively the first and last outgoing junctors of the group of junctors.

Each of the links comprises four wires of which 3346 and 3347 are talking branches. 3348 is a wire, over which the cut-off relay of the B-subscriber is operated, and 3349 is call and hold wire. The outgoing junctor 3070 contains the same wires as the link and also a test wire 3350, by means of which it can be ascertained whether a certain outgoing junctor to a set of line finders and final selectors is idle. A crossbar switch Figs. 34–35, containing selector devices and switches of the controller contains 9 hold magnets. One of these switches contains so many contact bars that for practical purposes it has been necessary to connect two hold magnets in parallel. In Fig. 34 a hold magnet 3411 serves as a selecting device for selecting a junctor between a controller in the rank of third group selectors and a controller in the rank of second group selectors.

Hold magnets 3412 and 3413 form a selecting device for registering hundreds numerical digits of the dial pulses and for connecting an operating circuit, for example 3050 to the controller of the desired final selector. Hold magnets 3514 and 3515 register dial signals corresponding to tens and units numerical digits and transfer same to contact bars of hold magnet 3413. Each one of hold magnets 3516–3519 connects five test wires from 5 test relays to outgoing junctors in the desired numerical group of junctors. By successively operating the four hold magnets 3516–3519 the controller can accordingly test over 20 outgoing junctors to a desired set of line finders and final selectors.

In order to prevent testing over such idle junctors to which connection cannot be made in the set of third group selectors, due to the fact that corresponding links are busy by other calls, the test relays are connected to the contact bars of the hold magnets over break contacts of the respective hold magnets of the secondary crossbar switch 3012. One contact bar in each of the hold magnets 3516—3519 corresponds to a hold magnet of crossbar switch 3012.

In order to engage the desired set of final selectors and line finders in the shortest possible time, said set is sought after all the dial pulses have been received. The register should be arranged so that it primarily transmits dial signals corresponding to tens and units numerical digits and thereafter the hundreds numerical digit, whereby the advantage is obtained that it is not needed first to register the hundreds numerical digit and then to operate the select magnets for indicating the registered group of junctors.

As already mentioned in connection with the set of line finders and final selectors the operating circuit 3050 comprises three wire groups 907 and 908, each of 6 wires to be used for the transfer of the tens and units numerical digits, and also group 909, which contains a number of control wires.

This wire group contains 6 wires of which wire 901 is used for preparing the busy marking of the set ol line finders and final selectors. Wires 902 and 903 are test wires. Wire 904 is a wire over which the set of line finders and final selectors gives a signal to the third group selector, that the seeking operation can be started to locate an idle outgoing junctor, which also can be connected to an idle link in the set of third group selectors.

Over wire 905 will be transmitted a signal, that disconnection should be made, when connection over links of the set of line finders and final selectors is blocked.

We suppose that a call is testing for connection over a wire of group of junctors 1441 by applying plus potential over a break contact of relay 3100, wire 3156, a break contact of hold magnet 3411, break contacts relays 3606 and 3707, resistance 3700 to minus potential. After the preceding switch in a set of second group selectors has been connected, said switch applies calling plus potential over wire 3154. The calling potential in this case operates select magnet 3400 over a break contact of relay 3421. When select magnet 3400 has been energized, a selecting service 3411 in the form of a hold magnet is energized over the following circuit: Minus potential, selecting device 3411, break contact relay 3609, break contact 3608, make contact 3400, plus potential. When selecting device 3411 is energized, relay 3421 is also operated over a make contact of selecting device 3411. Upon actuation of selecting device 3411, it applies plus potential to wire 3155 over a field contact and bar 4 of selecting device and over a break contact in relay 3100 to the call and holding wire of the junctor 1441 so that the preceding switch obtains holding plus potential. When relay 3421 is energized, select magnet 3400 is deenergized. Selecting device 3411 and relay 3421 later on obtained holding plus potential from a make contact of the slow acting hold relay 3606, over bar 5 of selecting device 3411, wire 3154, a break contact relay 3100 and back again as beforementioned over wire 3155.

When selecting device 3411 is energized, the wires 3151, 3152 and 3153 are connected over field contacts of bars 8, 7 and 6 of selecting device 3411 and over break contacts of relay 3607 to relays 3601—3604. As all these wires from the beginning carry plus potential from the preceding rank of switches, all four relays 3601—3604 are energized, as said relays obtain minus potential over a make contact of selecting device 3411.

Relay 3606 is then energized over the following circuit: Plus potential, make contact relays 3601—3604, slow acting relay 3606, a break contact of relay 3707, minus potential. At the same time relay 3605 is energized. When relay 3606 is energized, relay 3608 is actuated over the following circuit: Minus potential, relay 3608, a break contact of hold magnet 3515, a make contact in relay 3606, plus potential.

When the set of switches of the preceding rank has ceased to apply plus potential over wires 3151—3153, relays 3601—3604 are set in a combination corresponding to the operating tens numerical digit. A select magnet of select magnets 3400—3409 corresponding to the desired tens numerical digit is energized over the combination contacts of relays 3601—3604 and over a make contact of relay 3605.

When the select magnet corresponding to the tens numerical digit has been energized, plus potential is applied over a make contact of the select magnet to hold magnet 3514 over the following circuit: Plus potential, make contact of select magnet, make contact relay 3608, break contact relay 3609, hold magnet 3514, minus potential.

The same plus potential causes relay 3607 to energize over make contact of the energized relay 3605. Relay 3607 operates and applies plus potential over wires 3151—3153, so that the register now receives a signal that a new combination signal shall be transmitted. When hold magnet 3514 is energized, relay 3609 is actuated over the following circuit: Minus potential, relay 3609, make contact relay 3514, a break contact hold magnet 3412, a make contact of energized relay 3606, plus potential.

When relay 3607 is energized, relays 3601—3604 are deenergized so that the select magnet and relay 3605 are deenergized. Relay 3607 is also deenergized so that a new dial combination can be received from the register.

When relays 3601—3604 afterwards are set in a combination that corresponds to units numerical digit, one of the select magnets relay 3605 and relay 3607 are again energized. The before mentioned plus potential over a make contact of the select magnet then causes relay 3607 over a make contact of relay 3605 again to operate, and also hold magnet 3515 will be operated over make contacts of energized relays 3608 and 3609. The hold magnet 3515 receives holding current over a make contact of energized relay 3606. When hold magnet 3515 is energized, relay 3608 is deenergized.

When relay 3607 is energized, relays 3601—3604, the select magnet and relay 3605 are deenergized as before, and a signal is transmitted to the register that it should transmit the next numerical digit signal.

When relays 3601—3604 finally are set in a combination corresponding to hundreds numerical digit, a corresponding select magnet and relay 3605 are energized again. The plus potential from the select magnet causes in this case a selecting device 3412 to operate over a break contact of relay 3608 and a make contact of the energized relay 3609. Also relay 3607 is again energized.

The selecting device 3412 receives holding current over a make contact of energized hold relay 3606. When relay 3607 was energized, relays 3601—3604 were deenergized.

Upon operation of selecting device 3412, relay 3609 is deenergized. Upon operation of relay 3607, plus potential is applied over the wires 3151—3153. This indicates that the register can be disconnected. In this case the select magnet is prevented from being disconnected by the fact that it receives plus potential over a field contact of bar 1 of selecting device 3412, over a make contact of selecting device 3411. When selecting device is energized a select magnet of the secondary crossbar switch 3012 is set according to the hundreds numerical digit already set in the crossbar switch of the controller.

The slow acting relay 3606 shall have so great a delay action, that the call will have time to be passed through, before the relay is deenergized. If that is not the case, an out-of-order signal will be given.

The relay 3606, however, receives operating current from a contact of 3412 until its testing for connection to the set of line finders and final selectors has taken place, and selecting device 3413 has been energized.

When selecting device 3412 operates, the set of the third group selectors is connected over a separate operating circuit, for example 3050, to a desired set of line finders and final selectors. Over a make contact of selecting device 3411 and the third bar of selecting device 3412, plus potential is applied over wire 901 as a preparatory signal for busy marking the corresponding set of line finders and final selectors, in case said set is idle.

Wires 902 and 903 are connected over bars 4 and 5 of selecting device 3412 to relays 3611 and 3610 respectively. If the set of line finders and final selectors is idle, test relay 3611 obtains minus potential over a resistance in wire 902 and over a break contact of relay 720. Relay 3611 operates and receives holding potential over its make contact and a contact of relay 3606.

Should two or more test relays make parallel tests, it is necessary, as before mentioned, to make such arrangement that only one of the third group selectors shall be connected to the final selector. In such a case an auxiliary relay 3610, which has a longer time of actuation than that of test relay 3611, will be actuated, if test relay 3611 on account of parallel testing from other sets of third group selectors cannot be energized.

The set of third group selectors, which operate over the same thousands numerical digit, have their auxiliary relays, corresponding to the shown auxiliary relay 3610, connected over a chain of series break contacts of auxiliary relays belonging to other groups of thousands numerical digits, whereby the plus potential for the test relays 3611 is interrupted with the exception of the test relay, which is located next to the plus potential 3612 in the said chain. When test relay 3611 is energized, selecting device 3413 in the form of a hold magnet is actuated.

A test relay 3611' and an auxiliary relay 3610' corresponding to another group of thousands numerical digit are shown to the left of Fig. 36.

When testing device 3413 is energized, the digit signals for the tens and units numerical digits registered in the hold magnets 3415 and 3515 are transmitted to the connected set of line finders and final selectors. Said signals are transmitted over bars 4—9 and 10—15 of selecting device 3413 and over circuits 907 and 908 respectively of operating circuit 3050.

When the controller 313 of the set of line finders and final selectors has applied minus testing potential to such junctors which can make the desired connection, it transmits a start signal in the form of a plus potential over wire 904. This plus potential starts a seeking operation for an idle junctor, whereby hold magnet 3516 is actuated over the following circuit: Minus potential, hold magnet 3516, break contact hold magnet 3519, break contact relay 3501, break contact 3502, bar 1 of hold magnet 3413, wire 904, make contact of actuated relay 900, make contact of the now actuated relay 1009, plus potential.

When hold magnet 3516 is actuated, relay 3501 is operated over the following circuit: Plus potential over wire 904, bar 1 of hold magnet 3413, a make contact of hold magnet 3516, relay 3501, minus potential.

Upon actuation of relay 3501, current to hold magnet 3516 is interrupted, and when said hold magnet is released, hold magnet 3517 is energized over the following circuit: Minus potential, hold magnet 3517, a break contact of hold magnet 3516, a make contact relay 3501, a break contact relay 3502, bar 1 of hold magnet 3413, and plus potential over wire 904 as before.

Upon actuation of hold magnet 3517 relay 3502 is actuated over the following circuit: Minus potential, relay 3502, a make contact of hold magnet 3517, bar 1 of selecting device 3413 and plus potential over wire 904.

Current for hold magnet 3517 is then interrupted, and the hold magnet is deenergized. Hold magnet 3518 is actuated over the following circuit: Minus potential, a make contact of hold magnet 3517, a make contact of the actuated relay 3501, a make contact of relay 3502, bar 1 of selecting device 3413, and plus potential over wire 904 as before.

When hold magnet 3518 is actuated, relay 3501 is deenergized whereby operating current for hold magnet 3518 is interrupted, so that it releases, whereafter hold magnet 3519 is actuated over the following circuit: Minus potential, hold magnet 3519, a break contact of hold magnet 3518, a break contact of the now deenergized relay 3501, a make contact of relay 3502 bar 1 of selecting device 3413, plus potential over wire 904.

When hold magnet 3519 is actuated, relay 3502 is deenergized and interrupts operating current of hold magnet 3519, which is in turn deenergized. In this example it is supposed that the hunting operation is not repeated, and that an auxiliary relay (not shown) for blocking indication actuates a block message register connected to the connected numerical groups of junctors.

Each time one of the hold magnets 3516—3519 is actuated, 5 test relays 3701–3705 are connected to the corresponding test wires, which by the corresponding select magnets (hundreds numerical digit) are indicated in the respective hold magnets.

Test circuits pass over break contacts of the 20 secondary hold magnets corresponding to the 20 bars of the auxiliary hold magnets 3516—3519, in order to ascertain that links necessary for the connection are idle.

If one or more test relays are energized, the hunting operation is stopped, whereby the actuated hold magnet obtains holding current over a make contact of one of the relays 3701—3705 and over its make contact. When a test relay is operated, relay 3707 is also energized, whereby plus potential for the test relays is cut off with the exception of a single test relay, which in such a case obtains holding plus potential over a chain of break contacts beginning with relay 3701 and over a make contact in said operated test relay.

When both the incoming and outgoing junctors have been registered the connection can be established. This can be done in the following manner. One of the first select magnets 3200—3204 of the primary crossbar switch is actuated, when hold magnet 3516 or 3518 is actuated, and one of the other select magnets 3205 or 3209 is actuated, if any of hold magnets 3517 or 3519 is actuated.

Which one of the 5 select magnets of the upper or lower groups of select magnets is to be energized, is determined by the actuated test relay. Thus, for example, select magnet 3209 will be energized, if test relay 3705 and hold magnet 3517 or 3519 are actuated. The select magnet will in this case receive plus potential over a make contact of relay 3707, break contact relay 3502, a make contact of relay 3501, a make contact of test relay 3705, select magnet 3209, minus.

When a select magnet has been actuated in the primary crossbar switch, plus potential is applied from its make contact to one of the two hold magnets corresponding to the incoming junctor and situated in that part of the crossbar switch, from which a through connection by a link can be made. Thus plus potential can be applied to one of the 10 primary hold magnets 3211–3220, if auxiliary hold magnet 3516 or 3517 is actuated, and to one of the primary hold magnets 3221—3230, if one of the auxiliary hold magnets 3518 or 3519 is actuated. Thus hold magnet 3211 can be actuated over the following circuit: Plus potential, select magnet 3200, a make contact relay 3501, bar 1 of selecting device 3411, hold magnet 3211, minus potential.

In similar manner any of hold magnets 3221—3230 can be actuated over a break contact of relay 3501 and over field contact of bar 2 of selecting device 3411. The primary hold magnet will later on receive holding plus potential over its make contact and over call and hold wire 3349.

When a hold magnet has been actuated in the primary crossbar switch, such a hold magnet in the secondary crossbar switch will be operated, which can connect the previously found outgoing junctor, for which testing has been made and busy potential has been applied. The said hold magnet will then receive operating plus potential directly from the hold wire of the link, for example, from wire 3349 of circuit 3071 or from the corresponding wires of circuit 3090. When the hold magnet of the secondary crossbar switch is actuated, the plus potential is extended to a final selector, which receives a call signal.

A signal indicating that the call has been switched in the set of line finders and final selectors, is obtained by the interruption of the test circuit by a hold magnet in the set of line finders and final selectors. Test relay 3705 is then deenergized.

Resistances 3341—3360 prevent the respective test relays from being disconnected, when any of the respective hold magnets 3311—3330 are energized.

Should no signal from the set of line finders and final selectors be received in the set of third group selectors before the slow acting relay 3606 is released, an out-of-order indication is given. The slow acting hold relay looses its previous minus potential, when selecting device 3413 is actuated, after testing has been made for an idle set of line finders and final selectors and busy potential has been applied, and it thereafter holds the connection only due to its slow acting properties. If any of the test relays 3701—3705 is operated, when the slow acting hold relay 3606 is released, an out-of-order indicating relay 3710 will be actuated. Relay 3710 will also be actuated, when an out-of-order condition exists in the set of line finders and final selectors, whereby plus potential is applied over wires 906 from a make contact in slow acting relay 912 over the following circuit: Plus potential, make contact relay 912, wire 906, field contact and bar 3 of hold magnet 3413, relay 3710, minus potential.

Out-of-order relay 3710 is actuated, whereby it receives plus potential over wire 3711 from an out-of-order indicating device, similar to that to be described in connection with Figs. 45–46, common to a plurality of sets of third group selectors. By means of said plus potential there is indicated in the said out-of-order indicating device which of hold magnets 3516—3519 is energized, which of test relays 3701—3705 is energized, which hundreds numerical digit has been registered (bar 6 of hold magnet 3412), and which incoming junctor has been registered (bar 9 of hold magnet 3411). Besides there is sent out a disconnection signal to the connecting circuit (Fig. 31) over bar 3 of hold magnet 3411 and wire 3157.

*The feed circuit*

When any one of the test relays, for example 3701, has tested, and the hold magnet, for example 3211, of the set of third group selectors has been energized, plus potential is applied over wire 3149 and over a make contact of the hold magnet. Relays 3102 and 3103 will then be energized, said relays being slow acting for the first ringing signal. When the set of line finders and final selectors later on transmits a start signal, which disconnects the test relay, said signal will cause hold relay 3100 to be actuated over the following circuit: Minus potential, hold relay 3100, wire 3157, field contact and bar 3 of selecting device 3411, a make contact relay 3707, break contacts relays 3705—3701, plus potential.

Relay 3100 is actuated and disconnects the set of third group selectors by interrupting its holding plus potential over wire 3155 and over one of its break contacts. The established circuit thereby obtains holding plus potential in the direction of the A-subscriber over a make contact of relay 3100 and in the direction of the B-subscriber over make contacts of relay 3100 and 3103. When relay 3100 is actuated, a battery supply relay 3101 is connected to the A-subscriber's talking path over make contacts of relay 3100. Relay 3100 obtains holding current over a make contact of relay 3101, which now takes over the holding of the established connection. When relay 3100 is actuated, the operating current of relay 3103 is interrupted. This relay 3103 is slow acting in release, and is therefore relatively late released.

During the time that relay 3103 is actuated, test relay 3106 is connected to test wire 3148. Said test wire is, however, open until hold magnets of the sets of third group selectors and of the line finders and final selectors are operated, that is to say, until relay 3100 is actuated. The test relay will therefore be connected to the through test wire during the time that relay 3103 is still actuated, due to its slow release action.

If the B-subscriber is idle, relay 3106 will be actuated and receives holding current over its make contact independently of relay 3103. Wire 3149 will receive holding plus potential over a make contact of relay 3100 and over make contacts of relays 3103 and 3106. If relay 3106 actuates, relay 3103 obtains holding current over a make contact of relay 3106, a break contact of relay 3105 and over a make contact of relay 3103.

When test relay 3106 operates, relay 3102 is released. Relay 3102 is, however, slow to release and during the time it is still operated, it transmits a first ringing signal to the B-subscriber and also a corresponding ringing tone to the A-subscriber to indicate that a ringing signal is being transmitted. The ringing signal is transmitted from wire 3164 over make contacts of relay 3106, over signal interrupting relay 3105 and over make contacts of relay 3103. A corresponding signal tone is set out from wire 3162 over make contacts of relays 3102, 3106 and 3103, an inducing coil of relay 3101 and over a make contact of relay 3100.

After relay 3102 has been released, repeated ringing signal and ringing tone are sent out, until the B-subscriber answers or the A-subscriber puts his receiver on its hook. The ringing signal is transmitted from ringing machine 3104 over wire 3165 and over break contacts of relay 3102, make contacts of relay 3106, signal interrupting relay 3105 and over make contacts of relay 3103. Signal ringing tone is set out from wire 3163, a break contact of relay 3102, make contacts of relays 3106 and 3103, over an inducing coil of relay 3101 and over a make contact of relay 3100.

If the B-subscriber answers, signal interrupting relay 3105 is actuated, whereby holding current of relay 3103 is interrupted. Relay 3103 is released, whereafter also relay 3105 is deenergized. When relay 3103 is deenergized, the current feed relay 3107 of the B-subscriber is actuated. Minus potential is then set out over the call meter wire, so that the call meter of the A-subscriber is operated. The said call meter then obtains holding current over a resistance 3166 and over a make contact of relay 3100. The call meter will thus be operated, even if the B-subscriber momentarily moves his hook.

When the A-subscriber puts his telephone on its hook, the connection is released, even if the B-subscriber has not answered. In this case relay 3101 is deenergized, whereby holding current of relay 3100 is interrupted, whereby all relays are released.

If the B-subscriber is busy, test relay 3106 will not be actuated during the time relay 3103 is energized, due to its slow to release action. When relay 3103 is deenergized, holding plus potential over wire 3149 is interrupted, and the connection is interrupted. The A-subscriber receives busy tone over wire 3160, a make contact of relay 3102, break contacts of relays 3106 and 3103, over an inducing coil of relay 3101 and over a make contact of relay 3100. If the out-of-order indicating relay 3710 of the third group selector is energized, but no connection has been obtained, relays 3103 and 3102 will be energized over wire 3149. In this case relay 3103 will be deenergized and busy tone will be sent out in the previously described manner.

If the out-of-order indicating relay 3710 has been energized and no connection has been established, wire 3157 will receive plus potential over a make contact of relay 3710, over a field contact and bar of hold magnet 3411. Relay 3100 is hereby energized, whereby also relay 3101 is connected. The A-subscriber receives block signal over wire 3161, break contact of relays 3102, 3106 and 3103, inducing coil of relay 3101 and over a make contact of relay 3100.

Block signal is also transmitted, when the links of the set of line finders and final selectors are blocked, whereby a plus potential is set out over wire 905 as previously described. The said plus potential arrives over wire 3157 and over field contacts and bar 2 of hold magnet 3413 and over bar 3 of selecting device 3411.

If testing and connection to an idle outgoing junctor cannot take place, a relay in the set of third group selectors (not shown) can be actuated, which can register the number of times blocking occurs, and which can cause plus potential to be applied over bar 3 of selecting device 3411, so that wire 3157 will receive plus potential, whereby a block signal can be transmitted to the A-subscriber in the manner previously described.

Fig. 39 diagrammatically shows a set of first or second group selectors provided with two and three groups of switches in order to provide a grading of links and a particularly economical and efficient switching equipment.

The first encountered groups of secondary switches 3921—3924 are directly connected to primary switches 3901—3910 over links graded in known manner.

The later on encountered tertiary switches 3925—3930 are, however, sought over a secondary switch 3915—3920 associated with each tertiary switch.

In this embodiment the four first sought secondary switches 3921–3924 are considered to receive sufficient traffic load, so as to be well utilized. The later on sought switches 3925—3930 are better utilized by means of the intermediate switches 3915—3920.

Fig. 40 shows how an extra hold magnet in a set of line finders and final selectors can replace the 10 existing 10 digit relays 600–609 in Fig. 6.

Sets of line relays are arranged in the same manner as shown in Fig. 6 with the exception, that relays 600—609 are replaced by a hold magnet 4000, which can be placed in any crossbar switch belonging to the set of line finders and final selectors, which is actuable by the primarily received operating numerical combinations, in this case tens numerical digits. In this case the hold magnet 4000 is supposed to be located in the crossbar switch, which in the previously shown embodiment (Figs. 7–10) is provided with select magnets 800—809. In this crossbar switch there are shown only a couple of select magnets and the hold magnet 4000.

As soon as a subscriber lifts his hook, one of the primary select magnets 710—719 and then one of the secondary select magnets 800—809 will be operated in the manner previously described. Upon actuation of one of select magnets 800—809 hold magnet 4000 operates over the following circuit: Plus potential, make contact select magnet, for example 800, break contact relay 620, hold magnet 4000, minus potential.

Upon actuation of the hold magnet 4000 plus potential is applied over the units numerical digit wires of all calling subscribers in the corresponding tens numerical digit group. If thus, for example, subscriber No. 11100 has lifted his receiver from its hook, plus potential is applied to select magnets 710 from digit wire 0–, tens numerical digit zero. Upon actuation of select magnet 710, select magnet 800 will primarily be energized in similar manner as previously described and thereafter hold magnet 4000, provided that relay 620 is non-operated, that is, the call is an outgoing call.

Upon operation of the hold magnet plus potential is impressed from bars 1 to 10 to contacts of subscribers' line relays 00–09 and from there over a break contact of cut-off relay 611 and a make contact of line relay 610 to wire (–0), whereafter the set of line finders and final selectors is connected in the manner previously described.

The set of line finders and final selectors as shown in Figs. 7–10 can be used "per se" for non-numerical selection as line finder or preselector in a desired direction in any switching system or in combination with same. Thus it can be used as a by-path for indicating a certain group of junctors, for example for selecting an idle trunk, an idle long-distance line and/or a group of such lines. It can also be used as a register finder in a telephone system as diagrammatically shown in Fig. 41.

In Fig. 41 is thus shown such a set of line finders and selectors used as register finder (Figs. 7–8, 9–10) in a telephone system provided with line finder switches S, current supply devices SNR, first group selectors IGV, second group selectors IIGV and final selectors LV. In the diagram there are shown an A-subscriber and a B-subscriber connected to the system. Between the finder switch and the first group selector a set of line finders and final selectors is connected between the current supply device SNR and the registers R.

A controller can be connected to incoming junctors or to a controller of a preceding group of switches by means of a number of selecting devices. These selecting devices can entirely or partly form part of the first mentioned controller or entirely or partly form part of the controller of a preceding rank of switches.

Fig. 42 shows how an idle outgoing junctor can be located in connection with two ranks of group selectors. An incoming call over an incoming line, for example 4201 to a group selector IGV is switched in a manner described in connection with Fig. 24 to a controller 4200 over selecting device 4203 and 4204. This controller receives selecting signals, seeks an idle controller 4206 in a succeeding group selector IIGV 4209—4211 by means of a selecting device 4205, tests which outgoing junctors from the first rank of group selectors are idle and which are accessible, transmits to the controller 4206 necessary signals about which junctors between the first and second ranks are accessible.

Due to the fact that signals between two successive controllers can be transmitted directly over control wires instead of over junctors, each set of group selectors can be provided with several controllers.

The controller 4206 of the second group selectors seeks an idle outgoing junctor, which can reach any of the accessible incoming junctors, and if such a junctor is not found, the controller transmits a signal to the controller 4200 to locate another set of second group selectors.

If an idle junctor connection has been found, the switches, over which said connection shall be established, are busy-marked in similar manner as before described. Signals for this purpose are transmitted from the controller 4206 to the controller 4200. The controller then makes the connections in the crossbar switches of the respective group selector sets. The controllers are thereafter disconnected.

The seeking of an idle outgoing junctor can also be made so that the controller of the first group selectors simultaneously seeks among the outgoing junctors a desired group of junctors, which can be used for the connection of the respective located outgoing junctors.

Instead of multipling the outgoing junctors in the group selector sets as shown in Fig. 42, said junctors can be multipled outside the said group selector sets in known manner. In this latter case testing can simultaneously be made for an idle outgoing junctor and for an idle link in previously described manner. In such a case the number of contacts is considerably reduced in the controller of the set of first group selectors.

Fig. 43 shows another embodiment of the group selectors shown in Fig. 14. The group selectors, for example, last group selectors, here shown, differs from that previously described in Fig. 14 by the fact that the primary and secondary groups of switches shown in Fig. 14 have been replaced in Fig. 43 by three groups of switches 4301—4310, 4321—4330 and 4351—4360 respectively.

A call incoming, for example, to crossbar switch 4301 can in this embodiment be switched to crossbar switch 4351 over a plurality of groups of junctors. In this manner the probability that interior links should block a certain idle outgoing junctor is minimized.

The reduced risk for lost calls makes possible the arrangement of a greater number of incoming or outgoing junctors. In the present case the number of fourth sections 4371, 4372, 4389, 4390 has been doubled, due to the fact that each tertiary section 4351—4360 can be considered divided in two sections, each provided with 6 hold magnets in each group.

It will thus be possible to connect 200 outgoing junctors over 20 fourth sections to each set of group selectors, provided that the outgoing junctors are slightly utilized, as is the case between last group selectors and a set of final selectors.

The group selectors arranged in the above mentioned manner can be connected to 100 numerical groups of junctors and can replace previously described sets of second and third group selectors. 20 junctors incoming to a set of line finders and final selectors depart in this case from field contacts in each of the 20 switches of the fourth section of the group selectors shown in Fig. 43.

The set of line finders and final selectors, which shall be found, is determined by the select magnets of the fourth sections and by that of 10 test relays which will be connected in the controller 4331. If the group selectors of the last switching rank are arranged in the here described manner, the incoming junctors will even in large size exchanges be connected to current feed control circuits. This is favourable from the point of view that traffic can be concentrated only to the junctors. When, however, junctors are slightly utilized, an unnecessarily great number of current feed circuits is required.

Fig. 44 shows how a set of group selectors, for example a set of second group selectors can be provided with two controllers common to all group selectors in the set.

Each controller can be called, as previously mentioned over 10 call relays, which for the first controller are marked 4401—4410 and for the second controller are marked 4411—4420.

The call relays corresponding to each controller are connected over a circuit comprising a break contact in each respective relay. The break contact circuits differ, however, from those previously described by the fact, that the connect relays corresponding to a certain controller do not obtain operating potential, until the preceding controller is busy, that is to say, that one of its connect relays is busy. Further, connect relays actuated by a certain primary switch, are arranged mutually to cut out each other in a predetermined order.

We suppose that a call arrives from a relay or a hold magnet 4400 located for example in a register or in a primary hold magnet of a set of group selectors. In this case relay 4401 will be actuated upon operation of relay 4400 over the following circuit: Plus potential, make contact hold magnet 4400, break contact relay 4411, relay 4401, break contact 4401, break contact relay 4421, minus potential.

Upon operation of relay 4401, it receives holding current over a make before break contact in series with a switch relay 4421, which will be energized as soon as any of relays 4401—4410 is operated.

If a new call now arrives over another group selector of the set, such a call will be directed, for example, to relay 4412 over the following circuit: Plus potential, make contact of another relay corresponding to 4400, a resistance corresponding to the lower resistance shown in the drawing, a break contact of relay 4402, relay 4412, a break contact 4412, a make contact of the now energized switch relay 4421, a break contact of relay 4422, minus potential. Relay 4412 is operated and necessary holding current is received in similar manner as already described in connection with relay 4401.

In Fig. 44 is indicated how a call can be shunted in manner described in the connection with Figs. 20–23, when relay 3130 (Fig. 21) pertaining to the controller is energized, and also how relay 4400 can receive holding current in series with relay 2200 either over a break contact of relay 2205 or from a make contact of relay 2206.

*Out-of-order indicating device*

Figure 20:
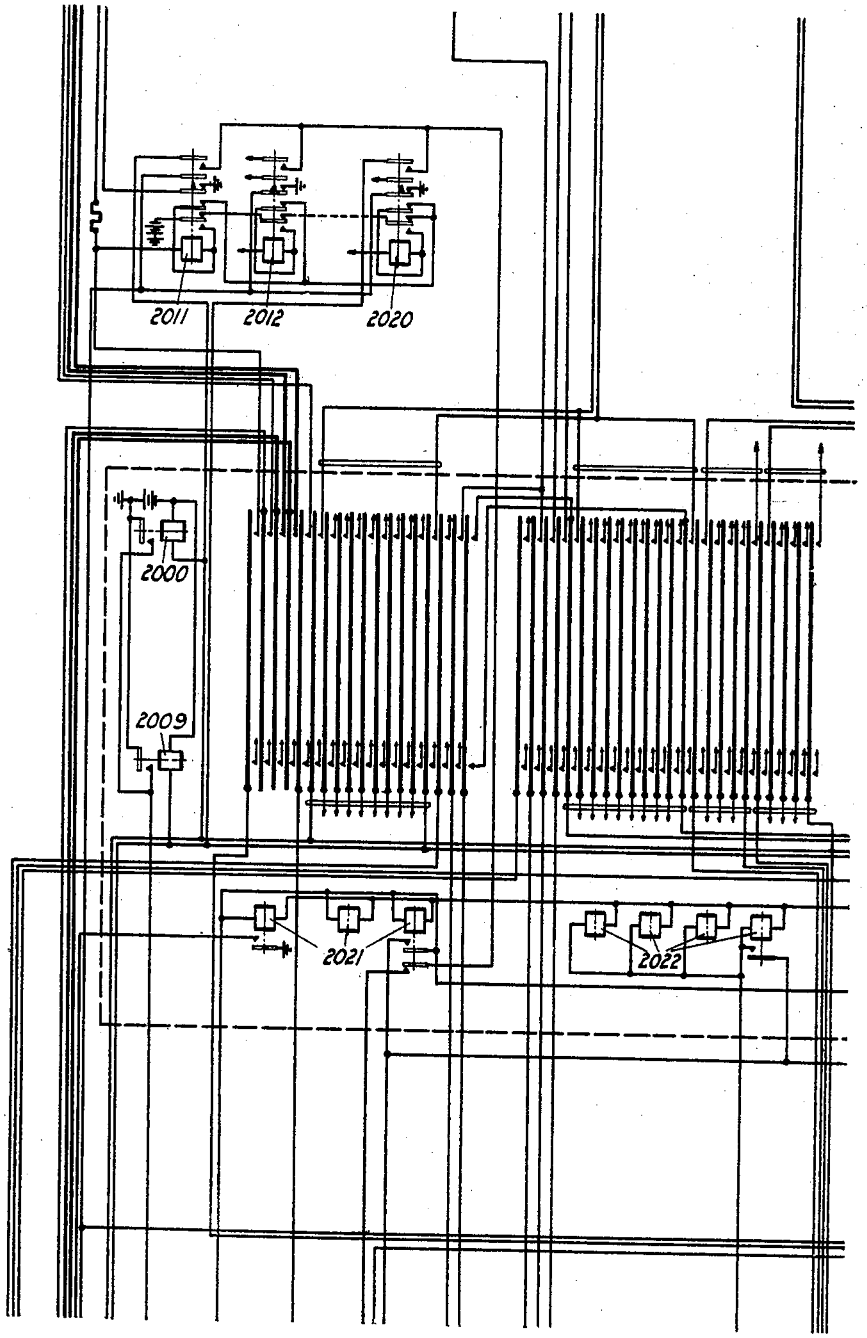
Figure 21:
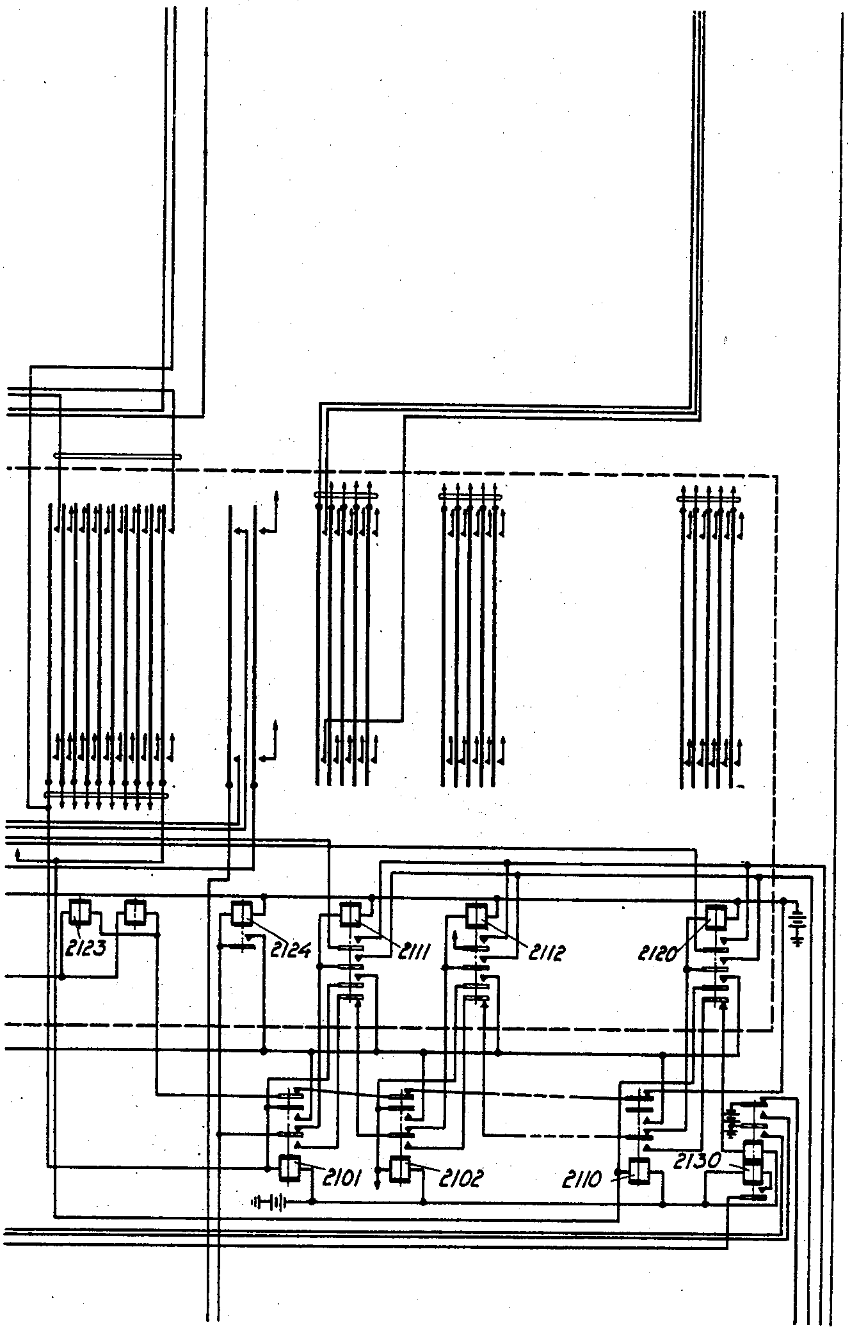
Figure 22:
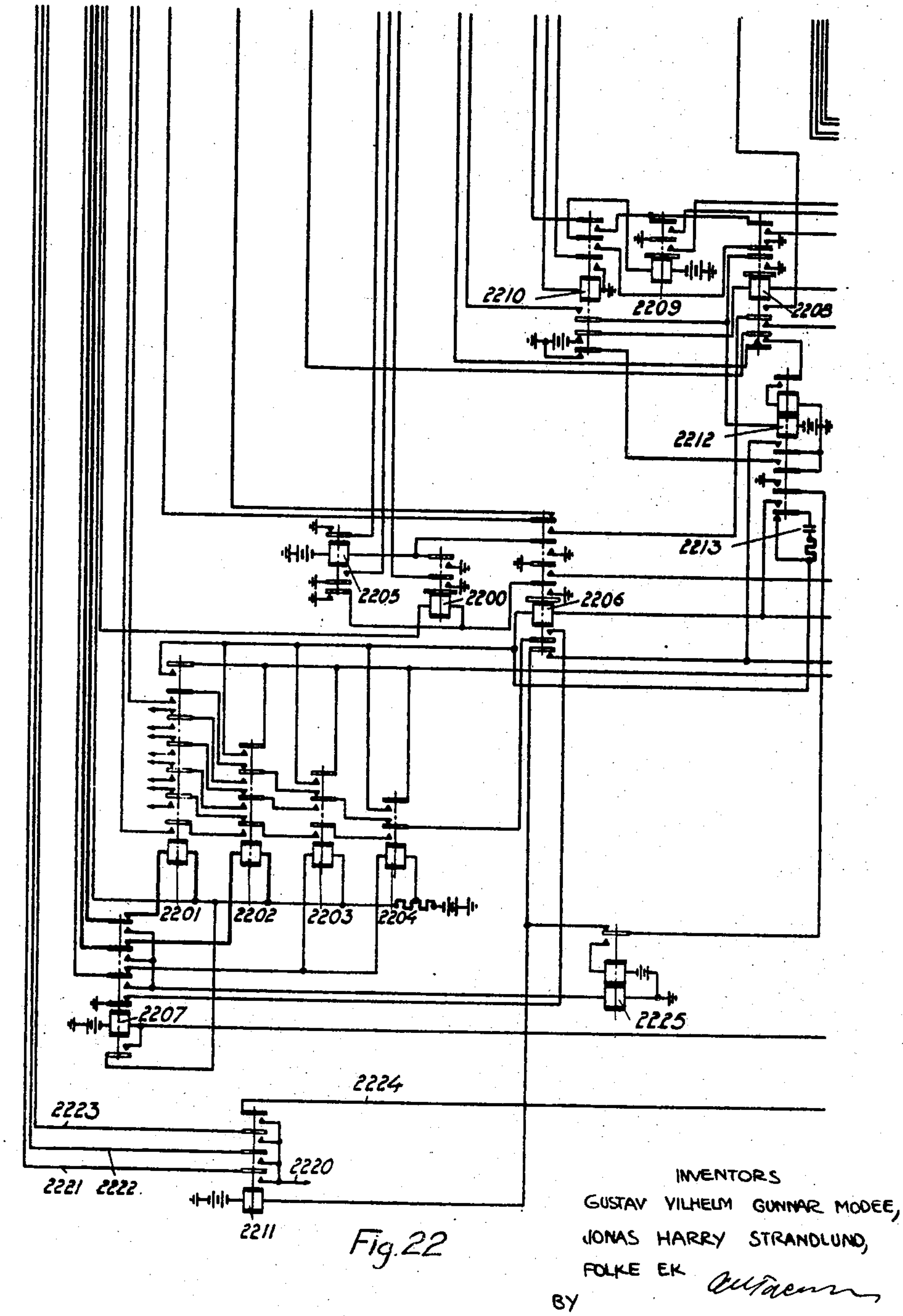
Figure 23:
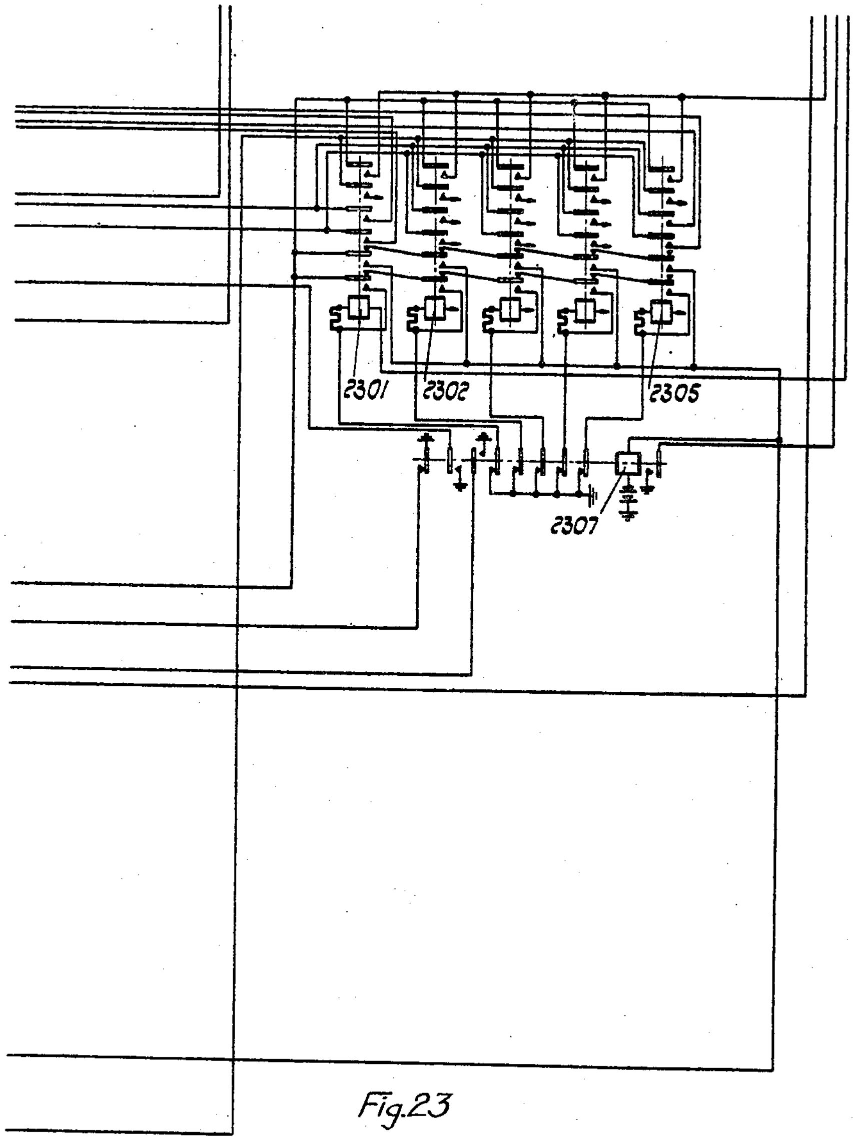

In Figs. 45–46 is shown an out-of-order indicating device for sets of first group selectors (Figs. 20–22). Over a make contact in relay 4601 plus potential is impressed over wire 2220 to make contacts of a control relay 2211. This plus potential is distributed to all sets of the first group selectors concerned.

Upon operation of the control relay 2211 wire 2224 obtains plus potential, whereby one of relays 4611—4630 is operated, depending upon which set of first group selectors has given an out-of-order signal. When a relay for example 4630 connected to minus potential operates, it obtains holding current over a continuity contact of the same relay, over relay 4601 and over a cut-off contact 4603 to plus potential. When relay 4601 is operated, an alarm signal is sent out over wire 4602, and plus potential is cut off from wire 2220. Relay 4601 is somewhat slow-acting in operation, so that other registering relays will have time to operate.

The plus potential which is applied over test relays 2301—2305 causes a corresponding relay 4631—4635 to operate in similar manner as above described. These wires are multipled among all sets of first group selectors.

In a similar manner relays 4641—4650 register in which of the tertiary sections 1321—1330 a call has been switched, and relays 4651—4660 to which primary section the call has arrived, and finally relays 4661—4670 in which trunk group the outgoing trunk has been located.

After having noted the indications of the out-of-order device, contact 4603 can be manually opened for breaking the holding current of the relays. Thus the device is returned to normal, and is now ready for registering new out-of-order conditions.

In a similar manner out-of-order conditions of the switches of the sets of second and third group selectors and of the line finders and final selectors can be controlled and registered.

*Impulse combinations and out-of-order indicating relays*

Fig. 47*a* shows how a register receives signals indicating that a new pulse combination shall be transmitted, and also how the register, upon setting up a call, tests the corresponding operating wires, that is to say, that talking branches and message meter wire are in order. Testing and holding wires are automatically tested when a call is being set up.

Of the normal parts of a register there is only shown a hold magnet 4700 serving as counting device for setting up numerical combinations. The register is supposed to be connected to a set of first group selectors as shown in Figs. 1 and 2.

Pulse series from a subscriber's dial incoming to a register are registered in known manner by a number of hold magnets (not shown), and which act as registering device.

When the hold magnet 4700 has been energized, those of the combination relays 2201–2204, which correspond to the numerical combination signal, are energized. If for example junctor group or numeral 2 shall be connected, relays 2201, 2203 and 2204 are energized. The combinations for junctor groups or numerals 0–9 as shown in Fig. 47*b*, where "plus" indicates an energized relay and "minus" indicates a non energized relay.

Relays 2201—2204 receive a potential of, for example, −12 volts over wire 4701. Relays 2203 and 2204 can also receive, for example −24 volts over wire 4702. This lower voltage can only actuate relay 2203, because relay 2204 has its coil connected to the same potential, —24 volts, contrary to the other relays, which have their coils connected to, for example, —36 volts.

When the pulse combination has been received by a group selector a signal is transmitted to the register to indicate that a new pulse combination can be transmitted. This takes place, when relay 2207 is energized (see Fig. 22), whereby operating wires 1703—1705 are grounded in series with relay coil 2225. Plus potential will now be applied over relay 2225 over the following circuit: Plus potential, coil 2225, make contacts of relay 2207, field contacts of bars 4—6 of hold magnet 4700, rectifiers in parallel connection with coils 4703—4705, relay coils 4707—4709, rectifier 4712, relay coil 4711, break contact relay 4706, —12 volts.

Rectifiers 4712 and relay 4711 are shunted by a rectifier 4713. The circuit over field contacts of bar 4 of hold magnet 4700 to —24 volts includes a rectifier 4714 which opposes the plus potential over relay 2225. When relay 4711 operates according to the above mentioned circuit, a circuit is closed, which connects the counting device 4700 to a new counting circuit.

The circuits, which operate relays 2201—2204 for their pulse combination, also operate relays 4703—4705 over operating wires 1703, 1704 and 1705. Plus potential is applied over operating wires 1703, 1704 and 1705 over bars 1—3 of hold magnet 4700, break contacts of relays 4705—4703 respectively to relay 4706 to minus potential.

If any of relays 4703—4705 should not operate due to an out-of-order condition of any of the corresponding operating wires 1703—1705, an out-of-order indication relay 4706 will be actuated and will receive holding current over its make contact.

Relay 4706 should be so arranged that it cannot operate before the actuation of relays 4703—4705. Relays 4707—4709 are so adjusted that they shall normally not operate for currents normally transmitted over the operating wires 1703—1705.

What we claim is:

1. In a crossbar system, a switching stage comprising crossbar switches arranged for operation as line finders and as final selectors, a switching stage of first group selectors and a switching stage of penultimate selectors, the switches of each of said switching stages being arranged in sets of switches, each set of said line finders and final selectors including primary and secondary groups of switches, said switches consisting of hold magnets in crossbar switches and including links between said primary and secondary groups of switches, junctors connected between the sets of said penultimate selectors and said secondary group of switches of each set of line finders and final selectors for incoming traffic, junctors connected between said secondary group of switches of each set of said line finders and final selectors and said first group selectors for outgoing traffic, numbered subscriber lines connected to the primary groups of switches of the sets of said line finders and final selectors, each set of said line finders and final selectors being provided with a marker including means directing the switches of said primary and secondary groups of switches of said set of line finders and final selectors to set up a connection between a calling or a called numbered subscriber's line and a junctor in series with a switch in each of said primary and secondary groups of switches of said set of line finders and final selectors, operating circuits entirely separate from junctors between said set of penultimate selectors and said set of line finders and final selectors for connection of said marker with the sets of switches of said penultimate selectors for preparing the connection of an idle junctor, means coupled to said marker and to such numbered subscribers' lines which are connected to said primary group of switches of said set of line finders and final selectors to enable a calling subscriber to have his line connected to said marker, any numbered subscriber's line in the primary group of switches in said set of line finders and final selectors being connected to contact points in a plurality of hold magnets, whereby said numbered subscriber's line is connected to one of said hold magnets together with a plurality of other numbered subscribers' lines so that a first group of numbered subscribers' lines is formed, said numbered subscriber's line being also connected to contact points in at least another hold magnet of said primary group of switches together with a plurality of other numbered subscribers' lines so that a second group of numbered subscribers' lines is formed, and whereby said first group of numbered subscribers' lines is connectable over a link between said primary and secondary groups of switches to contact points in switches in said secondary group of switches, and said second group of numbered subscribers' lines is connectable over another link between said primary and secondary groups of switches to contact points in other switches in said secondary group of switches of said set of line finders such final selectors.

2. A crossbar system as defined in claim 1, in which said line finders and final selectors are crossbar switches provided with contact points, hold magnets and select magnets, each numbered line in a set of line finders and final selectors being connected to contact points in a plurality of crossbar switches in the primary group of switches of said set of line finders and final selectors, whereby the numbered subscribers' lines, which are connected to a row of contact points corresponding to a select magnet in one of these crossbar switches, in another crossbar switch are connected to a row of contact points corresponding to a hold magnet, the numerical order of the numbered lines in the respective rows of contact points being thereby maintained, said marker including means for operating select magnets of said two crossbar switches upon receipt of a call from or to a numbered subscriber's line connected to a certain row of said contact points for indication from or to which group of numbered subscribers' lines and from or to which numbered line within said group of numbered subscribers' lines the call has originated or is destined.

3. A crossbar system as defined in claim 1, in which the switches in said sets of line finders and final selections are crossbar switches, the primary group of switches in each set comprising a plurality of sections of switches, the switches of two of said sections being hold magnets in a crossbar switch, and the switches of other two sections being hold magnets in another crossbar switch, each of said numbered lines being connected to contact points in a hold magnet in each of the said sections, whereby the numbered subscribers' lines are connected in the same order to the contact points of the hold magnets of each section of one of the crossbar switches, the hold magnets being located in pairs so that hold magnets of each section, which contain the same subscriber's number are adjacent each other for bare wire connection between the corresponding contact points of each subscriber's line in said first mentioned crossbar switch, and whereby the hold magnets of the other crossbar switch are arranged in the same manner as in the first mentioned crossbar switch; the numbered subscribers' lines being connected in the two crossbar switches in such a manner that subscribers' lines which in one of the crossbar switches appear in one coordinate direction, in the other crossbar switch appear in another coordinate direction.

4. A crossbar system as defined in claim 1, in which said marker of the set of line finders and final selectors include means for suppressing an outward call awaiting connection over an outgoing junctor, when no idle link in the set of line finders and final selectors has been found and when a call is being received from the penultimate selectors.

5. In a crossbar system, a switching stage comprising crossbar switches arranged for operation as line finders and final selectors and a switching stage of penultimate selectors, the switches of each of said switching stages being subdivided into sets of switches, each set of said line finders and final selectors including primary and secondary groups of switches, said switches consisting of hold magnets in crossbar switches, and including links between said primary and secondary groups of switches, junctors connected between the sets of said penultimate selectors and said secondary group of switches of each set of said line finders and final selectors for incoming traffic numbered subscribers' lines connected to the primary group of switches of the sets of said line finders and final selectors, any numbered subscriber's line in the primary group of switches in said set of line finders and final selectors being connected to contact points in a plurality of hold magnets, whereby said numbered subscriber's line is connected to one of said hold magnets together with a plurality of other numbered subscribers' lines so that a first group of numbered subscribers' lines is formed, said numbered subscriber's line being also connected to contact points in at least another hold magnet of said primary group of switches together with a plurality of other numbered subscribers' lines so that a second group of numbered subscribers' lines is formed, and whereby said first group of numbered subscribers' lines is connectable over a link between said primary and secondary groups of switches to contact points in switches in said secondary group of switches, and said second group of numbered subscribers' lines is connectable over another link between the said primary and secondary groups of switches to contact points in other switches in said secondary group of switches of said set of line finders and final selectors, each set of line finders and final selectors being provided with a marker including means for directing the switches of said primary and secondary groups of switches of said set of line finders and final selectors, each set of switches of said penultimate selectors including a marker for directing said penultimate selectors to set up a connection for a call incoming to said set of penultimate selectors to an idle junctor, operating circuits entirely separate from junctors between said sets of penultimate selectors and said set of line finders and final selectors for connection of the marker of each set of penultimate selectors to the marker of a desired set of line finders and final selectors, the marker in each set of said penultimate selectors including means for transmitting numerical signals over said operating circuits to the marker of said desired set of line finders and final selectors for directing switches in said primary and secondary groups of switches in said set of line finders and final selectors, said marker of said set of line finders and final selectors including means for receiving said numerical signals so that said means in said marker for directing said switches of said primary and secondary groups of switches of said line finders and final selectors are actuated by said means for receiving said numerical signals in said marker, means for idle marking idle ones of said junctors depending on the numerical signals received by said receiving means and whether the links between the primary and secondary groups of switches of said set of line finders and final selectors are busy or idle, and the marker of said set of said penultimate selectors including means to select one of said idle-marked junctors, and means to transmit signals after selection of said junctor for operation of switches in said set of penultimate selectors and for operation of a switch in each of said primary and secondary groups of switches in said set of line finders and final selectors for setting up a connection to a desired subscriber's line over said idle-marked and selected junctor through a switch in each of said secondary and primary groups of switches in said set of line finders and final selectors in series with a link between said switches in said primary and secondary groups of switches of said set of line finders and final selectors.

6. In a crossbar system, two switching stages, each switching stage comprising a plurality of sets of switches, each set of said switches being provided with a marker including means for directing the switches of said set, junctors between each set of switches of one of said switching stages and each set of switches of the succeeding switching stage, operating circuits entirely separate from the junctors for the connection of the marker of a set of switches of the first mentioned switching stage to the marker of each set of switches of the succeeding switching stage, said marker in the first mentioned switching stage comprising a lock-out relay chain including a lock-out relay for each of said markers in said first mentioned switching stage, each of said markers including means for testing and means for connecting said marker to a marker in each of said sets of the succeeding switching stage, said testing means comprising a rapidly operating test relay including a break contact connected in series with the operating coil of said lock-out relay, said lock-out relay comprising a break contact connected in series with a first actuating circuit of the associated test relay and a make contact connected in series with a second actuating circuit of said test relay, said make contact being connected in a break contact chain so arranged that only one of said test relays at a time obtains operating current over said second actuating circuit, whereby upon normal testing the test relay operates and breaks the operating current to the associated lock-out relay before the same operates, and whereby upon parallel testing from different markers in the first mentioned switching stage to the same marker in said succeeding switching stage only one of the test relays obtains operating current over said lock-out circuit upon operation of said lock-out relays.

7. In a switching system, a switching stage comprising crossbar switches arranged for operation as line finders and as final selectors, said line finders and final selectors comprising primary and secondary groups of switches, numbered lines being connected to the primary group of switches, links between adjacent groups of switches, other lines being connected to the secondary group of switches for traffic to and/or from said numbered lines, a marker including means for directing the switches of said primary and secondary groups of switches to set up a connection between said numbered lines and said other lines, said numbered lines being connected to contact points in said primary group of switches, any numbered line in said primary group of switches being connected to contact points in a plurality of switches, whereby said numbered line is connected to one of said switches together with a plurality of other numbered lines so that a first group of numbered lines is formed, said numbered line also being connected to contact points in at least one other switch of said primary group of switches together with a plurality of other numbered lines so that a second group of numbered lines is formed, said first group of numbered lines being connectable over a link between said primary and secondary groups of switches to contact points in switches in said secondary group of switches, and said second group of numbered lines being connectable over another link between said primary and secondary groups of switches to contact points in other switches in said secondary group of switches.

8. In a switching stage of a crossbar system comprising crossbar switches, lines incoming to and outgoing from same, said crossbar switches comprising hold magnets and select magnets, each of a plurality of hold magnets in a crossbar switch being provided with two sets of contact bars and two sets of contacts, two groups of lines being connected to said sets of contacts, the contacts of one group of lines forming make contacts with one set of contacts bars common to said contacts, and the contacts of the other group of lines forming make contacts with the other set of contact bars common to said other contacts, two auxiliary select magnets in another crossbar switch, other lines being connected to contacts selectable by said auxiliary select magnets, means for selectively operating either of said select magnets to connect said other lines over either of two sets of contact bars to lines pertaining to either of said two groups of lines upon operation of one of said auxiliary select magnets and of the corresponding ordinary select and hold magnets in both crossbar switches over said crossbar switches.

GUSTAV VILHELM GUNNAR MODÉE.
JONAS HARRY STRANDLUND.
FOLKE EK.

No references cited.